United States Patent
Holt et al.

(10) Patent No.: US 6,714,966 B1
(45) Date of Patent: *Mar. 30, 2004

(54) INFORMATION DELIVERY SERVICE

(75) Inventors: Fred B. Holt, Seattle, WA (US); Virgil E. Bourassa, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 467 days.

This patent is subject to a terminal disclaimer.

(21) Appl. No.: 09/629,043

(22) Filed: Jul. 31, 2000

(51) Int. Cl.[7] .............................................. G06F 15/16

(52) U.S. Cl. ...................... 709/204; 709/205; 709/203; 709/243; 463/92

(58) Field of Search ................................ 709/204, 205, 709/227, 243, 203; 463/40, 42

(56) References Cited

U.S. PATENT DOCUMENTS

| | | | |
|---|---|---|---|
| 4,912,656 A | | 3/1990 | Cain et al. |
| 5,056,085 A | | 10/1991 | Vu |
| 5,058,105 A | * | 10/1991 | Mansour et al. ............ 370/228 |
| 5,079,767 A | * | 1/1992 | Perlman .................... 370/408 |
| 5,117,422 A | * | 5/1992 | Hauptschein et al. ....... 370/255 |
| 5,309,437 A | | 5/1994 | Perlman et al. |
| 5,426,637 A | | 6/1995 | Derby et al. |
| 5,459,725 A | * | 10/1995 | Bodner et al. ............. 370/390 |
| 5,471,623 A | * | 11/1995 | Napolitano, Jr. ........... 709/243 |
| 5,535,199 A | | 7/1996 | Amri et al. |
| 5,568,487 A | | 10/1996 | Sitbon et al. |
| 5,636,371 A | | 6/1997 | Yu |
| 5,644,714 A | * | 7/1997 | Kikinis ....................... 709/219 |
| 5,673,265 A | | 9/1997 | Gupta et al. |
| 5,696,903 A | | 12/1997 | Mahany |
| 5,732,074 A | | 3/1998 | Spaur et al. |
| 5,732,086 A | * | 3/1998 | Liang et al. ................ 370/410 |
| 5,732,219 A | | 3/1998 | Blumer et al. |
| 5,734,865 A | | 3/1998 | Yu |
| 5,737,526 A | | 4/1998 | Periasamy et al. |
| 5,754,830 A | | 5/1998 | Butts et al. |
| 5,761,425 A | | 6/1998 | Miller |
| 5,764,756 A | | 6/1998 | Onweller |
| 5,790,548 A | | 8/1998 | Sistanizadeh et al. |
| 5,790,553 A | | 8/1998 | Deaton, Jr. et al. |
| 5,799,016 A | | 8/1998 | Onweller |
| 5,802,285 A | | 9/1998 | Hirviniemi |
| 5,850,592 A | * | 12/1998 | Ramanathan .................. 455/7 |
| 5,864,711 A | | 1/1999 | Mairs et al. |
| 5,867,660 A | | 2/1999 | Schmidt et al. |
| 5,867,667 A | | 2/1999 | Butman et al. |
| 5,870,605 A | | 2/1999 | Bracho et al. |

(List continued on next page.)

OTHER PUBLICATIONS

PR Newswire, "Microsoft Boosts Accessibility to Internet Gaming Zone with Latest Release," Apr. 27, 1998, pp. 1ff.*
PR Newswire, "Microsoft Announces Launch Date for UltraCorps, Its Second Premium Title for the Internet Gaming Zone," Ma 27, 1998, pp. 1 ff.*
Business Wire, "Boeing and Panthesis Complete SWAN Transaction," Jul. 22, 2002, pp. 1ff.*

(List continued on next page.)

Primary Examiner—Dung C. Dinh
Assistant Examiner—Brad Edelman
(74) Attorney, Agent, or Firm—Perkins Coie LLP

(57) ABSTRACT

A computer network for providing an information delivery service for a plurality of participants over the network is disclosed. Each participant has connections to at least three neighbor participants. An originating participant sends data to the other participants by sending the data through each of its connections to its neighbor participants. Further, each participant sends data that it receives from a neighbor participant to its other neighbor participants. The network is m-regular where m is the exact number of neighbor participants of each participant and the network is an incomplete graph.

17 Claims, 39 Drawing Sheets

U.S. PATENT DOCUMENTS

| | | | |
|---|---|---|---|
| 5,874,960 A | | 2/1999 | Mairs et al. |
| 5,899,980 A | | 5/1999 | Wilf et al. |
| 5,907,610 A | | 5/1999 | Onweller |
| 5,925,097 A | * | 7/1999 | Gopinath et al. ........... 709/200 |
| 5,928,335 A | | 7/1999 | Morita |
| 5,935,215 A | | 8/1999 | Bell et al. |
| 5,948,054 A | | 9/1999 | Nielsen |
| 5,949,975 A | | 9/1999 | Batty et al. |
| 5,956,484 A | | 9/1999 | Rosenberg et al. |
| 5,970,232 A | * | 10/1999 | Passint et al. .............. 709/238 |
| 5,974,043 A | | 10/1999 | Solomon |
| 5,987,506 A | | 11/1999 | Carter et al. |
| 6,003,088 A | | 12/1999 | Houston et al. |
| 6,013,107 A | | 1/2000 | Blackshear et al. |
| 6,023,734 A | | 2/2000 | Ratcliff et al. |
| 6,029,171 A | | 2/2000 | Smiga et al. |
| 6,032,188 A | | 2/2000 | Mairs et al. |
| 6,038,602 A | | 3/2000 | Ishikawa |
| 6,047,289 A | | 4/2000 | Thorne et al. |
| 6,094,676 A | | 7/2000 | Gray et al. |
| 6,115,580 A | * | 9/2000 | Chuprun et al. ................ 455/1 |
| 6,167,432 A | * | 12/2000 | Jiang .......................... 709/204 |
| 6,173,314 B1 | * | 1/2001 | Kurashima et al. ......... 709/204 |
| 6,199,116 B1 | | 3/2001 | May et al. |
| 6,216,177 B1 | | 4/2001 | Mairs et al. |
| 6,223,212 B1 | | 4/2001 | Batty et al. |
| 6,243,691 B1 | | 6/2001 | Fisher et al. |
| 6,268,855 B1 | | 7/2001 | Mairs et al. |
| 6,271,839 B1 | | 8/2001 | Mairs et al. |
| 6,272,548 B1 | * | 8/2001 | Cotter et al. ................ 709/239 |
| 6,285,363 B1 | | 9/2001 | Mairs et al. |
| 6,304,928 B1 | | 10/2001 | Mairs et al. |
| 6,321,270 B1 | * | 11/2001 | Crawley ...................... 709/238 |
| 6,463,078 B1 | * | 10/2002 | Engstrom et al. ........... 370/466 |
| 6,524,189 B1 | * | 2/2003 | Rautila ......................... 463/40 |
| 2002/0027896 A1 | * | 3/2002 | Hughes et al. .............. 370/342 |

OTHER PUBLICATIONS

Azar et al., "Routing Strategies for Fast Networks," May 1992, INFOCOM '92, Eleventh Annual Joint Conference of the IEEE Computer and Communications Societies, vol. 1, pp. 170–179.*

Cho et al., "A Flood Routing Method for Data Networks," Sep. 1997, Proceedings of 1997 International Conference on Information, Communications, and Signal Processing, vol. 3, pp. 1418–1422.*

Komine et al., "A Distributed Restoration Algorithm for Multiple–Link and Node Failures of Transport Networks," Dec. 199 Global Telecommunications Conference, 1990, and Exhibition, IEEE, vol. 1, pp. 459–463.*

Peercy et al., "Distributed Algorithms for Shortest–Path, Deadlock–Free Routing and Broadcasting in Arbitrarily Faulty Hypercubes," Jun. 1999, $20^{th}$ International Symposium of Fault–Tolerant Computing, 1990, pp. 218–225.*

Alagar, S. and Venkatesan, S., "Reliable Broadcast in Mobile Wireless Networks," Department of Computer Science, University of Texas at Dallas, Military Communications Conference, 1995, MILCOM '95 Conference Record, IEEE San Diego, California, Nov. 5–8, 1995 (pp. 236–240).

International Search Report for The Boeing Company, International patent application No. PCT/US01/24240, Jun. 5, 2002 (7 pages).

U.S. patent application Ser. No. 09/629,570, Bourassa et al., filed Jul. 31, 2000.

U.S. patent application Ser. No. 09/629,577, Bourassa et al., filed Jul. 31, 2000.

U.S. patent application Ser. No. 09/629,575, Bourassa et al., filed Jul. 31, 2000.

U.S. patent application Ser. No. 09/629,572, Bourassa et al., filed Jul. 31, 2000.

U.S. patent application Ser. No. 09/629,023, Bourassa et al., filed Jul. 31, 2000.

U.S. patent application Ser. No. 09/629,576, Bourassa et al., filed Jul. 31, 2000.

U.S. patent application Ser. No. 09/629,024, Bourassa et al., filed Jul. 31, 2000.

U.S. patent application Ser. No. 09/629,042, Bourassa et al., filed Jul. 31, 2000.

Murphy, Patricia, A., "The Next Generation Networking Paradigm: Producer/Consumer Model," Dedicated Systems Magazine—2000 (pp. 26–28).

The Gamer's Guide, "First–Person Shooters," Oct. 20, 1998 (4 pages).

The O'Reilly Network, "Gnutella: Alive, Well, and Changing Fast," Jan. 25, 2001 (5 pages) http://www.open2p.com/lpt/... [Accessed Jan. 29, 2002].

Oram, Andy, "Gnutella and Freenet Represents True Technological Innovation," May 12, 2000 (7 pages) The O'Reily Network http://www.oreillynet.com/lpt... [Accessed Jan. 29, 2002].

Internetworking Technologies Handbook, Chapter 43 (pp. 43–1–43–16).

Oram, Andy, "Peer–to–Peer Makes the Internet Interesting Again," Sep. 22, 2000 (7 pages) The O'Reilly Network http://linux.oreillynet.com/lpt... [Accessed Jan. 29, 2002].

Monte, Richard, "The Random Walk for Dummies, "MIT Undergraduate Journal of Mathematics (pp. 143–148).

Srinivasan, R., "XDR: External Data Representation Standard," Sun Microsystems, Aug. 1995 (20 pages) Internet RFC/STD/FYI/BCP Archives http://www.faqs.org/rfcs/rfc1832.html [Accessed Jan. 29, 2002].

A Databeam Corporate White Paper, "A Primer on the T.120 Series Standards," Copyright 1995 (pp. 1–16).

Kessler, Gary, C., "An Overview of TCP/IP Protocols and the Internet," Apr. 23, 1999 (23 pages) Hill Assoicates, Inc., http://www.hill.com/library/publications/t... [Accessed Jan. 29, 2002].

Bondy, J.A., and Murty, U.S.R., "Graph Theory with Applications," Chapters 1–3 (pp. 1–47), 1976 American Elsevier Publishing Co., Inc., New York, New York.

Cormen, Thomas H. et al., Introduction to Algorithms, Chapter 5.3 (pp. 84–91), Chapter 12 (pp. 218–243), Chapter 13 (p. 245), 1990, The MIT Press, Cambridge, Massachusetts, McGraw–Hill Book Company, New York.

The Common Object Request Broker: Architecture and Specification, Revision 2.6, Dec. 2001, Chapter 12 (pp. 21–1–12–10), Chapter 12 (pp. 13–1–13–56), Chapter 16 (pp. 16–1–16–26), Chapter 18 (pp. 18–1–18–52), Chapter 20 (pp. 20–1–20–22).

The University of Warwick, Computer Science Open Days, "Demonstration on the Problems of Distributed Systems," http://www.dcs.warwick.ac.u... [Accessed Jan. 29, 2002].

* cited by examiner

INFORMATION DELIVERY SERVICE

CROSS-REFERENCE TO RELATED APPLICATIONS

This application is related to U.S. patent application Ser. No. 09/629,576, entitled "BROADCASTING NETWORK," filed on Jul. 31, 2000; U.S. patent application Ser. No. 09/629,570, entitled "JOINING A BROADCAST CHANNEL," filed on Jul. 31, 2000; U.S. patent application Ser. No. 09/629,577, "LEAVING A BROADCAST CHANNEL," filed on Jul. 31, 2000; U.S. patent application Ser. No. 09/629,575, entitled "BROADCASTING ON A BROADCAST CHANNEL," filed on Jul. 31, 2000; U.S. patent application Ser. No. 09/629,572, entitled "CONTACTING A BROADCAST CHANNEL," filed on Jul. 31, 2000; U.S. patent application Ser. No. 09/629,023, entitled "DISTRIBUTED AUCTION SYSTEM," filed on Jul. 31, 2000; U.S. patent application Ser. No. 09/629,024, entitled "DISTRIBUTED CONFERENCING SYSTEM," filed on Jul. 31, 2000; and U.S. patent application Ser. No. 09/629,042, entitled "DISTRIBUTED GAME ENVIRONMENT," filed on Jul. 31, 2000, the disclosures of which are incorporated herein by reference.

TECHNICAL FIELD

The described technology relates generally to a computer network and more particularly, to a broadcast channel for a subset of a computers of an underlying network.

BACKGROUND

There are a wide variety of computer network communications techniques such as point-to-point network protocols, client/server middleware, multicasting network protocols, and peer-to-peer middleware. Each of these communications techniques have their advantages and disadvantages, but none is particularly well suited to the simultaneous sharing of information among computers that are widely distributed. For example, collaborative processing applications, such as a network meeting programs, have a need to distribute information in a timely manner to all participants who may be geographically distributed.

The point-to-point network protocols, such as UNIX pipes, TCP/IP, and UDP, allow processes on different computers to communicate via point-to-point connections. The interconnection of all participants using point-to-point connections, while theoretically possible, does not scale well as a number of participants grows. For example, each participating process would need to manage its direct connections to all other participating processes. Programmers, however, find it very difficult to manage single connections, and management of multiple connections is much more complex. In addition, participating processes may be limited to the number of direct connections that they can support. This limits the number of possible participants in the sharing of information.

The client/server middleware systems provide a server that coordinates the communications between the various clients who are sharing the information. The server functions as a central authority for controlling access to shared resources. Examples of client/server middleware systems include remote procedure calls ("RPC"), database servers, and the common object request broker architecture ("CORBA"). Client/server middleware systems are not particularly well suited to sharing of information among many participants. In particular, when a client stores information to be shared at the server, each other client would need to poll the server to determine that new information is being shared. Such polling places a very high overhead on the communications network. Alternatively, each client may register a callback with the server, which the server then invokes when new information is available to be shared. Such a callback technique presents a performance bottleneck because a single server needs to call back to each client whenever new information is to be shared. In addition, the reliability of the entire sharing of information depends upon the reliability of the single server. Thus, a failure at a single computer (i.e., the server) would prevent communications between any of the clients.

The multicasting network protocols allow the sending of broadcast messages to multiple recipients of a network. The current implementations of such multicasting network protocols tend to place an unacceptable overhead on the underlying network. For example, UDP multicasting would swamp the Internet when trying to locate all possible participants. IP multicasting has other problems that include needing special-purpose infrastructure (e.g., routers) to support the sharing of information efficiently.

The peer-to-peer middleware communications systems rely on a multicasting network protocol or a graph of point-to-point network protocols. Such peer-to-peer middleware is provided by the T.120 Internet standard, which is used in such products as Data Connection's D.C.-share and Microsoft's NetMeeting. These peer-to-peer middleware systems rely upon a user to assemble a point-to-point graph of the connections used for sharing the information. Thus, it is neither suitable nor desirable to use peer-to-peer middleware systems when more than a small number of participants is desired. In addition, the underlying architecture of the T.120 Internet standard is a tree structure, which relies on the root node of the tree for reliability of the entire network. That is, each message must pass through the root node in order to be received by all participants.

It would be desirable to have a reliable communications network that is suitable for the simultaneous sharing of information among a large number of the processes that are widely distributed.

DETAILED DESCRIPTION

A broadcast technique in which a broadcast channel overlays a point-to-point communications network is provided. The broadcasting of a message over the broadcast channel is effectively a multicast to those computers of the network that are currently connected to the broadcast channel. In one embodiment, the broadcast technique provides a logical broadcast channel to which host computers through their executing processes can be connected. Each computer that is connected to the broadcast channel can broadcast messages onto and receive messages off of the broadcast channel. Each computer that is connected to the broadcast channel receives all messages that are broadcast while it is connected. The logical broadcast channel is implemented using an underlying network system (e.g., the Internet) that allows each computer connected to the underlying network system to send messages to each other connected computer using each computer's address. Thus, the broadcast technique effectively provides a broadcast channel using an underlying network system that sends messages on a point-to-point basis.

The broadcast technique overlays the underlying network system with a graph of point-to-point connections (i.e., edges) between host computers (i.e., nodes) through which the broadcast channel is implemented. In one embodiment, each computer is connected to four other computers, referred to as neighbors. (Actually, a process executing on a computer is connected to four other processes executing on this or four other computers.) To broadcast a message, the originating computer sends the message to each of its neighbors using its point-to-point connections. Each computer that receives the message then sends the message to its three other neighbors using the point-to-point connections. In this way, the message is propagated to each computer using the underlying network to effect the broadcasting of the message to each computer over a logical broadcast channel. A graph in which each node is connected to four other nodes is referred to as a 4-regular graph. The use of a 4-regular graph means that a computer would become disconnected from the broadcast channel only if all four of the connections to its neighbors fail. The graph used by the broadcast technique also has the property that it would take a failure of four computers to divide the graph into disjoint sub-graphs, that is two separate broadcast channels. This property is referred to as being 4-connected. Thus, the graph is both 4-regular and 4-connected.

Figure 1:
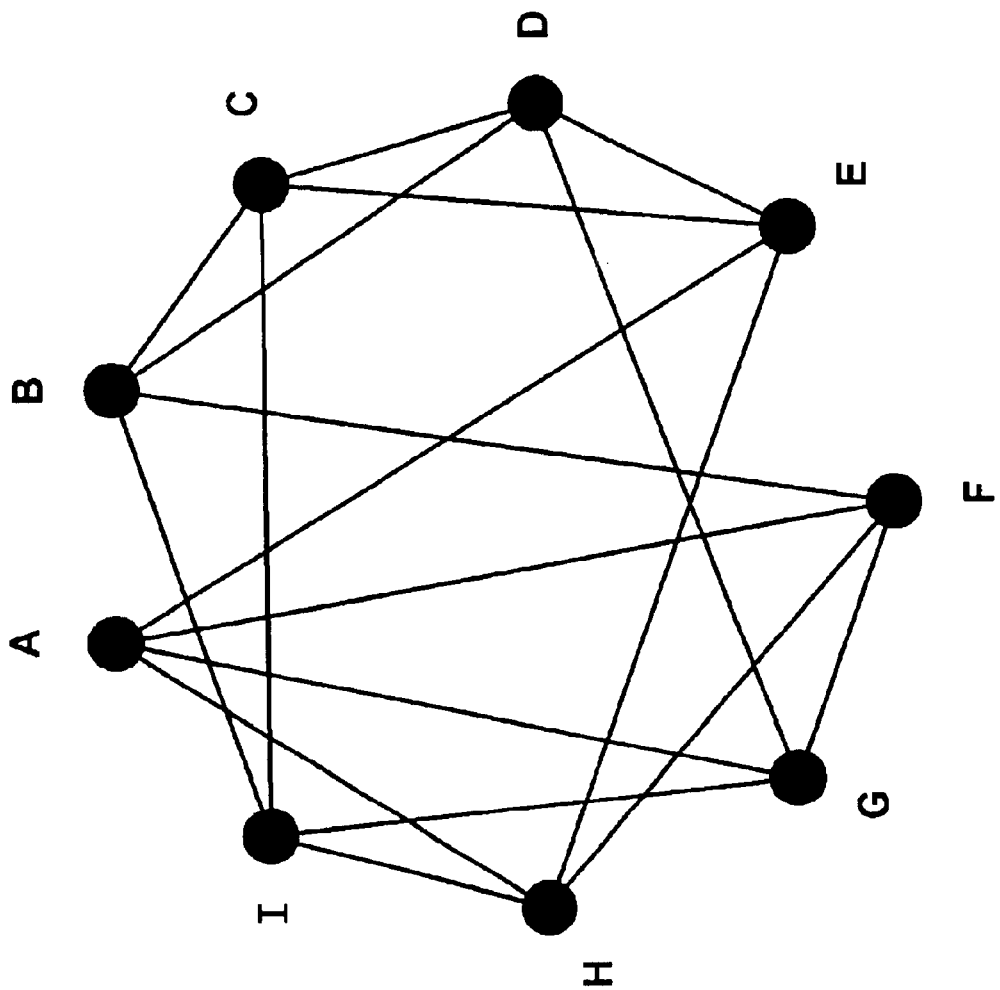
FIG. 1 illustrates a graph that is 4-regular and 4-connected which represents a broadcast channel.
Figure 2:
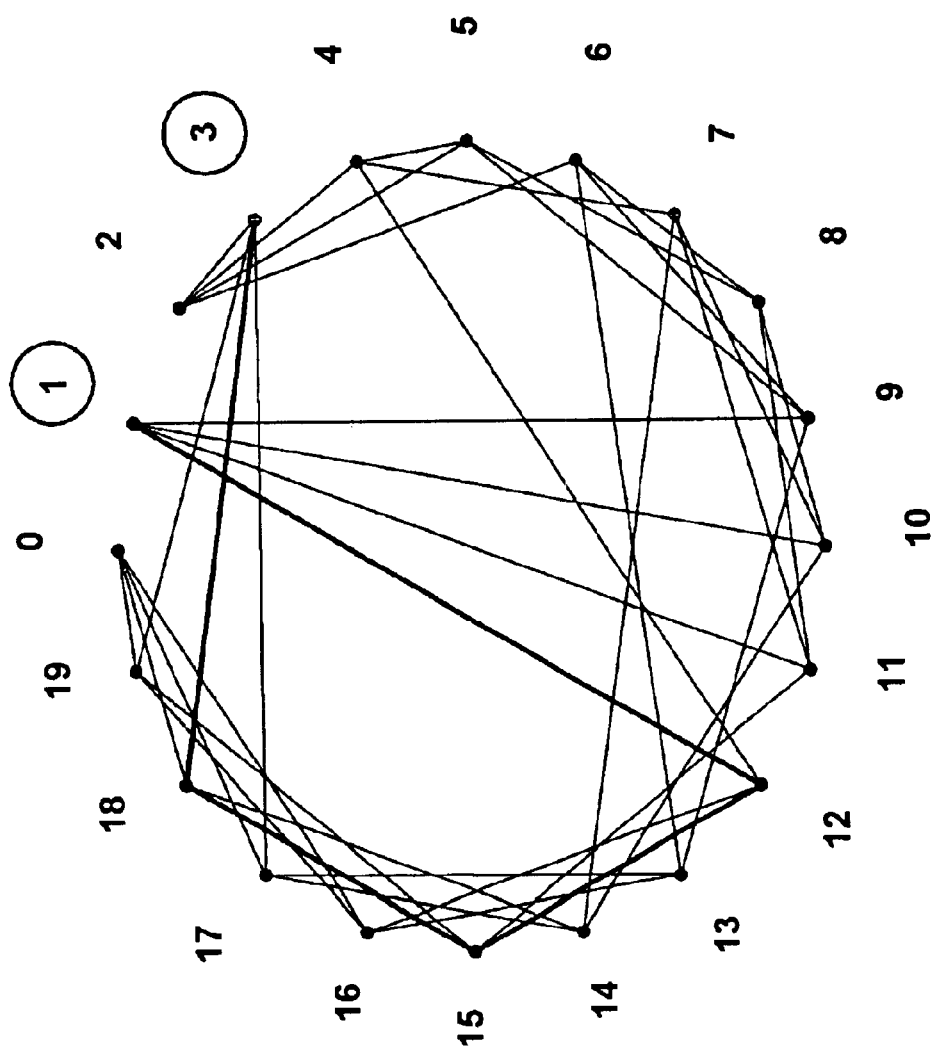
FIG. 2 illustrates a graph representing 20 computers connected to a broadcast channel.

FIG. 1 illustrates a graph that is 4-regular and 4-connected which represents the broadcast channel. Each of the nine nodes A–I represents a computer that is connected to the broadcast channel, and each of the edges represents an "edge" connection between two computers of the broadcast channel. The time it takes to broadcast a message to each computer on the broadcast channel depends on the speed of the connections between the computers and the number of connections between the originating computer and each other computer on the broadcast channel. The minimum number of connections that a message would need to traverse between each pair of computers is the "distance" between the computers (i.e., the shortest path between the two nodes of the graph). For example, the distance between computers A and F is one because computer A is directly connected to computer F. The distance between computers A and B is two because there is no direct connection between computers A and B, but computer F is directly connected to computer B. Thus, a message originating at computer A would be sent directly to computer F, and then sent from computer F to computer B. The maximum of the distances between the computers is the "diameter" of broadcast channel. The diameter of the broadcast channel represented by FIG. 1 is two. That is, a message sent by any computer would traverse no more than two connections to reach every other computer. FIG. 2 illustrates a graph representing 20 computers connected to a broadcast channel. The diameter of this broadcast channel is 4. In particular, the shortest path between computers 1 and 3 contains four connections (1–12, 12–15, 15–18, and 18–3 ).

The broadcast technique includes (1) the connecting of computers to the broadcast channel (i.e., composing the graph), (2) the broadcasting of messages over the broadcast channel (i.e., broadcasting through the graph), and (3) the disconnecting of computers from the broadcast channel (i.e., decomposing the graph) composing the graph.

Composing the Graph

To connect to the broadcast channel, the computer seeking the connection first locates a computer that is currently fully connected to the broadcast channel and then establishes a connection with four of the computers that are already connected to the broadcast channel. (This assumes that there are at least four computers already connected to the broadcast channel. When there are fewer than five computers connected, the broadcast channel cannot be a 4-regular graph. In such a case, the broadcast channel is considered to be in a "small regime." The broadcast technique for the small regime is described below in detail. When five or more computers are connected, the broadcast channel is considered to be in the "large regime." This description assumes that the broadcast channel is in the large regime, unless specified otherwise.) Thus, the process of connecting to the broadcast channel includes locating the broadcast channel, identifying the neighbors for the connecting computer, and then connecting to each identified neighbor. Each computer is aware of one or more "portal computers" through which that computer may locate the broadcast channel. A seeking computer locates the broadcast channel by contacting the portal computers until it finds one that is currently fully connected to the broadcast channel. The found portal computer then directs the identifying of four computers (i.e., to be the seeking computer's neighbors) to which the seeking computer is to connect. Each of these four computers then cooperates with the seeking computer to effect the connecting of the seeking computer to the broadcast channel. A computer that has started the process of locating a portal computer, but does not yet have a neighbor, is in the "seeking connection state." A computer that is connected to at least one neighbor, but not yet four neighbors, is in the "partially connected state." A computer that is currently, or has been, previously connected to four neighbors is in the "fully connected state."

Figure 3B:
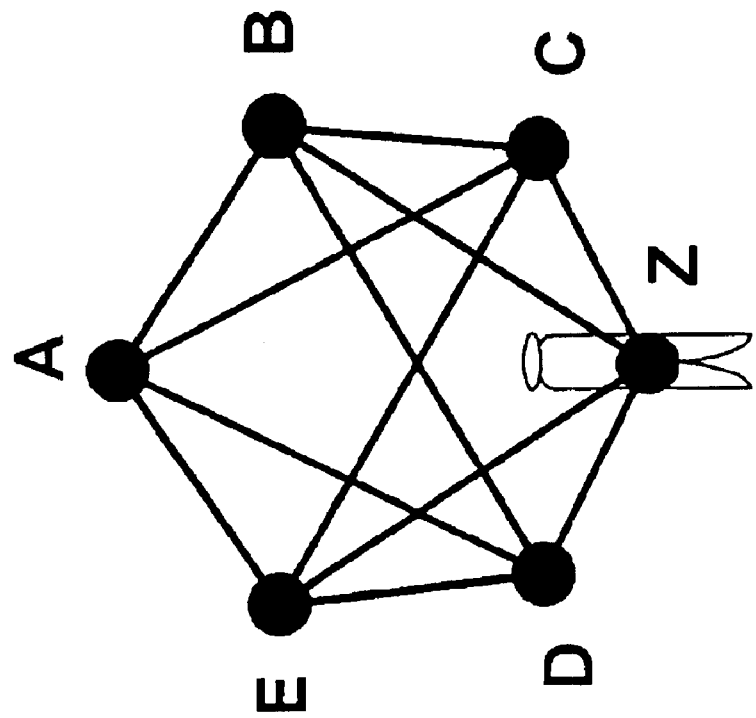
FIGS. 3A and 3B illustrate the process of connecting a new computer Z to the broadcast channel.
Figure 3A:
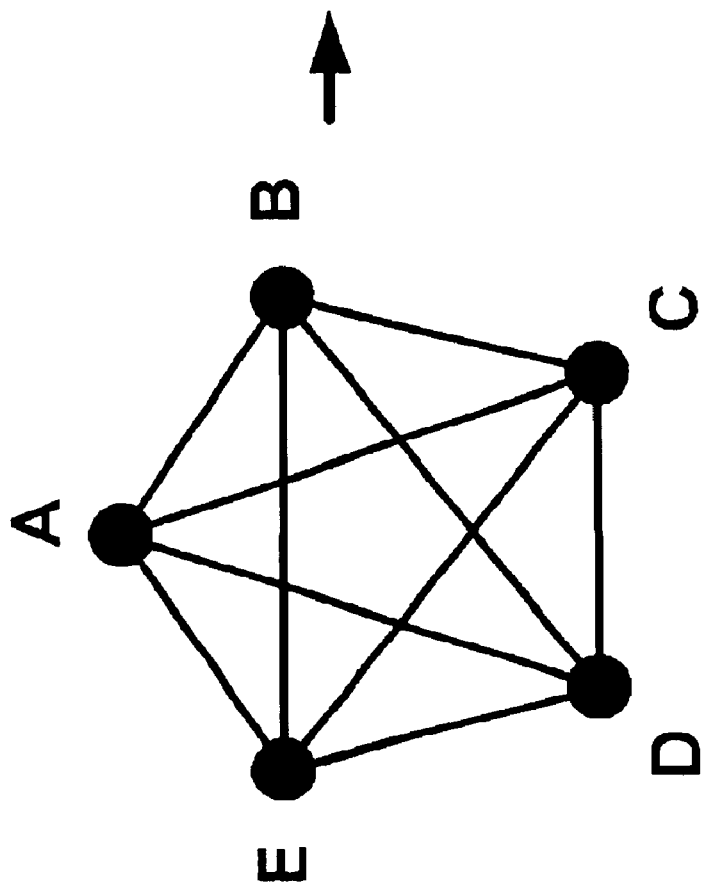

Since the broadcast channel is a 4-regular graph, each of the identified computers is already connected to four computers. Thus, some connections between computers need to be broken so that the seeking computer can connect to four computers. In one embodiment, the broadcast technique identifies two pairs of computers that are currently connected to each other. Each of these pairs of computers breaks the connection between them, and then each of the four computers (two from each pair) connects to the seeking computer. FIGS. 3A and 3B illustrate the process of a new computer Z connecting to the broadcast channel. FIG. 3A illustrates the broadcast channel before computer Z is connected. The pairs of computers B and E and computers C and D are the two pairs that are identified as the neighbors for the new computer Z. The connections between each of these pairs is broken, and a connection between computer Z and each of computers B, C, D, and E is established as indicated by FIG. 3B. The process of breaking the connection between two neighbors and reconnecting each of the former neighbors to another computer is referred to as "edge pinning" as the edge between two nodes may be considered to be stretched and pinned to a new node.

Each computer connected to the broadcast channel allocates five communications ports for communicating with other computers. Four of the ports are referred to as "internal" ports because they are the ports through which the messages of the broadcast channels are sent. The connections between internal ports of neighbors are referred to as "internal" connections. Thus, the internal connections of the broadcast channel form the 4-regular and 4-connected graph. The fifth port is referred to as an "external" port because it is used for sending non-broadcast messages between two computers. Neighbors can send non-broadcast messages either through their internal ports of their connection or through their external ports. A seeking computer uses external ports when locating a portal computer.

In one embodiment, the broadcast technique establishes the computer connections using the TCP/IP communications protocol, which is a point-to-point protocol, as the underlying network. The TCP/IP protocol provides for reliable and ordered delivery of messages between computers. The TCP/IP protocol provides each computer with a "port space" that is shared among all the processes that may execute on that computer. The ports are identified by numbers from 0 to 65,535. The first 2056 ports are reserved for specific applications (e.g., port 80 for HTTP messages). The remainder of the ports are user ports that are available to any process. In one embodiment, a set of port numbers can be reserved for use by the computer connected to the broadcast channel. In an alternative embodiment, the port numbers used are dynamically identified by each computer. Each computer dynamically identifies an available port to be used as its call-in port. This call-in port is used to establish connections with the external port and the internal ports. Each computer that is connected to the broadcast channel can receive non-broadcast messages through its external port. A seeking computer tries "dialing" the port numbers of the portal computers until a portal computer "answers," a call on its call-in port. A portal computer answers when it is connected to or attempting to connect to the broadcast channel and its call-in port is dialed. (In this description, a telephone metaphor is used to describe the connections.) When a computer receives a call on its call-in port, it transfers the call to another port. Thus, the seeking computer actually communicates through that transfer-to port, which is the external port. The call is transferred so that other computers can place calls to that computer via the call-in port. The seeking computer then communicates via that external port to request the portal computer to assist in connecting the seeking computer to the broadcast channel. The seeking computer could identify the call-in port number of a portal computer by successively dialing each port in port number order. As discussed below in detail, the broadcast technique uses a hashing algorithm to select the port number order, which may result in improved performance.

Figure 4A:
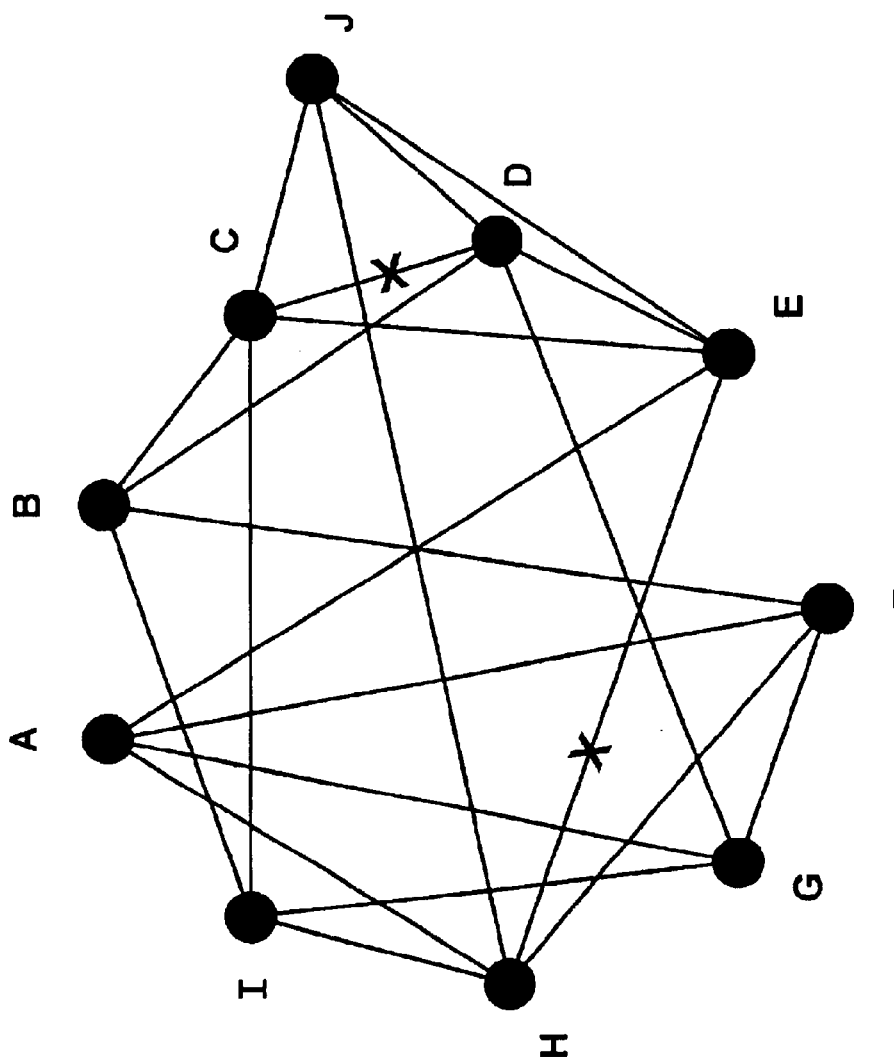
FIG. 4A illustrates the broadcast channel of FIG. 1 with an added computer.
Figure 4B:
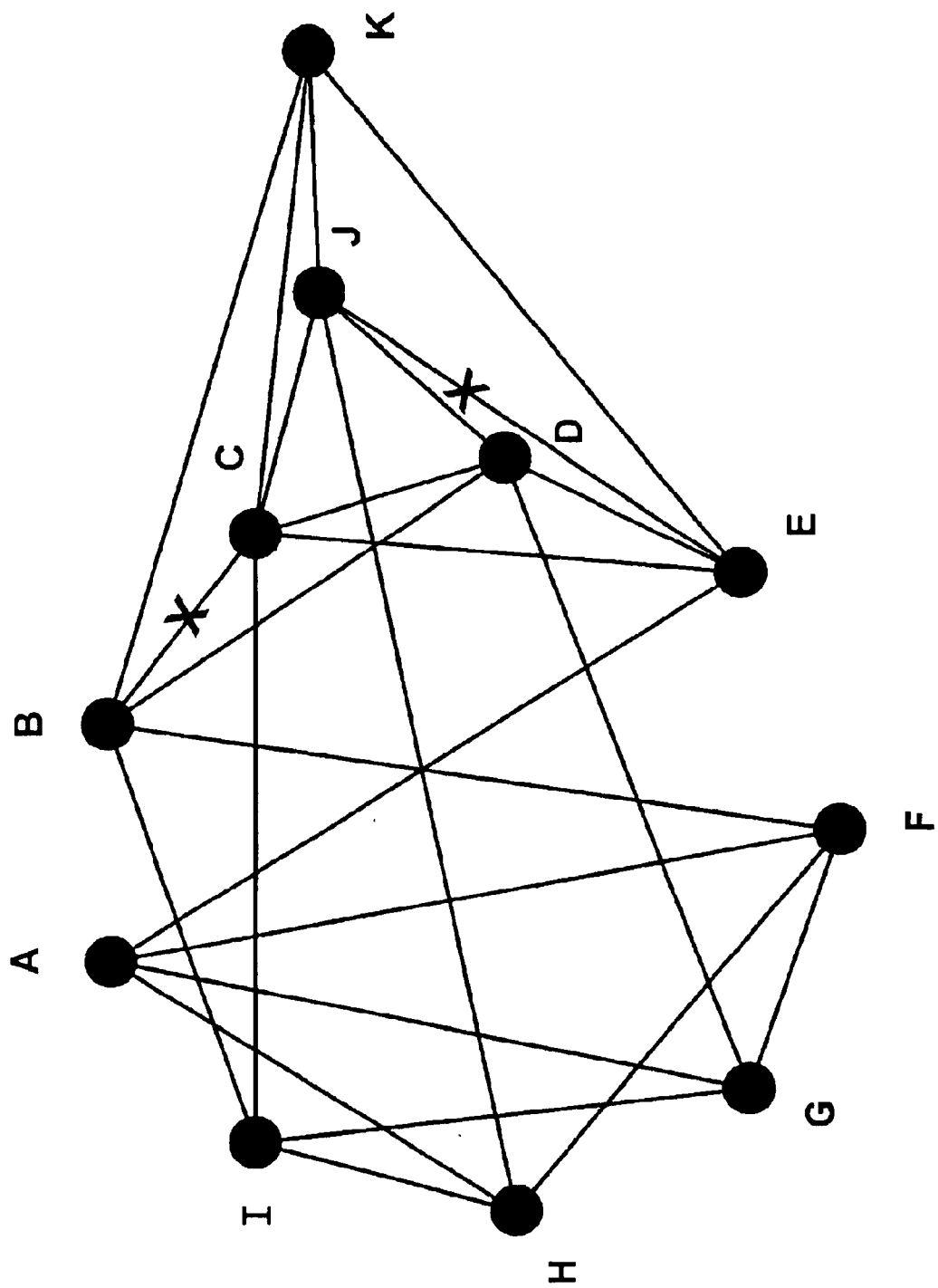
FIG. 4B illustrates the broadcast channel of FIG. 4A with an added computer.
Figure 4C:
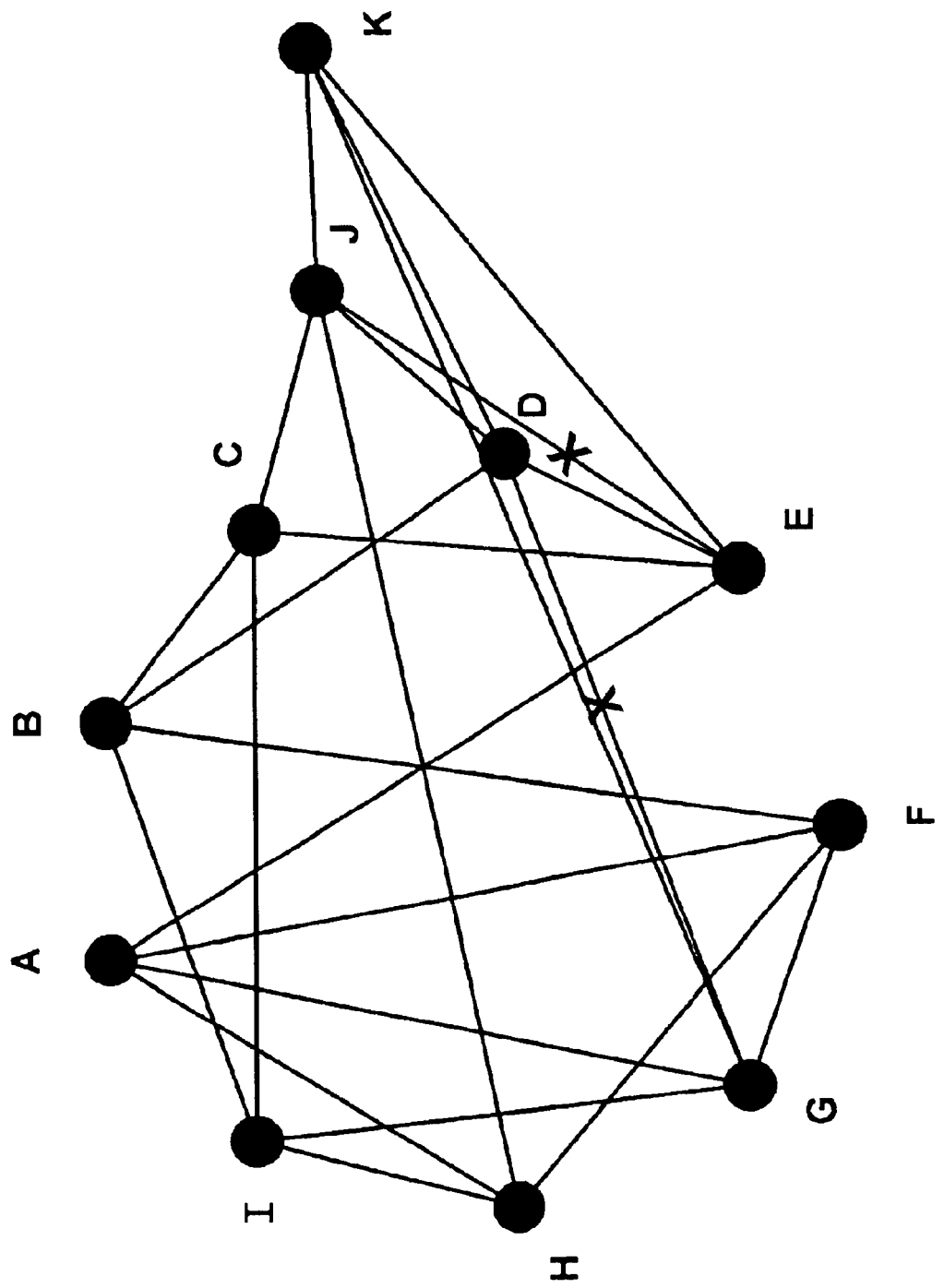
FIG. 4C also illustrates the broadcast channel of FIG. 4A with an added computer.

A seeking computer could connect to the broadcast channel by connecting to computers either directly connected to the found portal computer or directly connected to one of its neighbors. A possible problem with such a scheme for identifying the neighbors for the seeking computer is that the diameter of the broadcast channel may increase when each seeking computer uses the same found portal computer and establishes a connection to the broadcast channel directly through that found portal computer. Conceptually, the graph becomes elongated in the direction of where the new nodes are added. FIGS. 4A–4C illustrate that possible problem. FIG. 4A illustrates the broadcast channel of FIG. 1 with an added computer. Computer J was connected to the broadcast channel by edge pinning edges C–D and E–H to computer J. The diameter of this broadcast channel is still two. FIG. 4B illustrates the broadcast channel of FIG. 4A with an added computer. Computer K was connected to the broadcast channel by edge pinning edges E–J and B–C to computer K. The diameter of this broadcast channel is three, because the shortest path from computer G to computer K is through edges G–A, A–E, and E–K. FIG. 4C also illustrates the broadcast channel of FIG. 4A with an added computer. Computer K was connected to the broadcast channel by edge pinning edges D–G and E–J to computer K. The diameter of this broadcast channel is, however, still two. Thus, the selection of neighbors impacts the diameter of the broadcast channel. To help minimize the diameter, the broadcast technique uses a random selection technique to identify the four neighbors of a computer in the seeking connection state. The random selection technique tends to distribute the connections to new seeking computers throughout the computers of the broadcast channel which may result in smaller overall diameters.

Broadcasting Through the Graph

As described above, each computer that is connected to the broadcast channel can broadcast messages onto the broadcast channel and does receive all messages that are broadcast on the broadcast channel. The computer that originates a message to be broadcast sends that message to each of its four neighbors using the internal connections. When a computer receives a broadcast message from a neighbor, it sends the message to its three other neighbors. Each computer on the broadcast channel, except the originating computer, will thus receive a copy of each broadcast message from each of its four neighbors. Each computer, however, only sends the first copy of the message that it receives to its neighbors and disregards subsequently received copies. Thus, the total number of copies of a message that is sent between the computers is 3N+1, where N is the number of computers connected to the broadcast channel. Each computer sends three copies of the message, except for the originating computer, which sends four copies of the message.

The redundancy of the message sending helps to ensure the overall reliability of the broadcast channel. Since each computer has four connections to the broadcast channel, if one computer fails during the broadcast of a message, its neighbors have three other connections through which they will receive copies of the broadcast message. Also, if the internal connection between two computers is slow, each computer has three other connections through which it may receive a copy of each message sooner.

Each computer that originates a message numbers its own messages sequentially. Because of the dynamic nature of the broadcast channel and because there are many possible connection paths between computers, the messages may be received out of order. For example, the distance between an originating computer and a certain receiving computer may be four. After sending the first message, the originating computer and receiving computer may become neighbors and thus the distance between them changes to one. The first message may have to travel a distance of four to reach the receiving computer. The second message only has to travel a distance of one. Thus, it is possible for the second message to reach the receiving computer before the first message.

When the broadcast channel is in a steady state (i.e., no computers connecting or disconnecting from the broadcast channel), out-of-order messages are not a problem because each computer will eventually receive both messages and can queue messages until all earlier ordered messages are received. If, however, the broadcast channel is not in a steady state, then problems can occur. In particular, a computer may connect to the broadcast channel after the second message has already been received and forwarded on by its new neighbors. When a new neighbor eventually receives the first message, it sends the message to the newly connected computer. Thus, the newly connected computer will receive the first message, but will not receive the second message. If the newly connected computer needs to process the messages in order, it would wait indefinitely for the second message.

One solution to this problem is to have each computer queue all the messages that it receives until it can send them in their proper order to its neighbors. This solution, however, may tend to slow down the propagation of messages through the computers of the broadcast channel. Another solution that may have less impact on the propagation speed is to queue messages only at computers who are neighbors of the newly connected computers. Each already connected neighbor would forward messages as it receives them to its other neighbors who are not newly connected, but not to the newly connected neighbor. The already connected neighbor would only forward messages from each originating computer to the newly connected computer when it can ensure that no gaps in the messages from that originating computer will occur. In one embodiment, the already connected neighbor may track the highest sequence number of the messages already received and forwarded on from each originating computer. The already connected computer will send only higher numbered messages from the originating computers to the newly connected computer. Once all lower numbered messages have been received from all originating computers, then the already connected computer can treat the newly connected computer as its other neighbors and simply forward each message as it is received. In another embodiment, each computer may queue messages and only forwards to the newly connected computer those messages as the gaps are filled in. For example, a computer might receive messages 4 and 5 and then receive message 3. In such a case, the already connected computer would forward queue messages 4 and 5. When message 3 is finally received, the already connected computer will send messages 3, 4, and 5 to the newly connected computer. If messages 4 and 5 were sent to the newly connected computer before message 3, then the newly connected computer would process messages 4 and 5 and disregard message 3. Because the already connected computer queues messages 4 and 5, the newly connected computer will be able to process message 3. It is possible that a newly connected computer will receive a set of messages from an originating computer through one neighbor and then receive another set of message from the same originating computer through another neighbor. If the second set of messages contains a message that is ordered earlier than the messages of the first set received, then the newly connected computer may ignore that earlier ordered message if the computer already processed those later ordered messages.

Decomposing the Graph

Figure 5A:
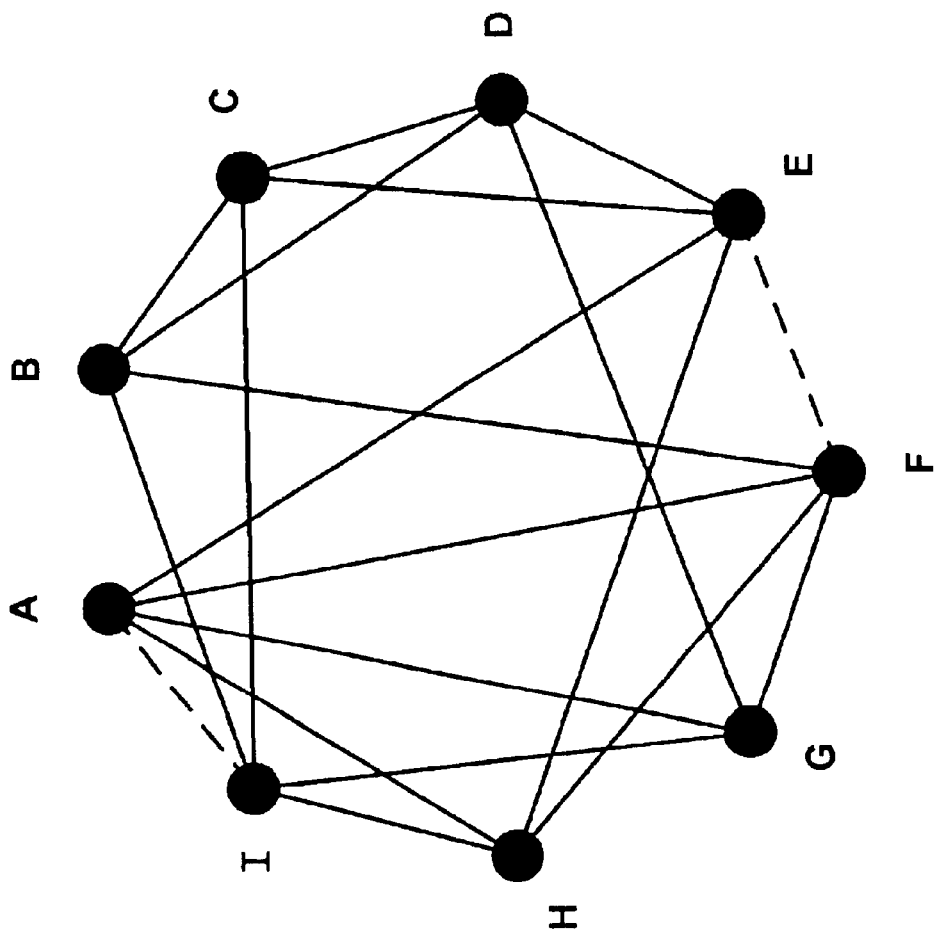
FIG. 5A illustrates the disconnecting of a computer from the broadcast channel in a planned manner.

A connected computer disconnects from the broadcast channel either in a planned or unplanned manner. When a computer disconnects in a planned manner, it sends a disconnect message to each of its four neighbors. The disconnect message includes a list that identifies the four neighbors of the disconnecting computer. When a neighbor receives the disconnect message, it tries to connect to one of the computers on the list. In one embodiment, the first computer in the list will try to connect to the second computer in the list, and the third computer in the list will try to connect to the fourth computer in the list. If a computer cannot connect (e.g, the first and second computers are already connected), then the computers may try connecting in various other combinations. If connections cannot be established, each computer broadcasts a message that it needs to establish a connection with another computer. When a computer with an available internal port receives the message, it can then establish a connection with the computer that broadcast the message. FIGS. 5A–D illustrate the disconnecting of a computer from the broadcast channel. FIG. 5A illustrates the disconnecting of a computer from the broadcast channel in a planned manner. When computer H decides to disconnect, it sends its list of neighbors to each of its neighbors (computers A, E, F and I) and then disconnects from each of its neighbors. When computers A and I receive the message they establish a connection between them as indicated by the dashed line, and similarly for computers E and F.

Figure 5B:
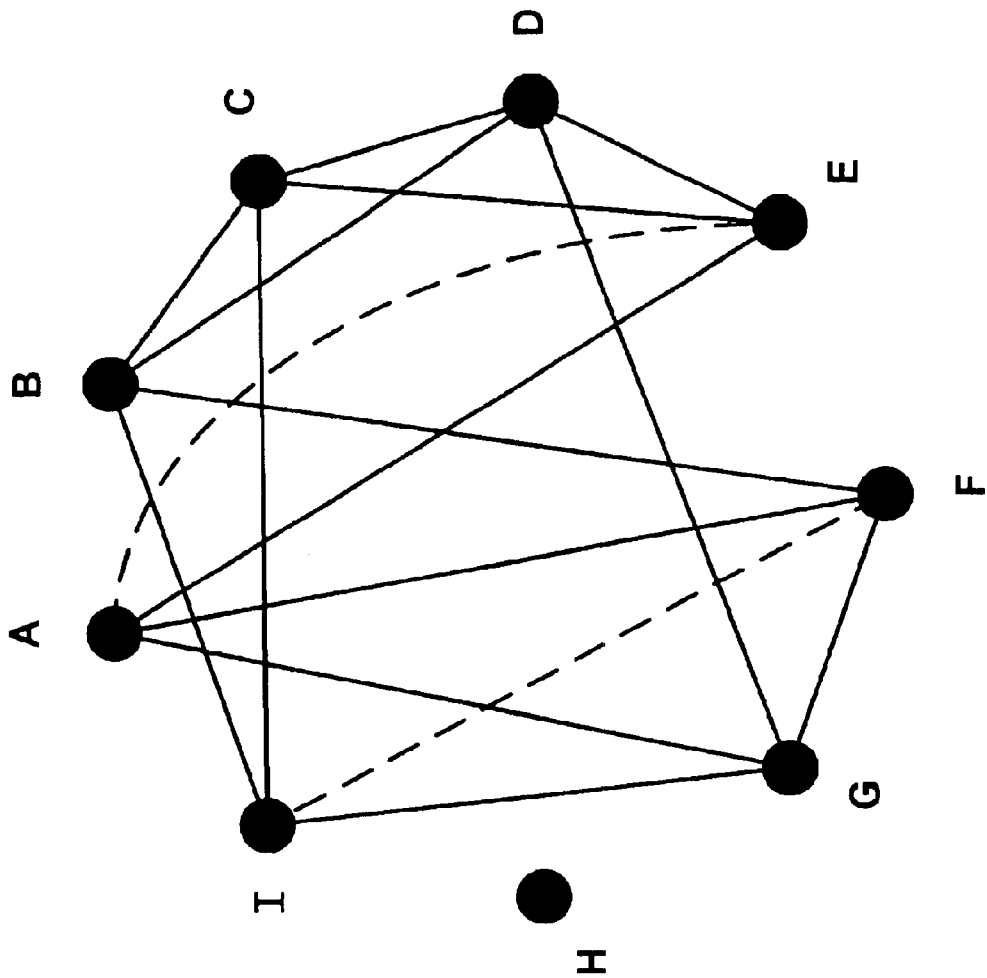
FIG. 5B illustrates the disconnecting of a computer from the broadcast channel in an unplanned manner.

When a computer disconnects in an unplanned manner, such as resulting from a power failure, the neighbors connected to the disconnected computer recognize the disconnection when each attempts to send its next message to the now disconnected computer. Each former neighbor of the disconnected computer recognizes that it is short one connection (i.e., it has a hole or empty port). When a connected computer detects that one of its neighbors is now disconnected, it broadcasts a port connection request on the broadcast channel, which indicates that it has one internal port that needs a connection. The port connection request identifies the call-in port of the requesting computer. When a connected computer that is also short a connection receives the connection request, it communicates with the requesting computer through its external port to establish a connection between the two computers. FIG. 5B illustrates the disconnecting of a computer from the broadcast channel in an unplanned manner. In this illustration, computer H has disconnected in an unplanned manner. When each of its neighbors, computers A, E, F, and I, recognizes the disconnection, each neighbor broadcasts a port connection request indicating that it needs to fill an empty port. As shown by the dashed lines, computers F and I and computers A and E respond to each other's requests and establish a connection.

It is possible that a planned or unplanned disconnection may result in two neighbors each having an empty internal port. In such a case, since they are neighbors, they are already connected and cannot fill their empty ports by connecting to each other. Such a condition is referred to as the "neighbors with empty ports" condition. Each neighbor broadcasts a port connection request when it detects that it has an empty port as described above. When a neighbor receives the port connection request from the other neighbor, it will recognize the condition that its neighbor also has an empty port. Such a condition may also occur when the broadcast channel is in the small regime. The condition can only be corrected when in the large regime. When in the small regime, each computer will have less than four neighbors. To detect this condition in the large regime, which would be a problem if not repaired, the first neighbor to receive the port connection request recognizes the condition and sends a condition check message to the other neighbor. The condition check message includes a list of the neighbors of the sending computer. When the receiving computer receives the list, it compares the list to its own list of neighbors. If the lists are different, then this condition has occurred in the large regime and repair is needed. To repair this condition, the receiving computer will send a condition repair request to one of the neighbors of the sending computer which is not already a neighbor of the receiving computer. When the computer receives the condition repair request, it disconnects from one of its neighbors (other than the neighbor that is involved with the condition) and connects to the computer that sent the condition repair request. Thus, one of the original neighbors involved in the condition will have had a port filled. However, two computers are still in need of a connection, the other original neighbor and the computer that is now disconnected from the computer that received the condition repair request. Those two computers send out port connection requests. If those two computers are not neighbors, then they will connect to each other when they receive the requests. If, however, the two computers are neighbors, then they repeat the condition repair process until two non-neighbors are in need of connections.

It is possible that the two original neighbors with the condition may have the same set of neighbors. When the neighbor that receives the condition check message determines that the sets of neighbors are the same, it sends a condition double check message to one of its neighbors other than the neighbor who also has the condition. When the computer receives the condition double check message, it determines whether it has the same set of neighbors as the sending computer. If so, the broadcast channel is in the small regime and the condition is not a problem. If the set of neighbors are different, then the computer that received the condition double check message sends a condition check message to the original neighbors with the condition. The computer that receives that condition check message directs one of it neighbors to connect to one of the original neighbors with the condition by sending a condition repair message. Thus, one of the original neighbors with the condition will have its port filled.

Figure 5C:
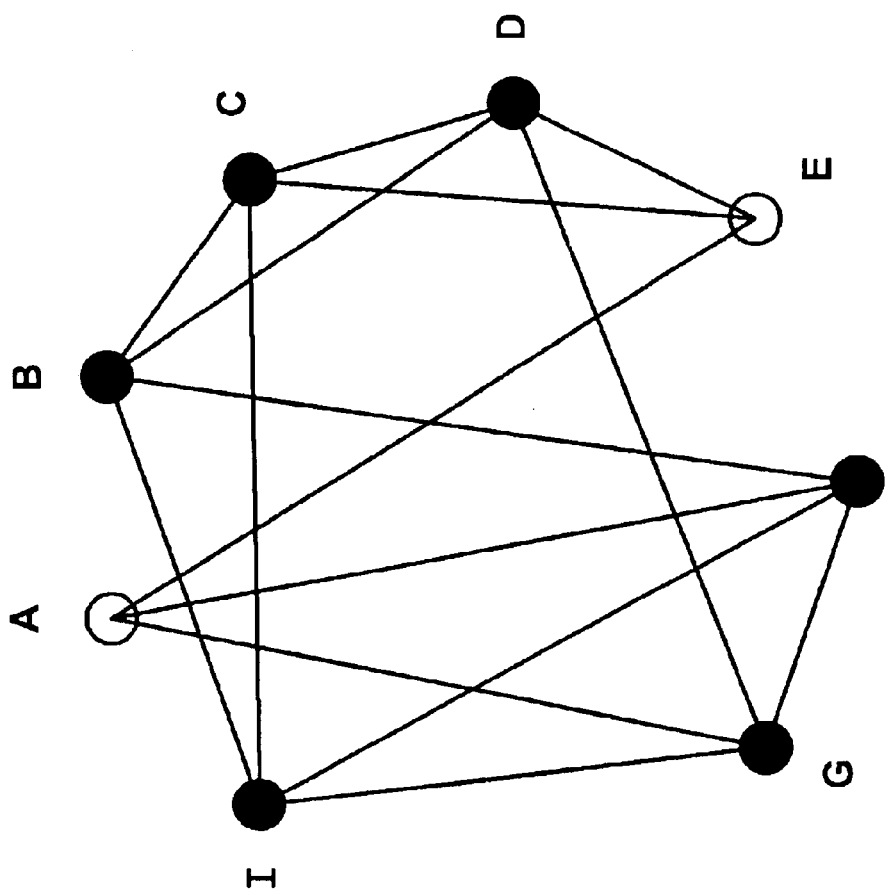
FIG. 5C illustrates the neighbors with empty ports condition.
Figure 5D:
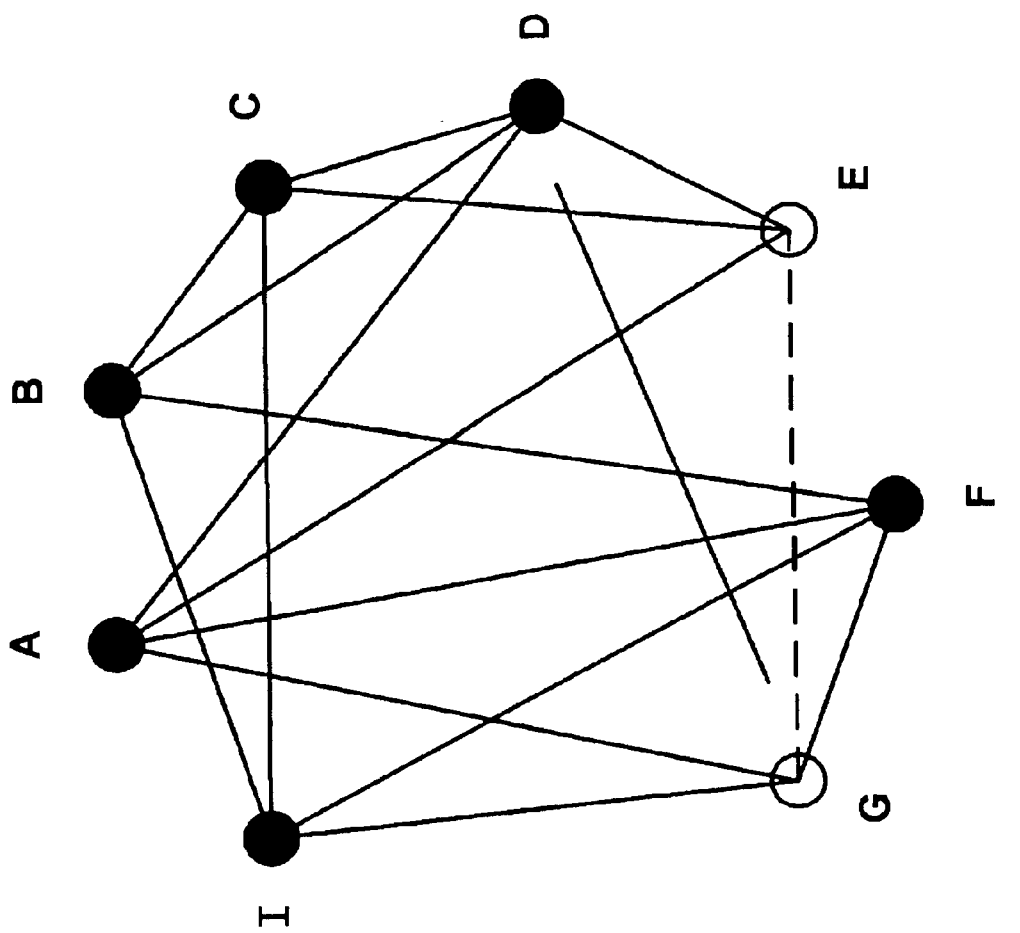
FIG. 5D illustrates two computers that are not neighbors who now have empty ports.

FIG. 5C illustrates the neighbors with empty ports condition. In this illustration, computer H disconnected in an unplanned manner, but computers F and I responded to the port connection request of the other and are now connected together. The other former neighbors of computer H, computers A and E, are already neighbors, which gives rise to the neighbors with empty ports condition. In this example, computer E received the port connection request from computer A, recognized the possible condition, and sent (since they are neighbors via the internal connection) a condition check message with a list of its neighbors to computer A. When computer A received the list, it recognized that computer E has a different set of neighbor (i.e., the broadcast channel is in the large regime). Computer A selected computer D, which is a neighbor of computer E and sent it a condition repair request. When computer D received the condition repair request, it disconnected from one of its neighbors (other than computer E), which is computer G in this example. Computer D then connected to computer A. FIG. 5D illustrates two computers that are not neighbors who now have empty ports. Computers E and G now have empty ports and are not currently neighbors. Therefore, computers E and G can connect to each other.

Figure 5F:
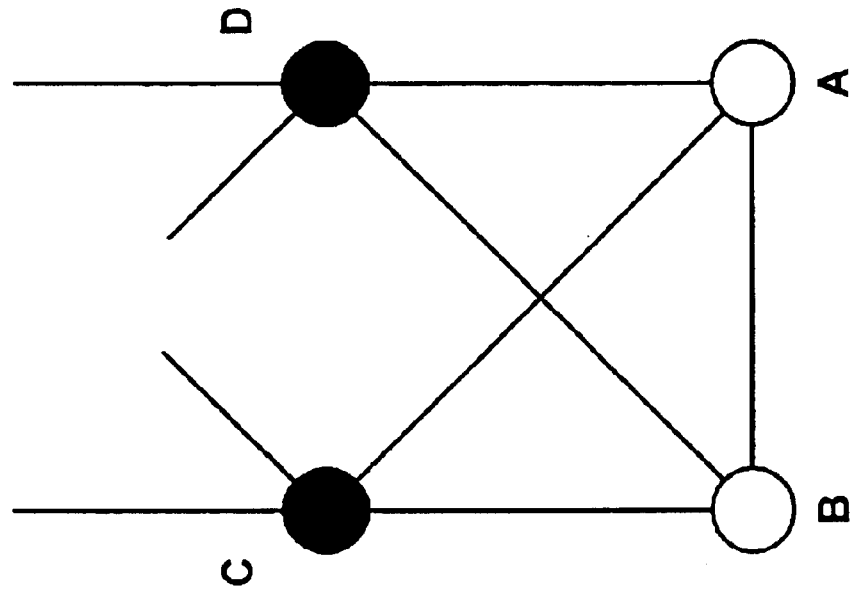
FIG. 5F illustrates the situation of FIG. 5E when in the large regime.
Figure 5E:
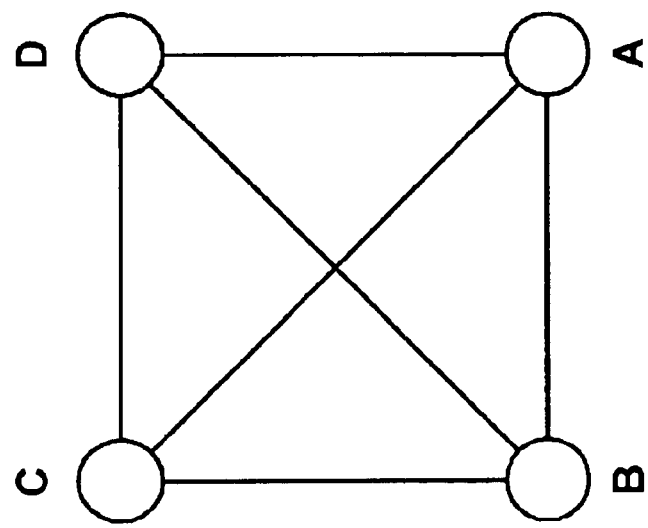
FIG. 5E illustrates the neighbors with empty ports condition in the small regime.

FIGS. 5E and 5F further illustrate the neighbors with empty ports condition. FIG. 5E illustrates the neighbors with empty ports condition in the small regime. In this example, if computer E disconnected in an unplanned manner, then each computer broadcasts a port connection request when it detects the disconnect. When computer A receives the port connection request form computer B, it detects the neighbors with empty ports condition and sends a condition check message to computer B. Computer B recognizes that it has the same set of neighbors (computer C and D) as computer A and then sends a condition double check message to computer C. Computer C recognizes that the broadcast channel is in the small regime because is also has the same set of neighbors as computers A and B, computer C may then broadcast a message indicating that the broadcast channel is in the small regime.

FIG. 5F illustrates the situation of FIG. 5E when in the large regime. As discussed above, computer C receives the condition double check message from computer B. In this case, computer C recognizes that the broadcast channel is in the large regime because it has a set of neighbors that is different from computer B. The edges extending up from computer C and D indicate connections to other computers. Computer C then sends a condition check message to computer B. When computer B receives the condition check message, it sends a condition repair message to one of the neighbors of computer C. The computer that receives the condition repair message disconnects from one of its neighbors, other than computer C, and tries to connect to computer B and the neighbor from which it disconnected tries to connect to computer A.

Port Selection

As described above, the TCP/IP protocol designates ports above number 2056 as user ports. The broadcast technique uses five user port numbers on each computer: one external port and four internal ports. Generally, user ports cannot be statically allocated to an application program because other applications programs executing on the same computer may use conflicting port numbers. As a result, in one embodiment, the computers connected to the broadcast channel dynamically allocate their port numbers. Each computer could simply try to locate the lowest number unused port on that computer and use that port as the call-in port. A seeking computer, however, does not know in advance the call-in port number of the portal computers when the port numbers are dynamically allocated. Thus, a seeking computer needs to dial ports of a portal computer starting with the lowest port number when locating the call-in port of a portal computer. If the portal computer is connected to (or attempting to connect to) the broadcast channel, then the seeking computer would eventually find the call-in port. If the portal computer is not connected, then the seeking computer would eventually dial every user port. In addition, if each application program on a computer tried to allocate low-ordered port numbers, then a portal computer may end up with a high-numbered port for its call-in port because many of the low-ordered port numbers would be used by other application programs. Since the dialing of a port is a relatively slow process, it would take the seeking computer a long time to locate the call-in port of a portal computer. To minimize this time, the broadcast technique uses a port ordering algorithm to identify the port number order that a portal computer should use when finding an available port for its call-in port. In one embodiment, the broadcast technique uses a hashing algorithm to identify the port order. The algorithm preferably distributes the ordering of the port numbers randomly through out the user port number space and only selects each port number once. In addition, every time the algorithm is executed on any computer for a given channel type and channel instance, it generates the same port ordering. As described below, it is possible for a computer to be connected to multiple broadcast channels that are uniquely identified by channel type and channel instance. The algorithm may be "seeded" with channel type and channel instance in order to generate a unique ordering of port numbers for each broadcast channel. Thus, a seeking computer will dial the ports of a portal computer in the same order as the portal computer used when allocating its call-in port.

If many computers are at the same time seeking connection to a broadcast channel through a single portal computer, then the ports of the portal computer may be busy when called by seeking computers. The seeking computers would typically need to keep on redialing a busy port. The process of locating a call-in port may be significantly slowed by such redialing. In one embodiment, each seeking computer may each reorder the first few port numbers generated by the hashing algorithm. For example, each seeking computer could randomly reorder the first eight port numbers generated by the hashing algorithm. The random ordering could also be weighted where the first port number generated by the hashing algorithm would have a 50% chance of being first in the reordering, the second port number would have a 25% chance of being first in the reordering, and so on. Because the seeking computers would use different orderings, the likelihood of finding a busy port is reduced. For example, if the first eight port numbers are randomly selected, then it is possible that eight seeking computers could be simultaneously dialing ports in different sequences which would reduce the chances of dialing a busy port.

Locating a Portal Computer

Each computer that can connect to the broadcast channel has a list of one or more portal computers through which it can connect to the broadcast channel. In one embodiment, each computer has the same set of portal computers. A seeking computer locates a portal computer that is connected to the broadcast channel by successively dialing the ports of each portal computer in the order specified by an algorithm. A seeking computer could select the first portal computer and then dial all its ports until a call-in port of a computer that is fully connected to the broadcast channel is found. If no call-in port is found, then the seeking computer would select the next portal computer and repeat the process until a portal computer with such a call-in port is found. A problem with such a seeking technique is that all user ports of each portal computer are dialed until a portal computer fully connected to the broadcast channel is found. In an alternate embodiment, the seeking computer selects a port number according to the algorithm and then dials each portal computer at that port number. If no acceptable call-in port to the broadcast channel is found, then the seeking computer selects the next port number and repeats the process. Since the call-in ports are likely allocated at lower-ordered port numbers, the seeking computer first dials the port numbers that are most likely to be call-in ports of the broadcast channel. The seeking computers may have a maximum search depth, that is the number of ports that it will dial when seeking a portal computer that is fully connected. If the seeking computer exhausts its search depth, then either the broadcast channel has not yet been established or, if the seeking computer is also a portal computer, it can then establish the broadcast channel with itself as the first fully connected computer.

When a seeking computer locates a portal computer that is itself not fully connected, the two computers do not connect when they first locate each other because the broadcast channel may already be established and accessible through a higher-ordered port number on another portal computer. If the two seeking computers were to connect to each other, then two disjoint broadcast channels would be formed. Each seeking computer can share its experience in trying to locate a portal computer with the other seeking computer. In particular, if one seeking computer has searched all the portal computers to a depth of eight, then the one seeking computer can share that it has searched to a depth of eight with another seeking computer. If that other seeking computer has searched to a depth of, for example, only four, it can skip searching through depths five through eight and that other seeking computer can advance its searching to a depth of nine.

In one embodiment, each computer may have a different set of portal computers and a different maximum search depth. In such a situation, it may be possible that two disjoint broadcast channels are formed because a seeking computer cannot locate a fully connected port computer at a higher depth. Similarly, if the set of portal computers are disjoint, then two separate broadcast channels would be formed.

Identifying Neighbors for a Seeking Computer

As described above, the neighbors of a newly connecting computer are preferably selected randomly from the set of currently connected computers. One advantage of the broadcast channel, however, is that no computer has global knowledge of the broadcast channel. Rather, each computer has local knowledge of itself and its neighbors. This limited local knowledge has the advantage that all the connected computers are peers (as far as the broadcasting is concerned) and the failure of any one computer (actually any three computers when in the 4-regular and 4-connect form) will not cause the broadcast channel to fail. This local knowledge makes it difficult for a portal computer to randomly select four neighbors for a seeking computer.

To select the four computers, a portal computer sends an edge connection request message through one of its internal connections that is randomly selected. The receiving computer again sends the edge connection request message through one of its internal connections that is randomly selected. This sending of the message corresponds to a random walk through the graph that represents the broadcast channel. Eventually, a receiving computer will decide that the message has traveled far enough to represent a randomly selected computer. That receiving computer will offer the internal connection upon which it received the edge connection request message to the seeking computer for edge pinning. Of course, if either of the computers at the end of the offered internal connection are already neighbors of the seeking computer, then the seeking computer cannot connect through that internal connection. The computer that decided that the message has traveled far enough will detect this condition of already being a neighbor and send the message to a randomly selected neighbor.

In one embodiment, the distance that the edge connection request message travels is established by the portal computer to be approximately twice the estimated diameter of the broadcast channel. The message includes an indication of the distance that it is to travel. Each receiving computer decrements that distance to travel before sending the message on. The computer that receives a message with a distance to travel that is zero is considered to be the randomly selected computer. If that randomly selected computer cannot connect to the seeking computer (e.g., because it is already connected to it), then that randomly selected computer forwards the edge connection request to one of its neighbors with a new distance to travel. In one embodiment, the forwarding computer toggles the new distance to travel between zero and one to help prevent two computers from sending the message back and forth between each other.

Because of the local nature of the information maintained by each computer connected to the broadcast channel, the computers need not generally be aware of the diameter of the broadcast channel. In one embodiment, each message sent through the broadcast channel has a distance traveled field. Each computer that forwards a message increments the distance traveled field. Each computer also maintains an estimated diameter of the broadcast channel. When a computer receives a message that has traveled a distance that indicates that the estimated diameter is too small, it updates its estimated diameter and broadcasts an estimated diameter message. When a computer receives an estimated diameter message that indicates a diameter that is larger than its own estimated diameter, it updates its own estimated diameter. This estimated diameter is used to establish the distance that an edge connection request message should travel.

External Data Representation

The computers connected to the broadcast channel may internally store their data in different formats. For example, one computer may use 32-bit integers, and another computer may use 64-bit integers. As another example, one computer may use ASCII to represent text and another computer may use Unicode. To allow communications between heterogeneous computers, the messages sent over the broadcast channel may use the XDR ("External Data Representation") format.

The underlying peer-to-peer communications protocol may send multiple messages in a single message stream. The traditional technique for retrieving messages from a stream has been to repeatedly invoke an operating system routine to retrieve the next message in the stream. The retrieval of each message may require two calls to the operating system: one to retrieve the size of the next message and the other to retrieve the number of bytes indicated by the retrieved size. Such calls to the operating system can, however, be very slow in comparison to the invocations of local routines. To overcome the inefficiencies of such repeated calls, the broadcast technique in one embodiment, uses XDR to identify the message boundaries in a stream of messages. The broadcast technique may request the operating system to provide the next, for example, 1,024 bytes from the stream. The broadcast technique can then repeatedly invoke the XDR routines to retrieve the messages and use the success or failure of each invocation to determine whether another block of 1,024 bytes needs to be retrieved from the operating system. The invocation of XDR routines do not involve system calls and are thus more efficient than repeated system calls.

M-Regular

In the embodiment described above, each fully connected computer has four internal connections. The broadcast technique can be used with other numbers of internal connections. For example, each computer could have 6, 8, or any even number of internal connections. As the number of internal connections increase, the diameter of the broadcast channel tends to decrease, and thus propagation time for a message tends to decrease. The time that it takes to connect a seeking computer to the broadcast channel may, however, increase as the number of internal connections increases. When the number of internal connectors is even, then the broadcast channel can be maintained as m-regular and m-connected (in the steady state). If the number of internal connections is odd, then when the broadcast channel has an odd number of computers connected, one of the computers will have less than that odd number of internal connections. In such a situation, the broadcast network is neither m-regular nor m-connected. When the next computer connects to the broadcast channel, it can again become m-regular and m-connected. Thus, with an odd number of internal connections, the broadcast channel toggles between being and not being m-regular and m-connected.

Components

Figure 6:
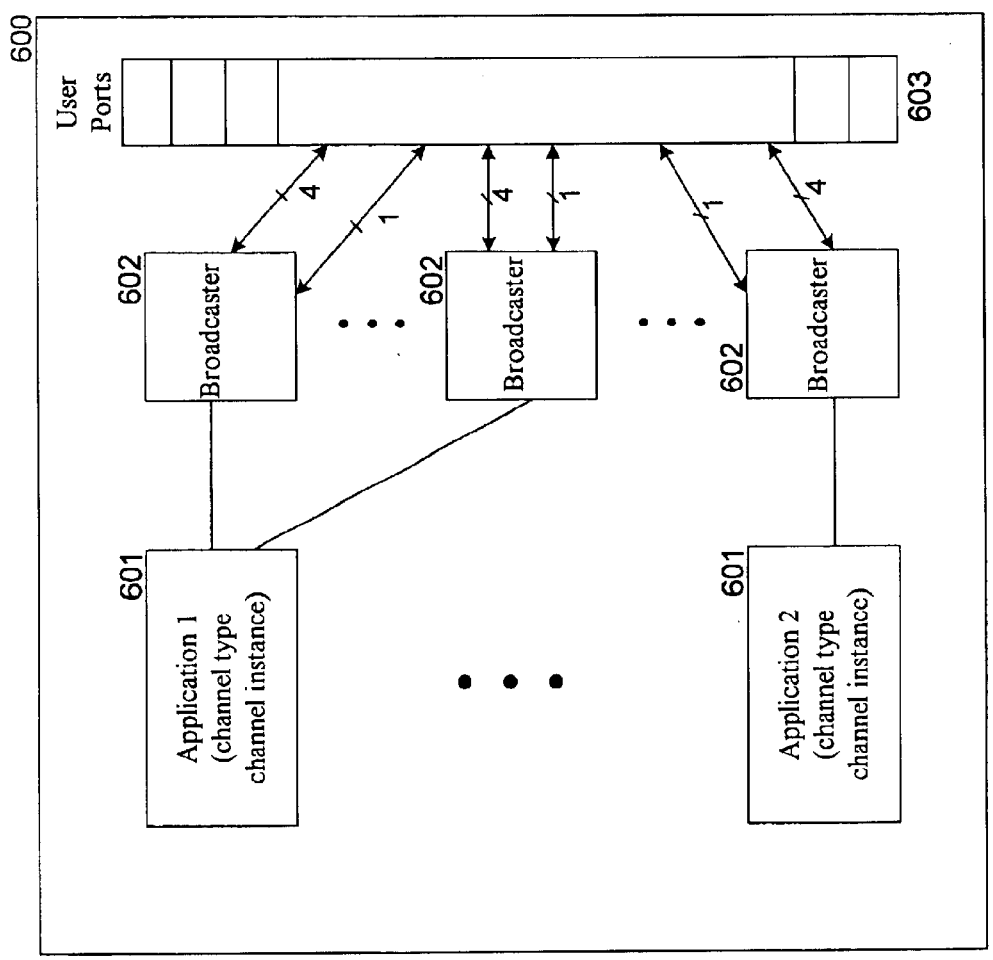
FIG. 6 is a block diagram illustrating components of a computer that is connected to a broadcast channel.

FIG. 6 is a block diagram illustrating components of a computer that is connected to a broadcast channel. The above description generally assumed that there was only one broadcast channel and that each computer had only one connection to that broadcast channel. More generally, a network of computers may have multiple broadcast channels, each computer may be connected to more than one broadcast channel, and each computer can have multiple connections to the same broadcast channel. The broadcast channel is well suited for computer processes (e.g., application programs) that execute collaboratively, such as network meeting programs. Each computer process can connect to one or more broadcast channels. The broadcast channels can be identified by channel type (e.g., application program name) and channel instance that represents separate broadcast channels for that channel type. When a process attempts to connect to a broadcast channel, it seeks a process currently connected to that broadcast channel that is executing on a portal computer. The seeking process identifies the broadcast channel by channel type and channel instance.

Computer 600 includes multiple application programs 601 executing as separate processes. Each application program interfaces with a broadcaster component 602 for each broadcast channel to which it is connected. The broadcaster component may be implement as an object that is instantiated within the process space of the application program. Alternatively, the broadcaster component may execute as a separate process or thread from the application program. In one embodiment, the broadcaster component provides functions (e.g., methods of class) that can be invoked by the application programs. The primary functions provided may include a connect function that an application program invokes passing an indication of the broadcast channel to which the application program wants to connect. The application program may provide a callback routine that the broadcaster component invokes to notify the application program that the connection has been completed, that is the process enters the fully connected state. The broadcaster component may also provide an acquire message function that the application program can invoke to retrieve the next message that is broadcast on the broadcast channel. Alternatively, the application program may provide a callback routine (which may be a virtual function provided by the application program) that the broadcaster component invokes to notify the application program that a broadcast message has been received. Each broadcaster component allocates a call-in port using the hashing algorithm. When calls are answered at the call-in port, they are transferred to other ports that serve as the external and internal ports.

The computers connecting to the broadcast channel may include a central processing unit, memory, input devices (e.g., keyboard and pointing device), output devices (e.g., display devices), and storage devices (e.g., disk drives). The memory and storage devices are computer-readable medium that may contain computer instructions that implement the broadcaster component. In addition, the data structures and message structures may be stored or transmitted via a signal transmitted on a computer-readable media, such as a communications link.

Figure 7:
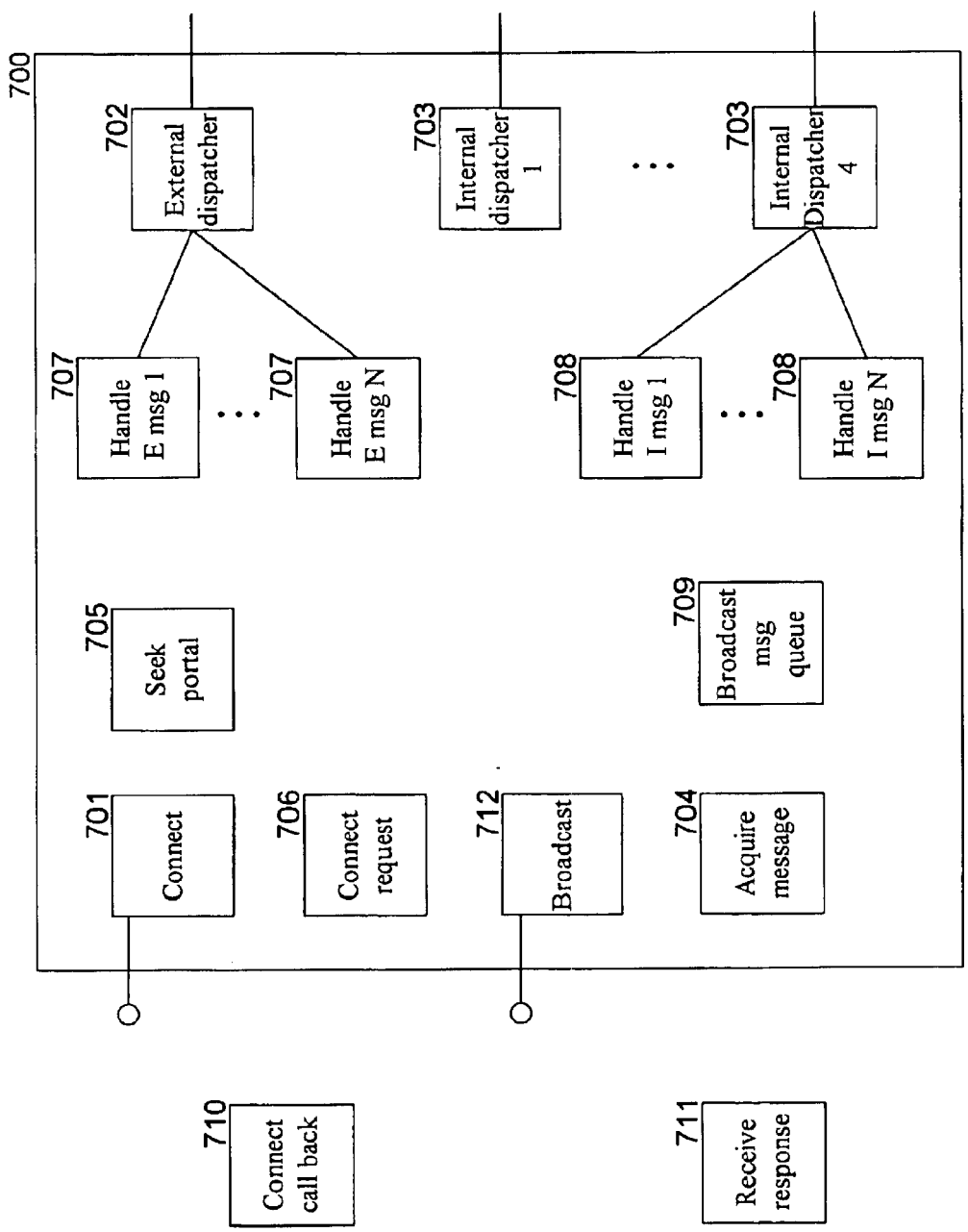
FIG. 7 is a block diagram illustrating the sub-components of the broadcaster component in one embodiment.

FIG. 7 is a block diagram illustrating the sub-components of the broadcaster component in one embodiment. The broadcaster component includes a connect component 701, an external dispatcher 702, an internal dispatcher 703 for each internal connection, an acquire message component 704 and a broadcast component 712. The application program may provide a connect callback component 710 and a receive response component 711 that are invoked by the broadcaster component. The application program invokes the connect component to establish a connection to a designated broadcast channel. The connect component identifies the external port and installs the external dispatcher for handling messages that are received on the external port. The connect component invokes the seek portal computer component 705 to identify a portal computer that is connected to the broadcast channel and invokes the connect request component 706 to ask the portal computer (if fully connected) to select neighbor processes for the newly connecting process. The external dispatcher receives external messages, identifies the type of message, and invokes the appropriate handling routine 707. The internal dispatcher receives the internal messages, identifies the type of message, and invokes the appropriate handling routine 708. The received broadcast messages are stored in the broadcast message queue 709. The acquire message component is invoked to retrieve messages from the broadcast queue. The broadcast component is invoked by the application program to broadcast messages in the broadcast channel.

An Information Delivery Service

In one embodiment, an information delivery service application is implemented using the broadcast channel. The information delivery service allows participants to monitor messages as they are broadcast on the broadcast channel. Each participant may function as a producer of information, as a consumer of information, or both. The producers broadcast messages on the broadcast channel, and consumers receive the broadcast messages. For example, a sports broadcast channel may be used to disseminate the results of sporting events. Certain organizations, such as the National Football League, may be authorized to broadcast results of sporting events on the broadcast channel. The operators of the broadcast channel may sell subscriptions to the broadcast channel to sports enthusiasts. The information delivery service may be used to distribute a broad range of content including news articles, stock prices, weather alerts, medical alerts, traffic reports, and so on.

The information delivery service may provide a directory web site where consumers can locate and subscribe to broadcast channels of interest. The directory may provide a hierarchical organization of topics of the various broadcast channels. When a user decides to subscribe to a broadcast channel, the broadcaster component and information delivery service application program may be downloaded to the user's computer if not already available on the user's computer. Also, the channel type and channel instance associated with that broadcast channel and the identification of the portal computers for that broadcast channel may be downloaded to the subscriber's computer. The information delivery service may also provide a subscriber identifier that may be used by a portal computer to authorize access to or track who has connected to the broadcast channel.

The information delivery service web site may also allow an entity to create new broadcast channels. For example, the NFL may want a broadcast channel dedicated to the dissemination of information under its control. In which case, the entity would interact with the web site to create the broadcast channel. The creation of the broadcast channel would entail the generation of a channel type and channel instance, the specification of security level (e.g., encrypted messages), the specification of subscriber qualifications, and so on.

A user may subscribe to a broadcast channel for an individual topic, which corresponds to a leaf node in the hierarchy, or a user may subscribe to a category of topics, which corresponds to a non-leaf node in the hierarchy. For example, a user may subscribe to a category of sports scores or subscribe to the topic of NFL scores. In one embodiment, each topic would have its own broadcast channel. As a result, the subscribing to a category of topics would mean subscribing to multiple broadcast channels. Alternatively, a category of topics may have a single broadcast channel. If a user subscribes to just one topic in the category, the information delivery service application program executing at the subscriber's computer would simply disregard messages not related to the topic.

Many different fee structures can be used by the information delivery service. A subscriber may be charged a fixed fee per month for subscribing to a topic. Alternatively, a subscriber may be charged based on time actually connected. For example, when a subscriber's computer is connected, it might broadcast an identification message every hour or so. A billing computer could monitor the broadcast and record the connect time based on the identification messages. If the billing computer does not receive an identification message for a certain time period, it assumes that the subscriber's computer has disconnected. Also, the operator of the broadcast channel may derive revenue from advertisements broadcast over the broadcast channel. The fee for advertising on a broadcast channel may vary based on the number of subscribers connected to the broadcast channel at the time the advertisement is broadcast.

The following tables list messages sent by the broadcaster components.

Flow Diagrams

Figure 8:
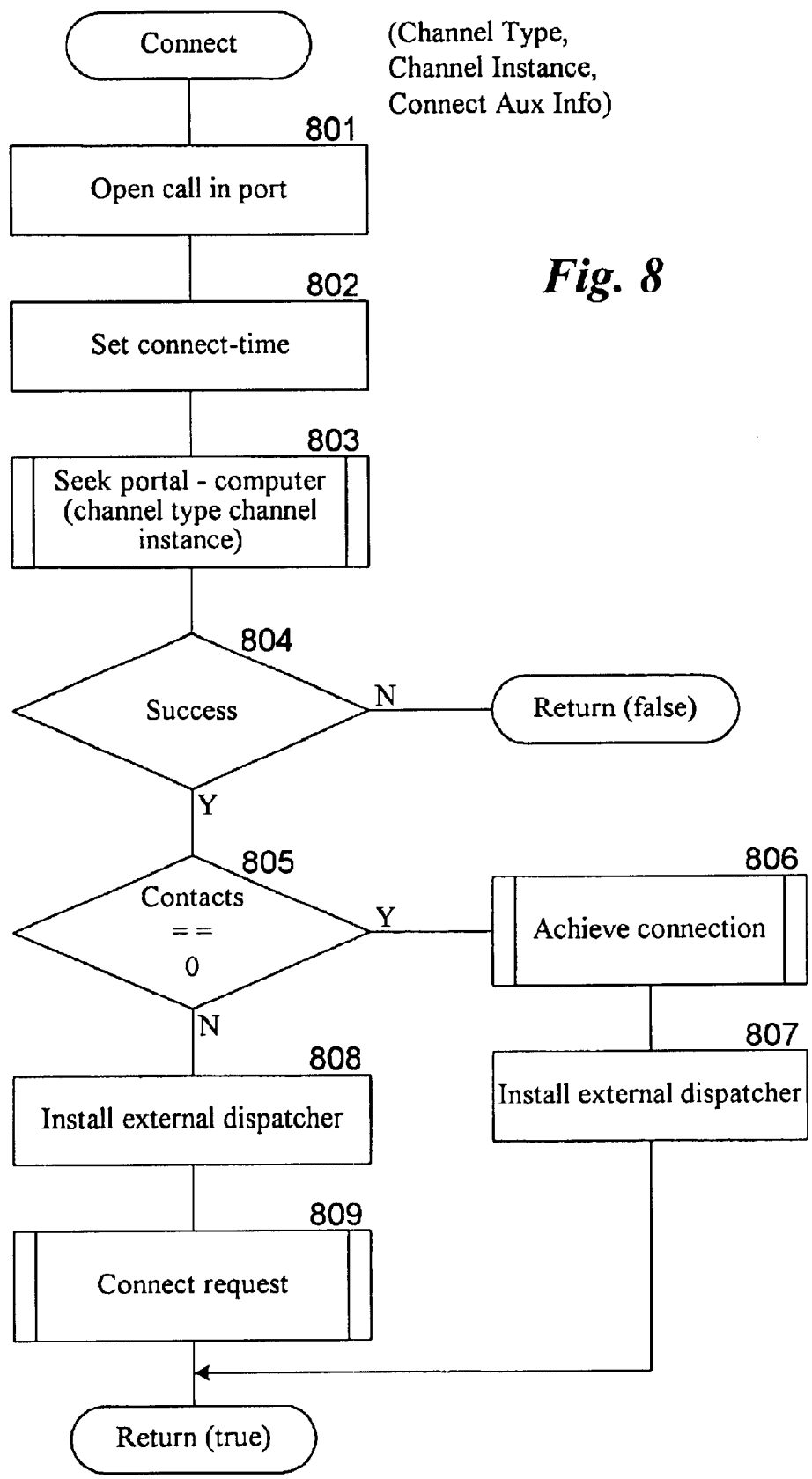
FIG. 8 is a flow diagram illustrating the processing of the connect routine in one embodiment.

FIGS. 8–34 are flow diagrams illustrating the processing of the broadcaster component in one embodiment. FIG. 8 is a flow diagram illustrating the processing of the connect routine in one embodiment. This routine is passed a channel type (e.g., application name) and channel instance (e.g., session identifier), that identifies the broadcast channel to which this process wants to connect. The routine is also passed auxiliary information that includes the list of portal computers and a connection callback routine. When the connection is established, the connection callback routine is invoked to notify the application program. When this process invokes this routine, it is in the seeking connection state. When a portal computer is located that is connected and this routine connects to at least one neighbor, this process enters the partially connected state, and when the process eventually connects to four neighbors, it enters the fully connected state. When in the small regime, a fully connected process may have less than four neighbors. In block 801, the routine opens the call-in port through which the process is to communicate with other processes when establishing external and internal connections. The port is selected as the first available port using the hashing algorithm described above. In block 802, the routine sets the connect time to the current time. The connect time is used to identify the instance of the process that is connected through this external port. One process may connect to a broadcast channel of a certain channel type and channel instance using

| Message Type | Description |
|---|---|
| | EXTERNAL MESSAGES |
| seeking_connection_call | Indicates that a seeking process would like to know whether the receiving process is fully connected to the broadcast channel |
| connection_request_call | Indicates that the sending process would like the receiving process to initiate a connection of the sending process to the broadcast channel |
| edge_proposal_call | Indicates that the sending process is proposing an edge through which the receiving process can connect to the broadcast channel (i.e., edge pinning) |
| port_connection_call | Indicates that the sending process is proposing a port through which the receiving process can connect to the broadcast channel |
| connected_stmt | Indicates that the sending process is connected to the broadcast channel |
| condition_repair_stmt | Indicates that the receiving process should disconnect from one of its neighbors and connect to one of the processes involved in the neighbors with empty port condition |
| | INTERNAL MESSAGES |
| broadcast_stmt | Indicates a message that is being broadcast through the broadcast channel for the application programs |
| connection_port_search_stmt | Indicates that the designated process is looking for a port through which it can connect to the broadcast channel |
| connection_edge_search_call | Indicates that the requesting process is looking for an edge through which it can connect to the broadcast channel |
| connection_edge_search_resp | Indicates whether the edge between this process and the sending neighbor has been accepted by the requesting party |
| diameter_estimate_stmt | Indicates an estimated diameter of the broadcast channel |
| diameter_reset_stmt | Indicates to reset the estimated diameter to indicated diameter |
| disconnect_stmt | Indicates that the sending neighbor is disconnecting from the broadcast channel |
| condition_check_stmt | Indicates that neighbors with empty port condition have been detected |
| condition_double_check_stmt | Indicates that the neighbors with empty ports have the same set of neighbors |
| shutdown_stmt | Indicates that the broadcast channel is being shutdown | one call-in port and then disconnects, and another process may then connect to that same broadcast channel using the same call-in port. Before the other process becomes fully connected, another process may try to communicate with it thinking it is the fully connected old process. In such a case, the connect time can be used to identify this situation. In block 803, the routine invokes the seek portal computer routine passing the channel type and channel instance. The seek portal computer routine attempts to locate a portal computer through which this process can connect to the broadcast channel for the passed type and instance. In decision block 804, if the seek portal computer routine is successful in locating a fully connected process on that portal computer, then the routine continues at block 805, else the routine returns an unsuccessful indication. In decision block 805, if no portal computer other than the portal computer on which the process is executing was located, then this is the first process to fully connect to broadcast channel and the routine continues at block 806, else the routine continues at block 808. In block 806, the routine invokes the achieve connection routine to change the state of this process to fully connected. In block 807, the routine installs the external dispatcher for processing messages received through this process' external port for the passed channel type and channel instance. When a message is received through that external port, the external dispatcher is invoked. The routine then returns. In block 808, the routine installs an external dispatcher. In block 809, the routine invokes the connect request routine to initiate the process of identifying neighbors for the seeking computer. The routine then returns.

Figure 9:
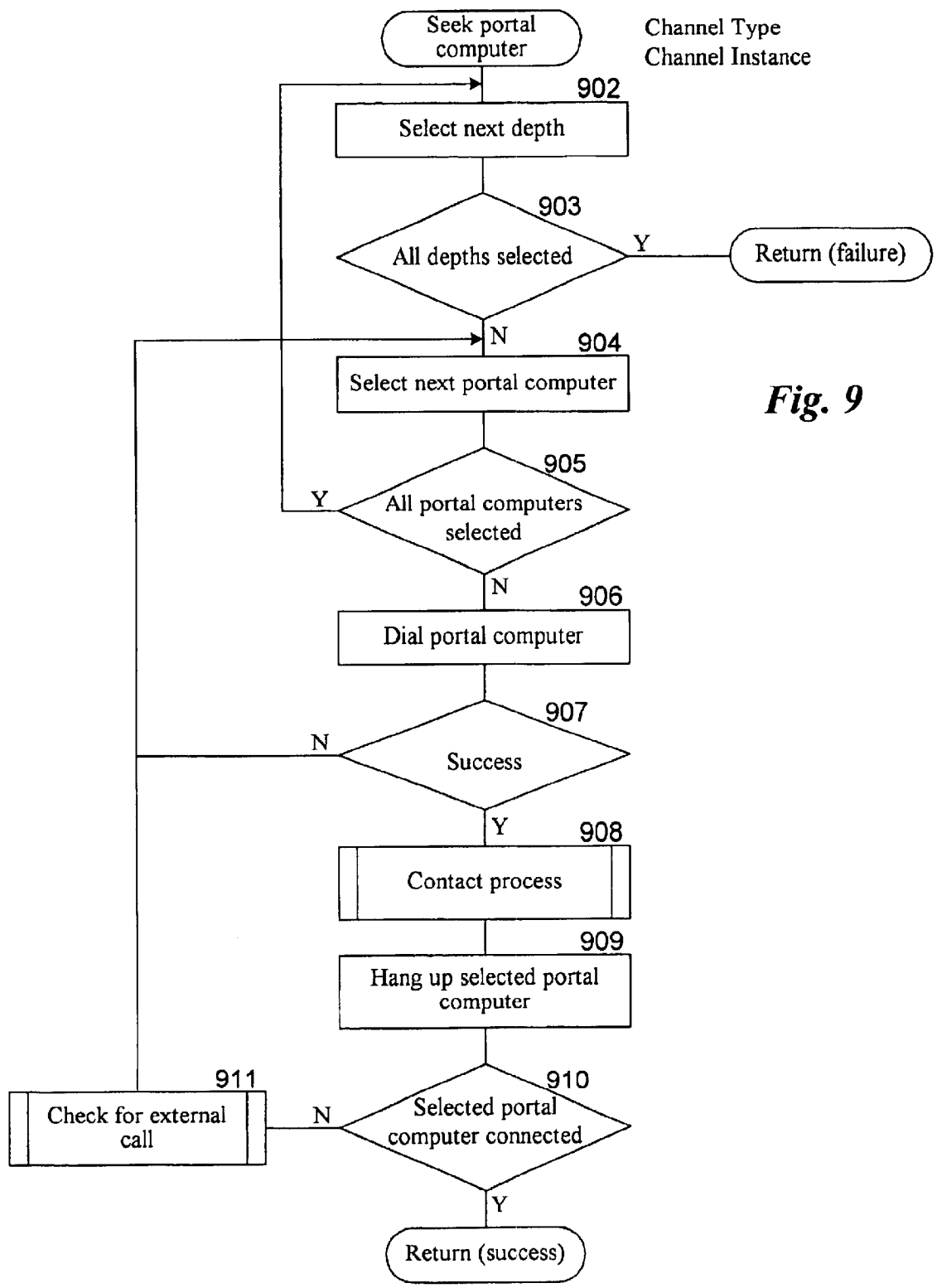
FIG. 9 is a flow diagram illustrating the processing of the seek portal computer routine in one embodiment.

FIG. 9 is a flow diagram illustrating the processing of the seek portal computer routine in one embodiment. This routine is passed the channel type and channel instance of the broadcast channel to which this process wishes to connect. This routine, for each search depth (e.g., port number), checks the portal computers at that search depth. If a portal computer is located at that search depth with a process that is fully connected to the broadcast channel, then the routine returns an indication of success. In blocks 902–911, the routine loops selecting each search depth until a process is located. In block 902, the routine selects the next search depth using a port number ordering algorithm. In decision block 903, if all the search depths have already been selected during this execution of the loop, that is for the currently selected depth, then the routine returns a failure indication, else the routine continues at block 904. In blocks 904–911, the routine loops selecting each portal computer and determining whether a process of that portal computer is connected to (or attempting to connect to) the broadcast channel with the passed channel type and channel instance. In block 904, the routine selects the next portal computer. In decision block 905, if all the portal computers have already been selected, then the routine loops to block 902 to select the next search depth, else the routine continues at block 906. In block 906, the routine dials the selected portal computer through the port represented by the search depth. In decision block 907, if the dialing was successful, then the routine continues at block 908, else the routine loops to block 904 to select the next portal computer. The dialing will be successful if the dialed port is the call-in port of the broadcast channel of the passed channel type and channel instance of a process executing on that portal computer. In block 908, the routine invokes a contact process routine, which contacts the answering process of the portal computer through the dialed port and determines whether that process is fully connected to the broadcast channel. In block 909, the routine hangs up on the selected portal computer. In decision block 910, if the answering process is fully connected to the broadcast channel, then the routine returns a success indicator, else the routine continues at block 911. In block 911, the routine invokes the check for external call routine to determine whether an external call has been made to this process as a portal computer and processes that call. The routine then loops to block 904 to select the next portal computer.

Figure 10:
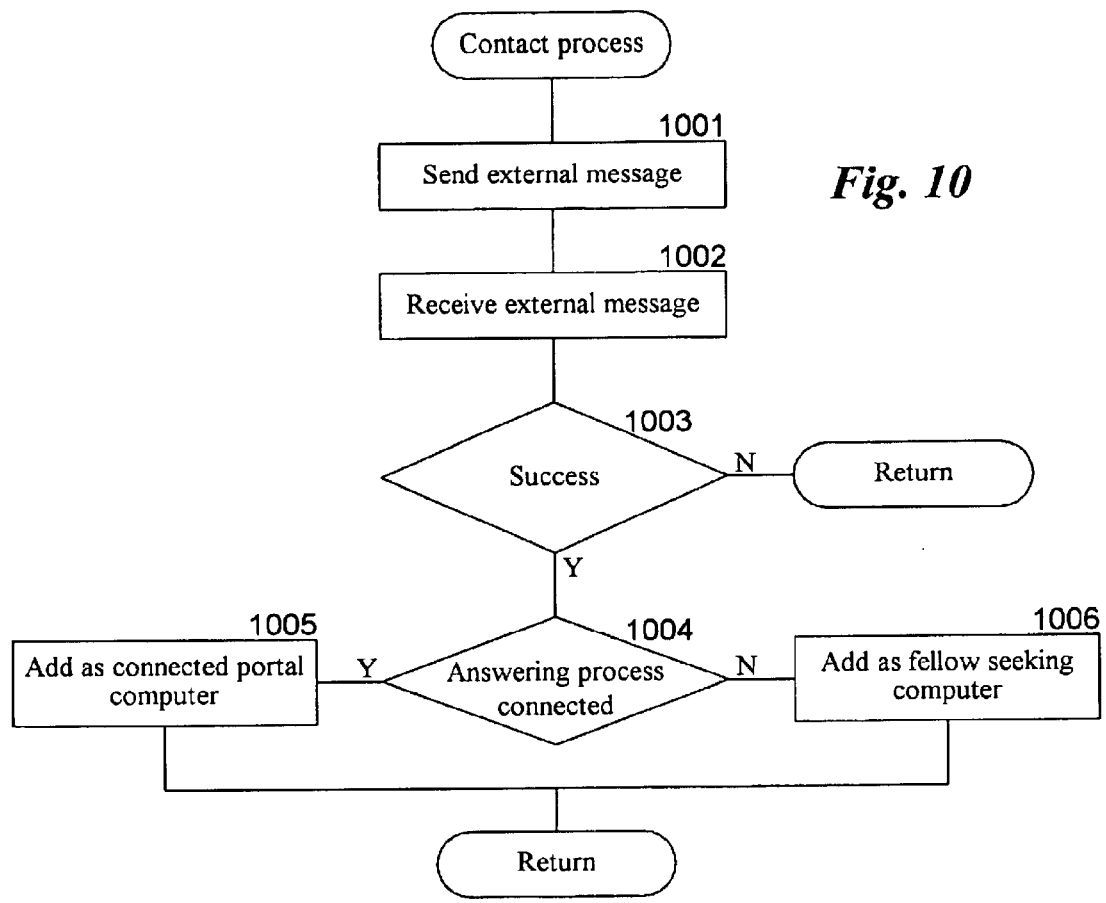
FIG. 10 is a flow diagram illustrating the processing of the contact process routine in one embodiment.

FIG. 10 is a flow diagram illustrating the processing of the contact process routine in one embodiment. This routine determines whether the process of the selected portal computer that answered the call-in to the selected port is fully connected to the broadcast channel. In block 1001, the routine sends an external message (i.e., seeking_connection_call) to the answering process indicating that a seeking process wants to know whether the answering process is fully connected to the broadcast channel. In block 1002, the routine receives the external response message from the answering process. In decision block 1003, if the external response message is successfully received (i.e., seeking_connection_resp), then the routine continues at block 1004, else the routine returns. Wherever the broadcast component requests to receive an external message, it sets a time out period. If the external message is not received within that time out period, the broadcaster component checks its own call-in port to see if another process is calling it. In particular, the dialed process may be calling the dialing process, which may result in a deadlock situation. The broadcaster component may repeat the receive request several times. If the expected message is not received, then the broadcaster component handles the error as appropriate. In decision block 1004, if the answering process indicates in its response message that it is fully connected to the broadcast channel, then the routine continues at block 1005, else the routine continues at block 1006. In block 1005, the routine adds the selected portal computer to a list of connected portal computers and then returns. In block 1006, the routine adds the answering process to a list of fellow seeking processes and then returns.

Figure 11:
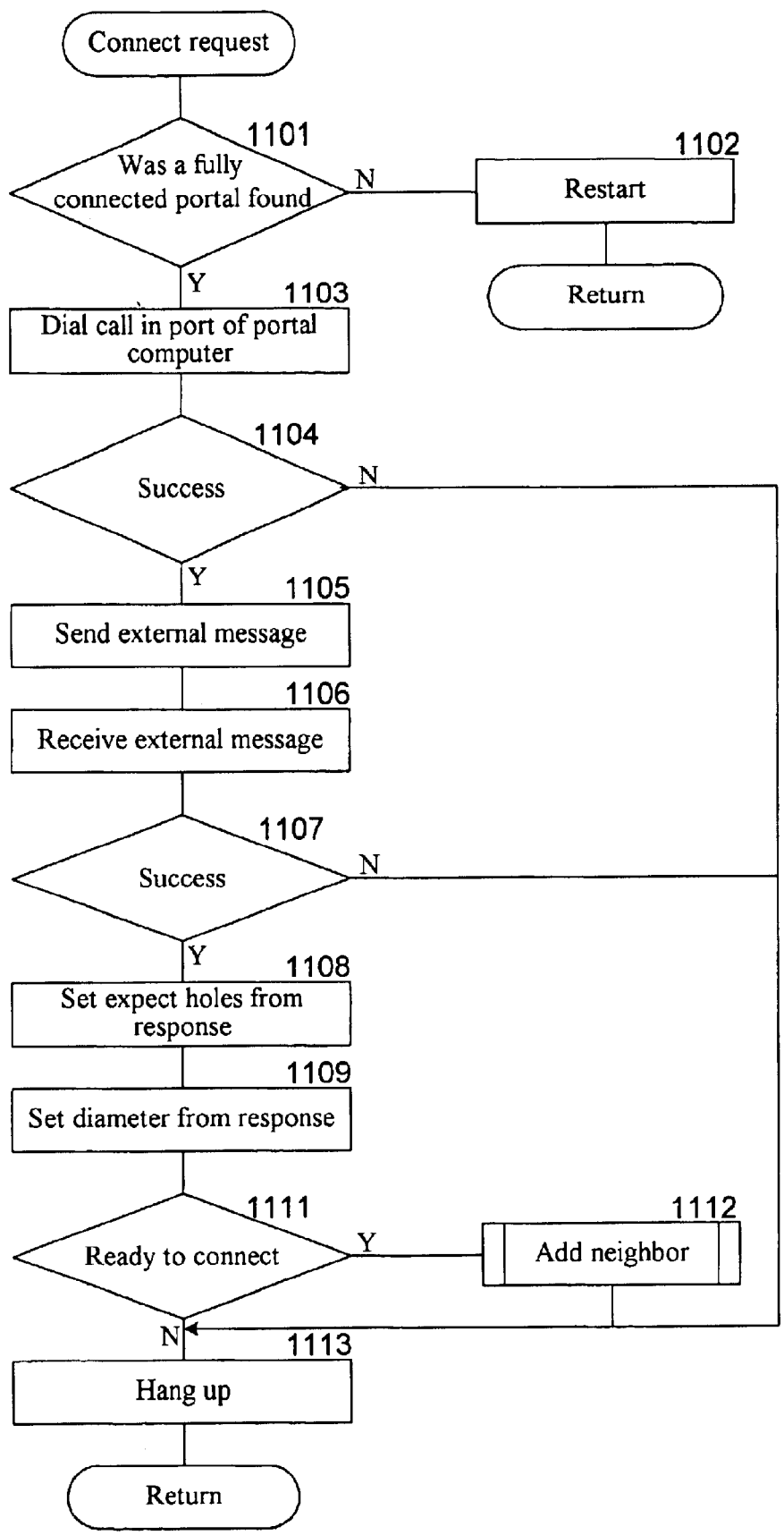
FIG. 11 is a flow diagram illustrating the processing of the connect request routine in one embodiment.

FIG. 11 is a flow diagram illustrating the processing of the connect request routine in one embodiment. This routine requests a process of a portal computer that was identified as being fully connected to the broadcast channel to initiate the connection of this process to the broadcast channel. In decision block 1101, if at least one process of a portal computer was located that is fully connected to the broadcast channel, then the routine continues at block 1103, else the routine continues at block 1102. A process of the portal computer may no longer be in the list if it recently disconnected from the broadcast channel. In one embodiment, a seeking computer may always search its entire search depth and find multiple portal computers through which it can connect to the broadcast channel. In block 1102, the routine restarts the process of connecting to the broadcast channel and returns. In block 1103, the routine dials the process of one of the found portal computers through the call-in port. In decision block 1104, if the dialing is successful, then the routine continues at block 1105, else the routine continues at block 1113. The dialing may be unsuccessful if, for example, the dialed process recently disconnected from the broadcast channel. In block 1105, the routine sends an external message to the dialed process requesting a connection to the broadcast channel (i.e., connection_request_call). In block 1106, the routine receives the response message (i.e., connection_request_resp). In decision block 1107, if the response message is successfully received, then the routine continues at block 1108, else the routine continues at block 1113. In block 1108, the routine sets the expected number of holes (i.e., empty internal connections) for this process based on the received response. When in the large regime, the expected number of holes is zero. When in the small regime, the expected number of holes varies from one to three. In block 1109, the routine sets the estimated diameter of the broadcast channel based on the received response. In decision block 1111, if the dialed process is ready to connect to this process as indicated by the response message, then the routine continues at block 1112, else the routine continues at block 1113. In block 1112, the routine invokes the add neighbor routine to add the answering process as a neighbor to this process. This adding of the answering process typically occurs when the broadcast channel is in the small regime. When in the large regime, the random walk search for a neighbor is performed. In block 1113, the routine hangs up the external connection with the answering process computer and then returns.

Figure 12:
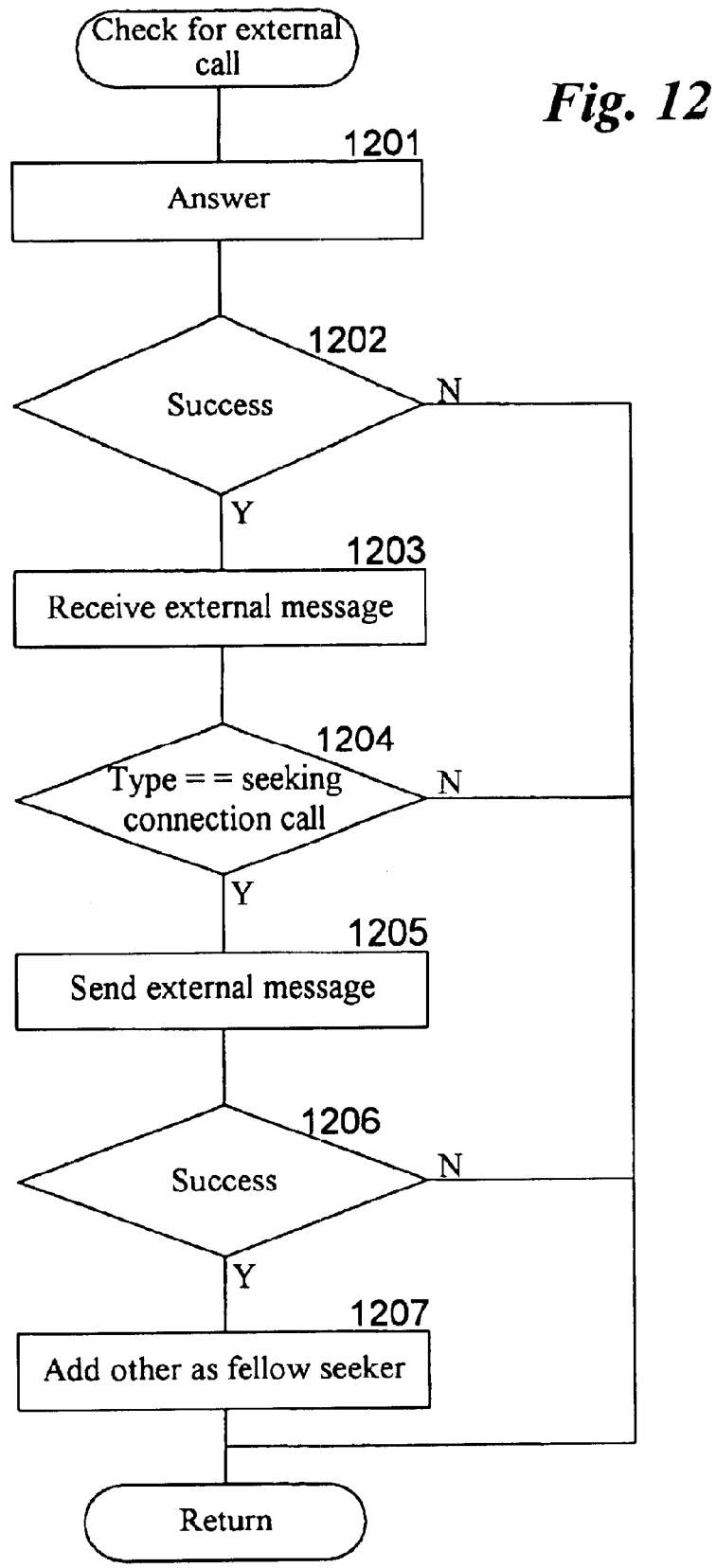
FIG. 12 is a flow diagram of the processing of the check for external call routine in one embodiment.

FIG. 12 is a flow diagram of the processing of the check for external call routine in one embodiment. This routine is invoked to identify whether a fellow seeking process is attempting to establish a connection to the broadcast channel through this process. In block 1201, the routine attempts to answer a call on the call-in port. In decision block 1202, if the answer is successful, then the routine continues at block 1203, else the routine returns. In block 1203, the routine receives the external message from the external port. In decision block 1204, if the type of the message indicates that a seeking process is calling (i.e., seeking_connection_call), then the routine continues at block 1205, else the routine returns. In block 1205, the routine sends an external message (i.e., seeking_connection_resp) to the other seeking process indicating that this process is also is seeking a connection. In decision block 1206, if the sending of the external message is successful, then the routine continues at block 1207, else the routine returns. In block 1207, the routine adds the other seeking process to a list of fellow seeking processes and then returns. This list may be used if this process can find no process that is fully connected to the broadcast channel. In which case, this process may check to see if any fellow seeking process were successful in connecting to the broadcast channel. For example, a fellow seeking process may become the first process fully connected to the broadcast channel.

Figure 13:
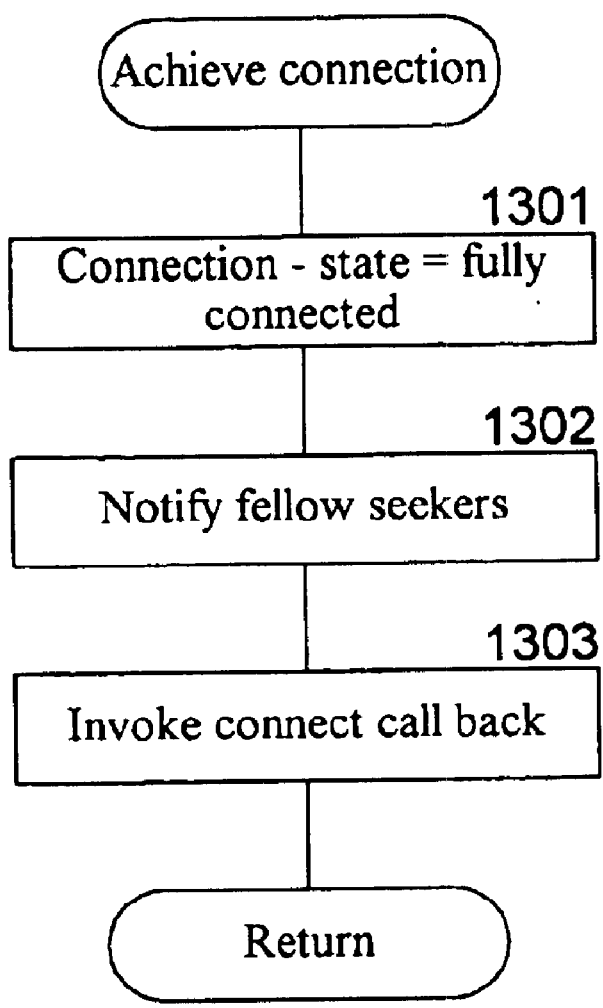
FIG. 13 is a flow diagram of the processing of the achieve connection routine in one embodiment.

FIG. 13 is a flow diagram of the processing of the achieve connection routine in one embodiment. This routine sets the state of this process to fully connected to the broadcast channel and invokes a callback routine to notify the application program that the process is now fully connected to the requested broadcast channel. In block 1301, the routine sets the connection state of this process to fully connected. In block 1302, the routine notifies fellow seeking processes that it is fully connected by sending a connected external message to them (i.e., connected_stint). In block 1303, the routine invokes the connect callback routine to notify the application program and then returns.

Figure 14:
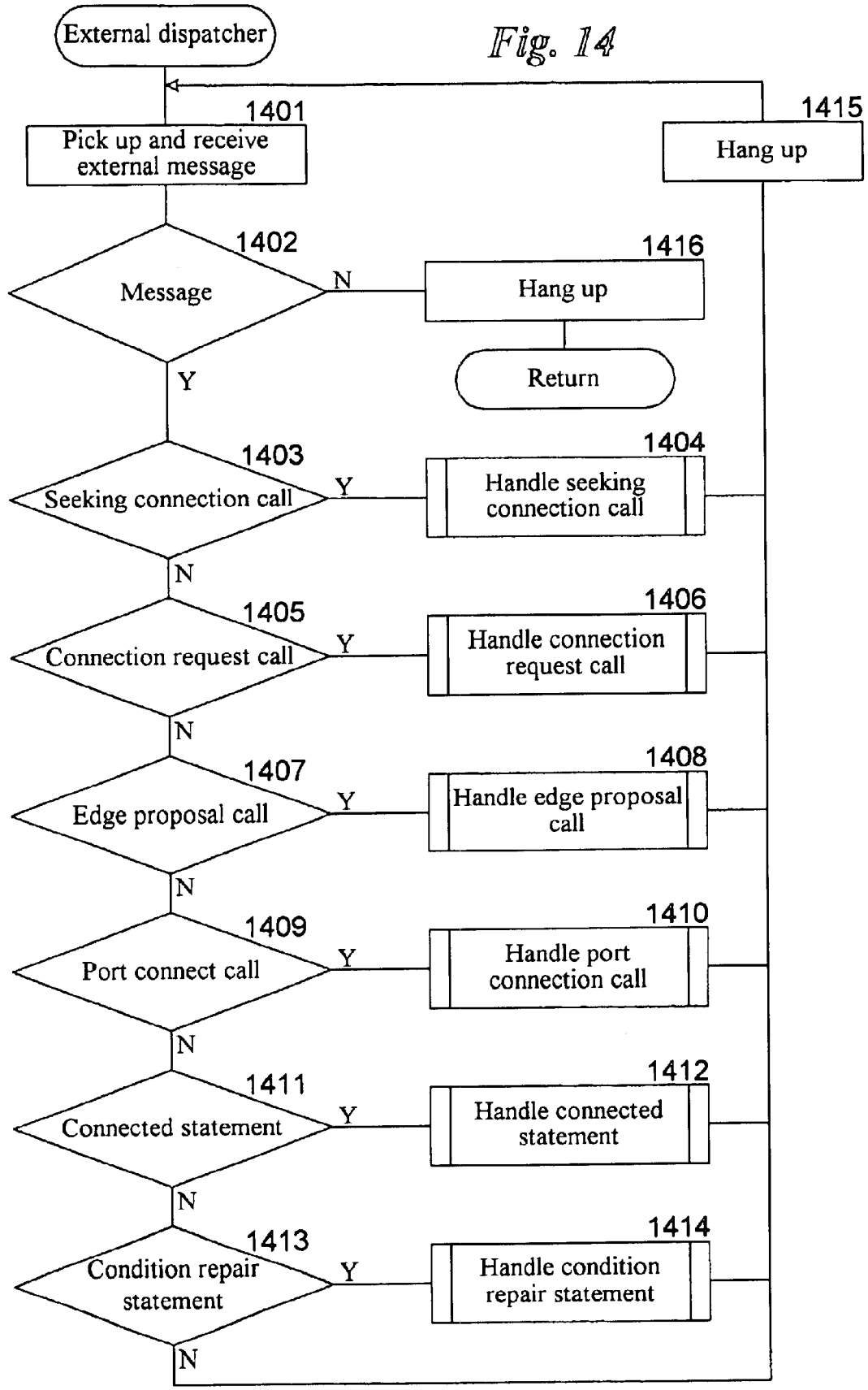
FIG. 14 is a flow diagram illustrating the processing of the external dispatcher routine in one embodiment.

FIG. 14 is a flow diagram illustrating the processing of the external dispatcher routine in one embodiment. This routine is invoked when the external port receives a message. This routine retrieves the message, identifies the external message type, and invokes the appropriate routine to handle that message. This routine loops processing each message until all the received messages have been handled. In block 1401, the routine answers (e.g., picks up) the external port and retrieves an external message. In decision block 1402, if a message was retrieved, then the routine continues at block 1403, else the routine hangs up on the external port in block 1415 and returns. In decision block 1403, if the message type is for a process seeking a connection (i.e., seeking_connection_call), then the routine invokes the handle seeking connection call routine in block 1404, else the routine continues at block 1405. In decision block 1405, if the message type is for a connection request call (i.e., connection_request_call), then the routine invokes the handle connection request call routine in block 1406, else the routine continues at block 1407. In decision block 1407, if the message type is edge proposal call (i.e., edge_proposal_call), then the routine invokes the handle edge proposal call routine in block 1408, else the routine continues at block 1409. In decision block 1409, if the message type is port connect call (i.e., port_connect_call), then the routine invokes the handle port connection call routine in block 1410, else the routine continues at block 1411. In decision block 1411, if the message type is a connected statement (i.e., connected_stint), the routine invokes the handle connected statement in block 1112, else the routine continues at block 1212. In decision block 1412, if the message type is a condition repair statement (i.e., condition_repair_stint), then the routine invokes the handle condition repair routine in block 1413, else the routine loops to block 1414 to process the next message. After each handling routine is invoked, the routine loops to block 1414. In block 1414, the routine hangs up on the external port and continues at block 1401 to receive the next message.

Figure 15:
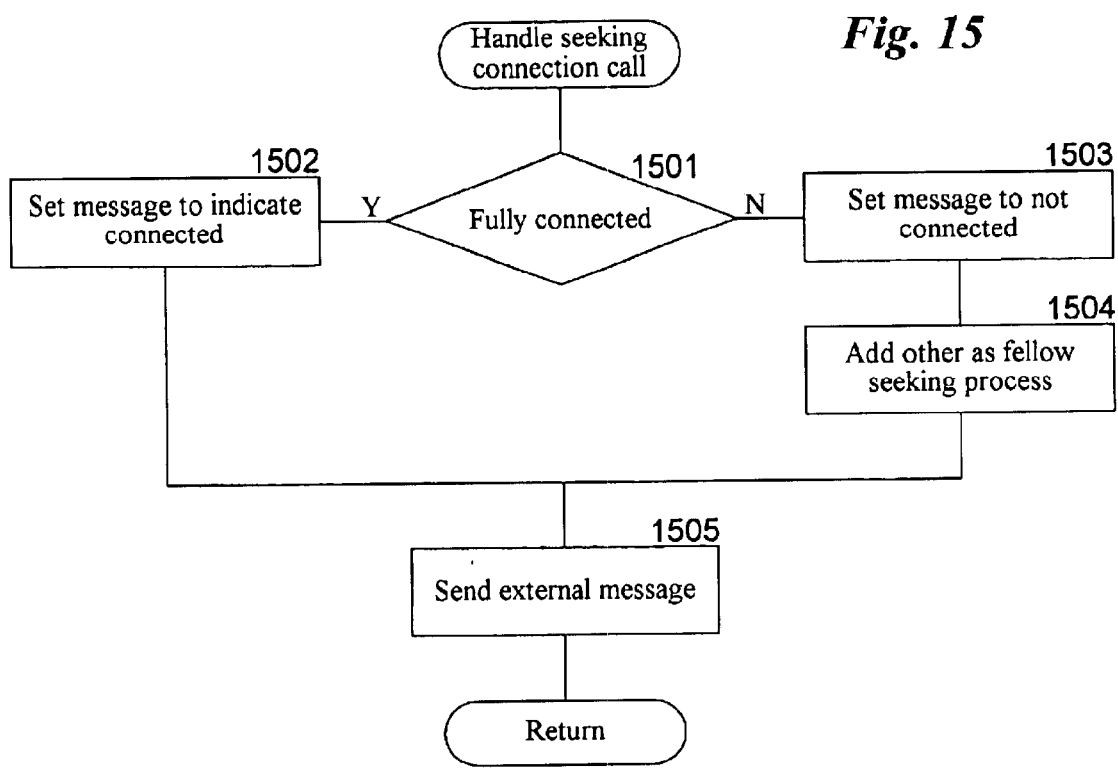
FIG. 15 is a flow diagram illustrating the processing of the handle seeking connection call routine in one embodiment.

FIG. 15 is a flow diagram illustrating the processing of the handle seeking connection call routine in one embodiment. This routine is invoked when a seeking process is calling to identify a portal computer through which it can connect to the broadcast channel. In decision block 1501, if this process is currently fully connected to the broadcast channel identified in the message, then the routine continues at block 1502, else the routine continues at block 1503. In block 1502, the routine sets a message to indicate that this process is fully connected to the broadcast channel and continues at block 1505. In block 1503, the routine sets a message to indicate that this process is not fully connected. In block 1504, the routine adds the identification of the seeking process to a list of fellow seeking processes. If this process is not fully connected, then it is attempting to connect to the broadcast channel. In block 1505, the routine sends the external message response (i.e., seeking_connection_resp) to the seeking process and then returns.

Figure 16:
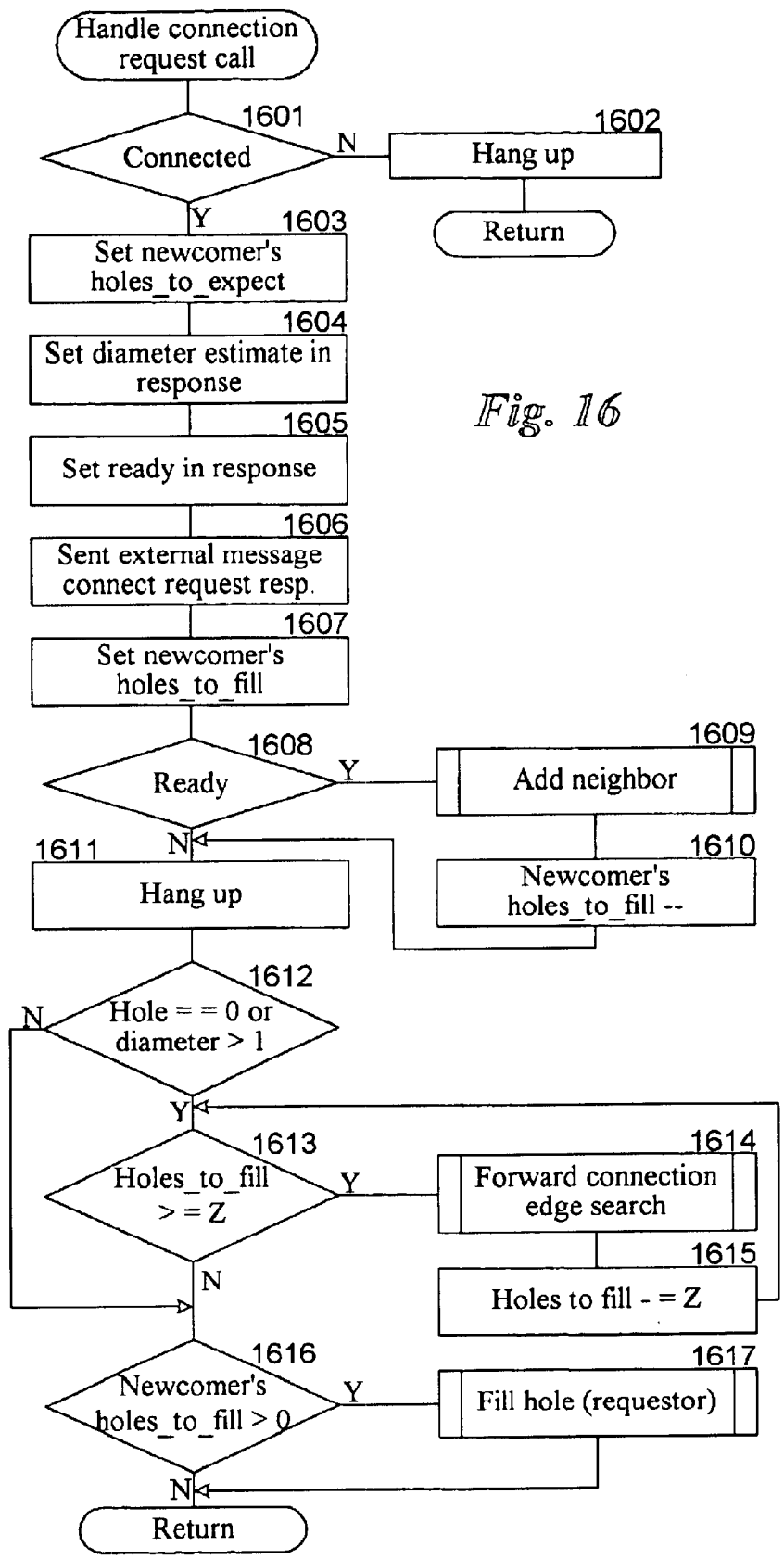
FIG. 16 is a flow diagram illustrating processing of the handle connection request call routine in one embodiment.

FIG. 16 is a flow diagram illustrating processing of the handle connection request call routine in one embodiment. This routine is invoked when the calling process wants this process to initiate the connection of the process to the broadcast channel. This routine either allows the calling process to establish an internal connection with this process (e.g., if in the small regime) or starts the process of identifying a process to which the calling process can connect. In decision block 1601, if this process is currently fully connected to the broadcast channel, then the routine continues at block 1603, else the routine hangs up on the external port in block 1602 and returns. In block 1603, the routine sets the number of holes that the calling process should expect in the response message. In block 1604, the routine sets the estimated diameter in the response message. In block 1605, the routine indicates whether this process is ready to connect to the calling process. This process is ready to connect when the number of its holes is greater than zero and the calling process is not a neighbor of this process. In block 1606, the routine sends to the calling process an external message that is responsive to the connection request call (i.e., connection_request_resp). In block 1607, the routine notes the number of holes that the calling process needs to fill as indicated in the request message. In decision block 1608, if this process is ready to connect to the calling process, then the routine continues at block 1609, else the routine continues at block 1611. In block 1609, the routine invokes the add neighbor routine to add the calling process as a neighbor. In block 1610, the routine decrements the number of holes that the calling process needs to fill and continues at block 1611. In block 1611, the routine hangs up on the external port. In decision block 1612, if this process has no holes or the estimated diameter is greater than one (i.e., in the large regime), then the routine continues at block 1613, else the routine continues at block 1616.

In blocks 1613–1615, the routine loops forwarding a request for an edge through which to connect to the calling process to the broadcast channel. One request is forwarded for each pair of holes of the calling process that needs to be filled. In decision block 1613, if the number of holes of the calling process to be filled is greater than or equal to two, then the routine continues at block 1614, else the routine continues at block 1616. In block 1614, the routine invokes the forward connection edge search routine. The invoked routine is passed to an indication of the calling process and the random walk distance. In one embodiment, the distance is twice in the estimated diameter of the broadcast channel. In block 1614, the routine decrements the holes left to fill by two and loops to block 1613. In decision block 1616, if there is still a hole to fill, then the routine continues at block 1617, else the routine returns. In block 1617, the routine invokes the fill hole routine passing the identification of the calling process. The fill hole routine broadcasts a connection port search statement (i.e., connection_port_search_stint) for a hole of a connected process through which the calling process can connect to the broadcast channel. The routine then returns.

Figure 17:
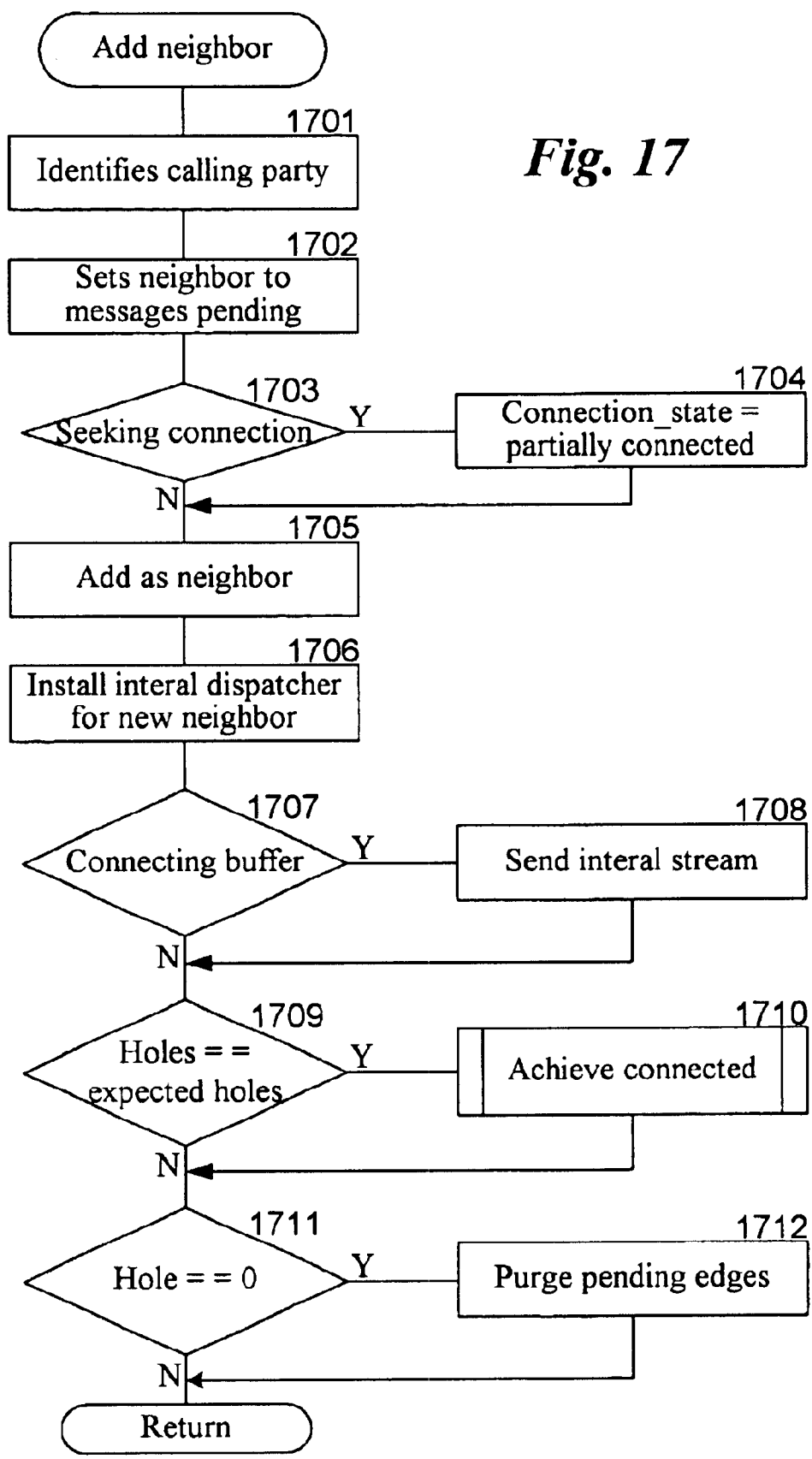
FIG. 17 is a flow diagram illustrating the processing of the add neighbor routine in one embodiment.

FIG. 17 is a flow diagram illustrating the processing of the add neighbor routine in one embodiment. This routine adds the process calling on the external port as a neighbor to this process. In block 1701, the routine identifies the calling process on the external port. In block 1702, the routine sets a flag to indicate that the neighbor has not yet received the broadcast messages from this process. This flag is used to ensure that there are no gaps in the messages initially sent to the new neighbor. The external port becomes the internal port for this connection. In decision block 1703, if this process is in the seeking connection state, then this process is connecting to its first neighbor and the routine continues at block 1704, else the routine continues at block 1705. In block 1704, the routine sets the connection state of this process to partially connected. In block 1705, the routine adds the calling process to the list of neighbors of this process. In block 1706, the routine installs an internal dispatcher for the new neighbor. The internal dispatcher is invoked when a message is received from that new neighbor through the internal port of that new neighbor. In decision block 1707, if this process buffered up messages while not fully connected, then the routine continues at block 1708, else the routine continues at block 1709. In one embodiment, a process that is partially connected may buffer the messages that it receives through an internal connection so that it can send these messages as it connects to new neighbors. In block 1708, the routine sends the buffered messages to the new neighbor through the internal port. In decision block 1709, if the number of holes of this process equals the expected number of holes, then this process is fully connected and the routine continues at block 1710, else the routine continues at block 1711. In block 1710, the routine invokes the achieve connected routine to indicate that this process is fully connected. In decision block 1711, if the number of holes for this process is zero, then the routine continues at block 1712, else the routine returns. In block 1712, the routine deletes any pending edges and then returns. A pending edge is an edge that has been proposed to this process for edge pinning, which in this case is no longer needed.

Figure 18:
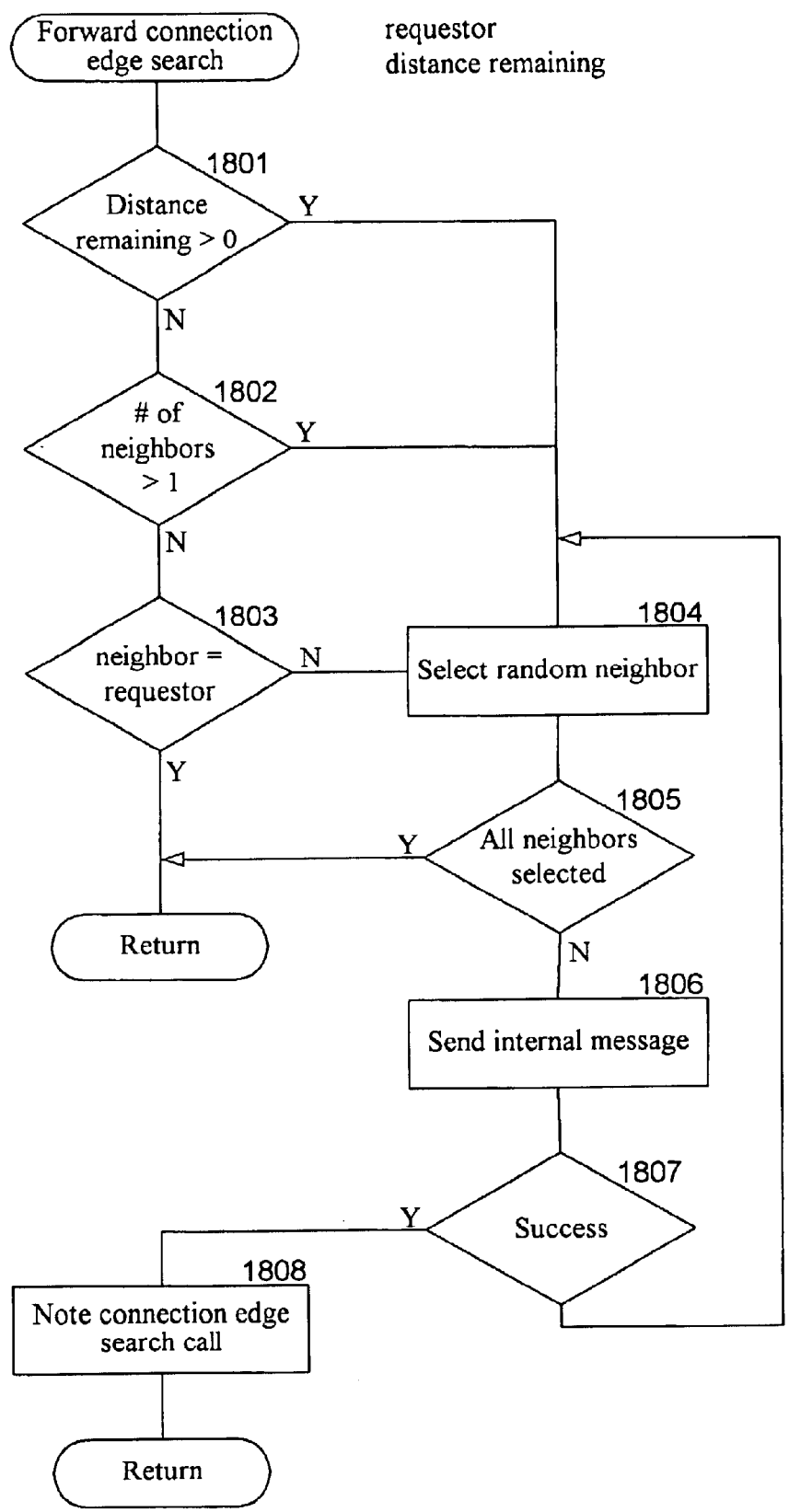
FIG. 18 is a flow diagram illustrating the processing of the forward connection edge search routine in one embodiment.

FIG. 18 is a flow diagram illustrating the processing of the forward connection edge search routine in one embodiment. This routine is responsible for passing along a request to connect a requesting process to a randomly selected neighbor of this process through the internal port of the selected neighbor, that is part of the random walk. In decision block 1801, if the forwarding distance remaining is greater than zero, then the routine continues at block 1804, else the routine continues at block 1802. In decision block 1802, if the number of neighbors of this process is greater than one, then the routine continues at block 1804, else this broadcast channel is in the small regime and the routine continues at block 1803. In decision block 1803, if the requesting process is a neighbor of this process, then the routine returns, else the routine continues at block 1804. In blocks 1804–1807, the routine loops attempting to send a connection edge search call internal message (i.e., connection_edge_search_call) to a randomly selected neighbor. In block 1804, the routine randomly selects a neighbor of this process. In decision block 1805, if all the neighbors of this process have already been selected, then the routine cannot forward the message and the routine returns, else the routine continues at block 1806. In block 1806, the routine sends a connection edge search call internal message to the selected neighbor. In decision block 1807, if the sending of the message is successful, then the routine continues at block 1808, else the routine loops to block 1804 to select the next neighbor. When the sending of an internal message is unsuccessful, then the neighbor may have disconnected from the broadcast channel in an unplanned manner. Whenever such a situation is detected by the broadcaster component, it attempts to find another neighbor by invoking the fill holes routine to fill a single hole or the forward connecting edge search routine to fill two holes. In block 1808, the routine notes that the recently sent connection edge search call has not yet been acknowledged and indicates that the edge to this neighbor is reserved if the remaining forwarding distance is less than or equal to one. It is reserved because the selected neighbor may offer this edge to the requesting process for edge pinning. The routine then returns.

Figure 19:
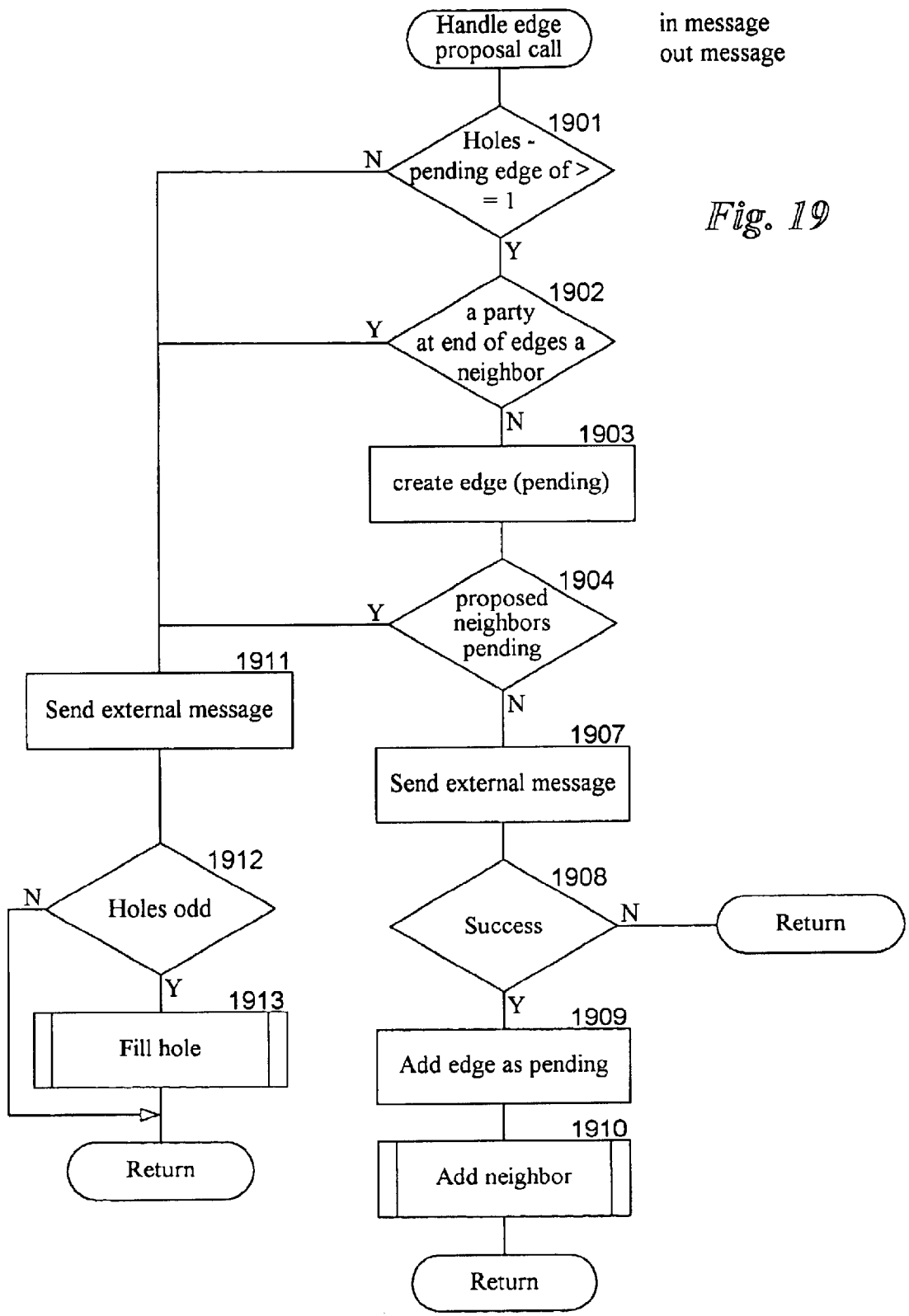
FIG. 19 is a flow diagram illustrating the processing of the handle edge proposal call routine.

FIG. 19 is a flow diagram illustrating the processing of the handle edge proposal call routine. This routine is invoked when a message is received from a proposing process that proposes to connect an edge between the proposing process and one of its neighbors to this process for edge pinning. In decision block 1901, if the number of holes of this process minus the number of pending edges is greater than or equal to one, then this process still has holes to be filled and the routine continues at block 1902, else the routine continues at block 1911. In decision block 1902, if the proposing process or its neighbor is a neighbor of this process, then the routine continues at block 1911, else the routine continues at block 1903. In block 1903, the routine indicates that the edge is pending between this process and the proposing process. In decision block 1904, if a proposed neighbor is already pending as a proposed neighbor, then the routine continues at block 1911, else the routine continues at block 1907. In block 1907, the routine sends an edge proposal response as an external message to the proposing process (i.e., edge_proposal_resp) indicating that the proposed edge is accepted. In decision block 1908, if the sending of the message was successful, then the routine continues at block 1909, else the routine returns. In block 1909, the routine adds the edge as a pending edge. In block 1910, the routine invokes the add neighbor routine to add the proposing process on the external port as a neighbor. The routine then returns. In block 1911, the routine sends an external message (i.e., edge_proposal_resp) indicating that this proposed edge is not accepted. In decision block 1912, if the number of holes is odd, then the routine continues at block 1913, else the routine returns. In block 1913, the routine invokes the fill hole routine and then returns.

Figure 20:
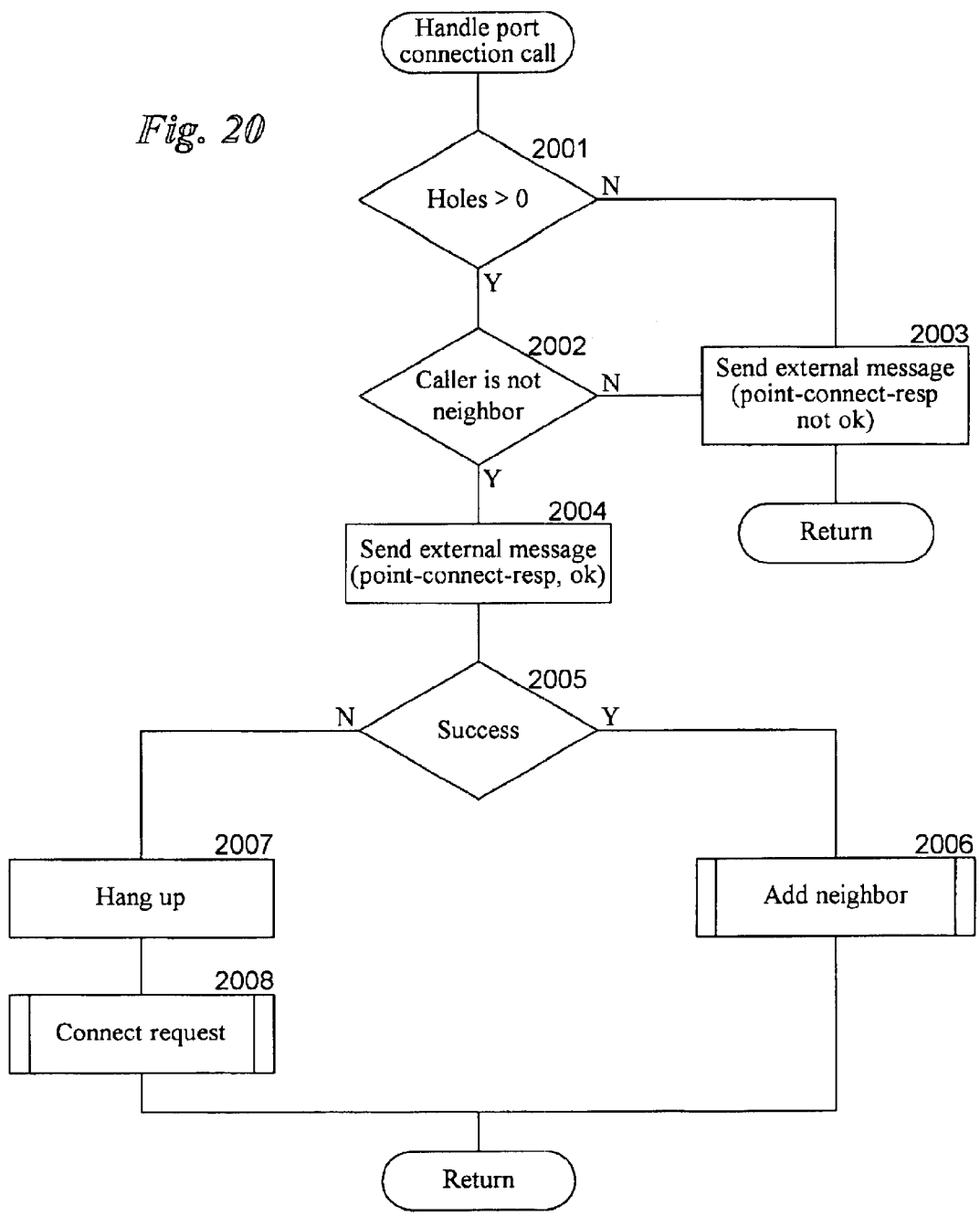
FIG. 20 is a flow diagram illustrating the processing of the handle port connection call routine in one embodiment.

FIG. 20 is a flow diagram illustrating the processing of the handle port connection call routine in one embodiment. This routine is invoked when an external message is received then indicates that the sending process wants to connect to one hole of this process. In decision block 2001, if the number of holes of this process is greater than zero, then the routine continues at block 2002, else the routine continues at block 2003. In decision block 2002, if the sending process is not a neighbor, then the routine continues at block 2004, else the routine continues to block 2003. In block 2003, the routine sends a port connection response external message (i.e., port_connection_resp) to the sending process that indicates that it is not okay to connect to this process. The routine then returns. In block 2004, the routine sends a port connection response external message to the sending process that indicates that is okay to connect this process. In decision block 2005, if the sending of the message was successful, then the routine continues at block 2006, else the routine continues at block 2007. In block 2006, the routine invokes the add neighbor routine to add the sending process as a neighbor of this process and then returns. In block 2007, the routine hangs up the external connection. In block 2008, the routine invokes the connect request routine to request that a process connect to one of the holes of this process. The routine then returns.

Figure 21:
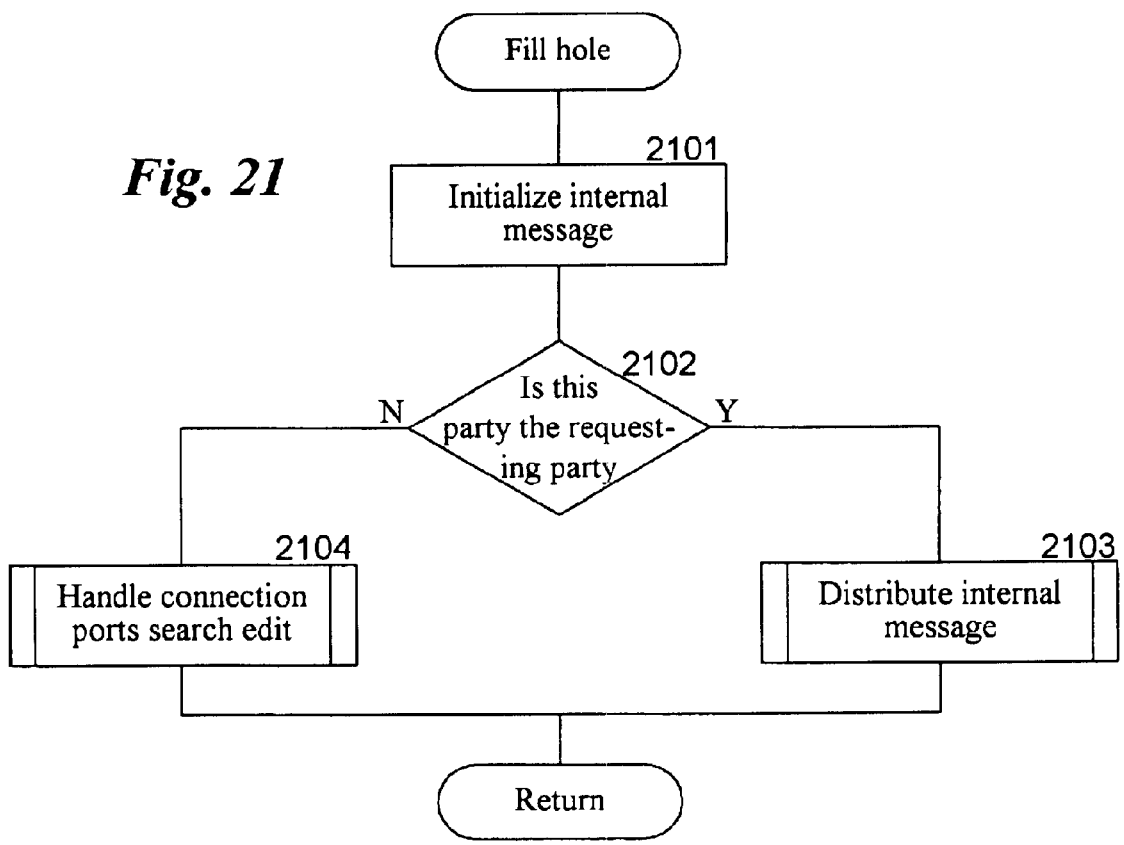
FIG. 21 is a flow diagram illustrating the processing of the fill hole routine in one embodiment.

FIG. 21 is a flow diagram illustrating the processing of the fill hole routine in one embodiment. This routine is passed an indication of the requesting process. If this process is requesting to fill a hole, then this routine sends an internal message to other processes. If another process is requesting to fill a hole, then this routine invokes the routine to handle a connection port search request. In block 2101, the routine initializes a connection port search statement internal message (i.e., connection_port_search_stmt). In decision block 2102, if this process is the requesting process, then the routine continues at block 2103, else the routine continues at block 2104. In block 2103, the routine distributes the message to the neighbors of this process through the internal ports and then returns. In block 2104, the routine invokes the handle connection port search routine and then returns.

Figure 22:
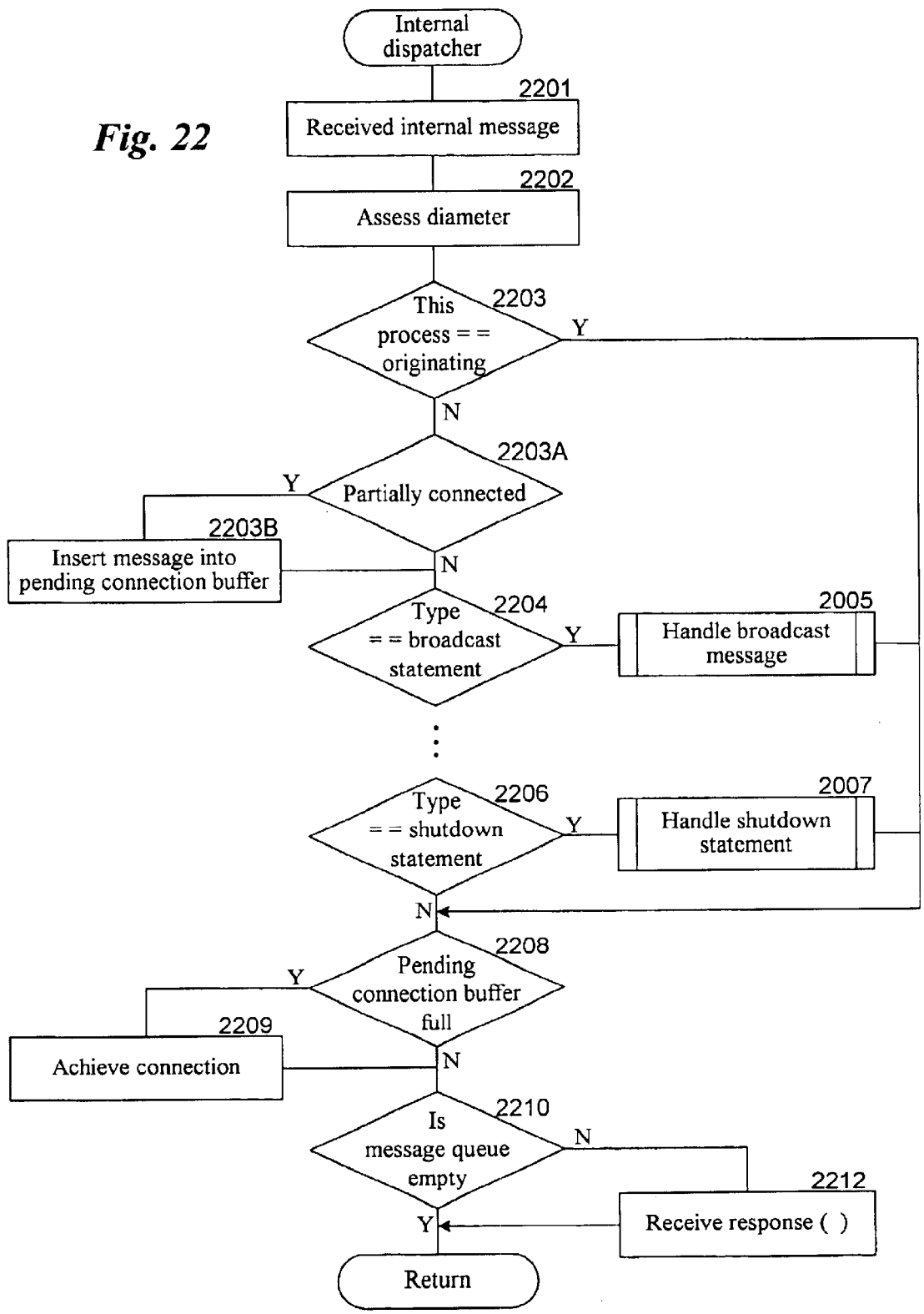
FIG. 22 is a flow diagram illustrating the processing of the internal dispatcher routine in one embodiment.

FIG. 22 is a flow diagram illustrating the processing of the internal dispatcher routine in one embodiment. This routine is passed an indication of the neighbor who sent the internal message. In block 2201, the routine receives the internal message. This routine identifies the message type and invokes the appropriate routine to handle the message. In block 2202, the routine assesses whether to change the estimated diameter of the broadcast channel based on the information in the received message. In decision block 2203, if this process is the originating process of the message or the message has already been received (i.e., a duplicate), then the routine ignores the message and continues at block 2208, else the routine continues at block 2203 A. In decision block 2203 A, if the process is partially connected, then the routine continues at block 2203 B, else the routine continues at block 2204. In block 2203 B, the routine adds the message to the pending connection buffer and continues at block 2204. In decision blocks 2204–2207, the routine decodes the message type and invokes the appropriate routine to handle the message. For example, in decision block 2204, if the type of the message is broadcast statement (i.e., broadcast_stmt), then the routine invokes the handle broadcast message routine in block 2205. After invoking the appropriate handling routine, the routine continues at block 2208. In decision block 2208, if the partially connected buffer is full, then the routine continues at block 2209, else the routine continues at block 2210. The broadcaster component collects all its internal messages in a buffer while partially connected so that it can forward the messages as it connects to new neighbors. If, however, that buffer becomes full, then the process assumes that it is now fully connected and that the expected number of connections was too high, because the broadcast channel is now in the small regime. In block 2209, the routine invokes the achieve connection routine and then continues in block 2210. In decision block 2210, if the application program message queue is empty, then the routine returns, else the routine continues at block 2212. In block 2212, the routine invokes the receive response routine passing the acquired message and then returns. The received response routine is a callback routine of the application program.

Figure 23:
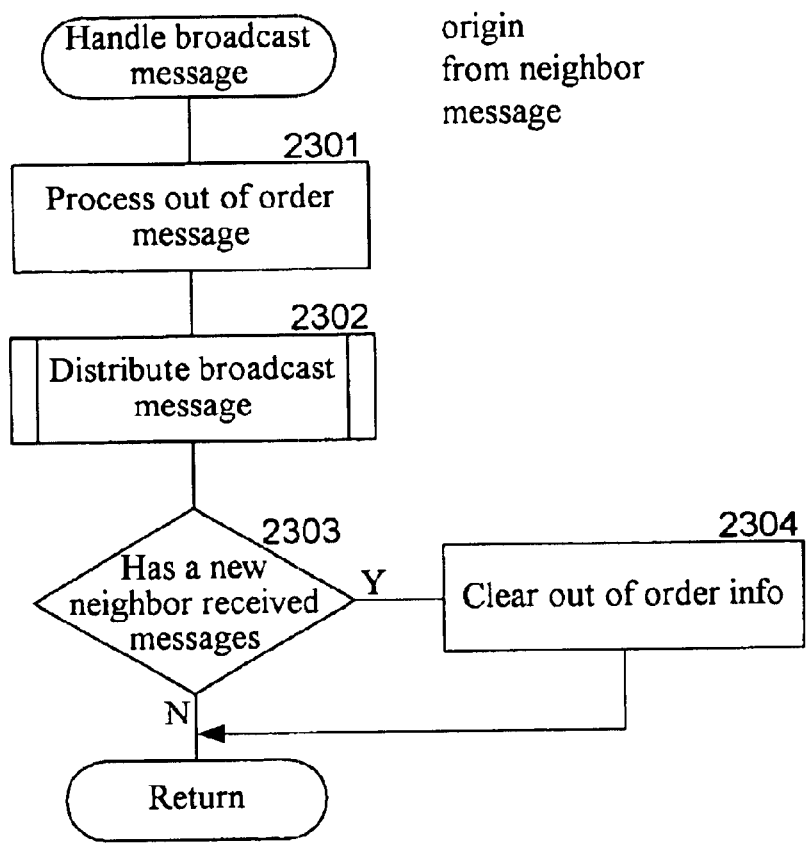
FIG. 23 is a flow diagram illustrating the processing of the handle broadcast message routine in one embodiment.

FIG. 23 is a flow diagram illustrating the processing of the handle broadcast message routine in one embodiment. This routine is passed an indication of the originating process, an indication of the neighbor who sent the broadcast message, and the broadcast message itself. In block 2301, the routine performs the out of order processing for this message. The broadcaster component queues messages from each originating process until it can send them in sequence number order to the application program. In block 2302, the routine invokes the distribute broadcast message routine to forward the message to the neighbors of this process. In decision block 2303, if a newly connected neighbor is waiting to receive messages, then the routine continues at block 2304, else the routine returns. In block 2304, the routine sends the messages in the correct order if possible for each originating process and then returns.

Figure 24:
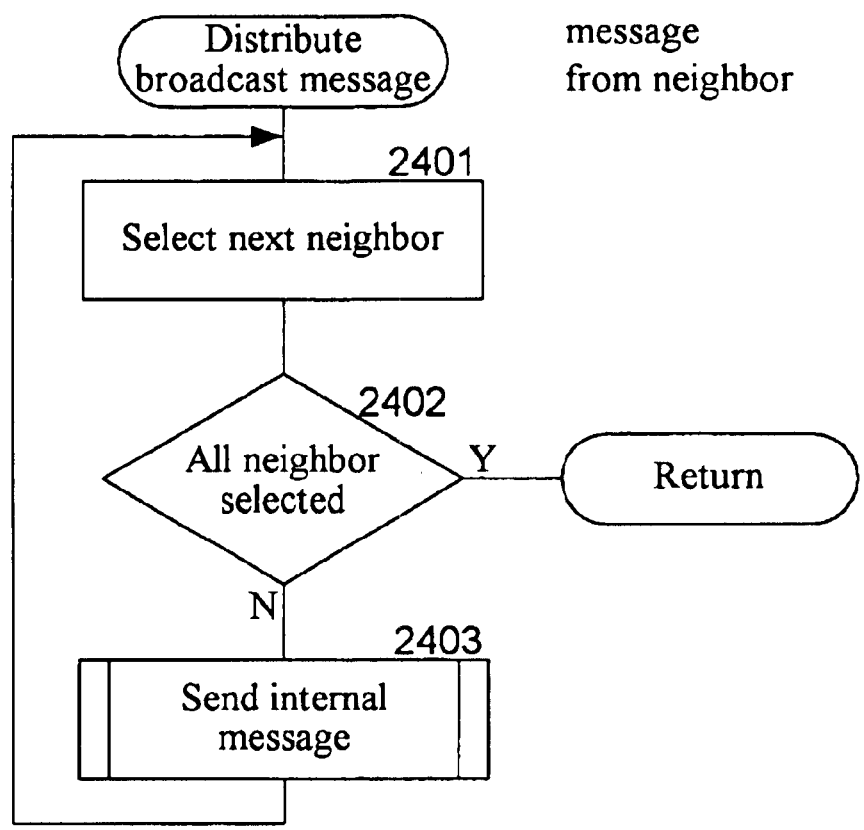
FIG. 24 is a flow diagram illustrating the processing of the distribute broadcast message routine in one embodiment.

FIG. 24 is a flow diagram illustrating the processing of the distribute broadcast message routine in one embodiment. This routine sends the broadcast message to each of the neighbors of this process, except for the neighbor who sent the message to this process. In block 2401, the routine selects the next neighbor other than the neighbor who sent the message. In decision block 2402, if all such neighbors have already been selected, then the routine returns. In block 2403, the routine sends the message to the selected neighbor and then loops to block 2401 to select the next neighbor.

Figure 26:
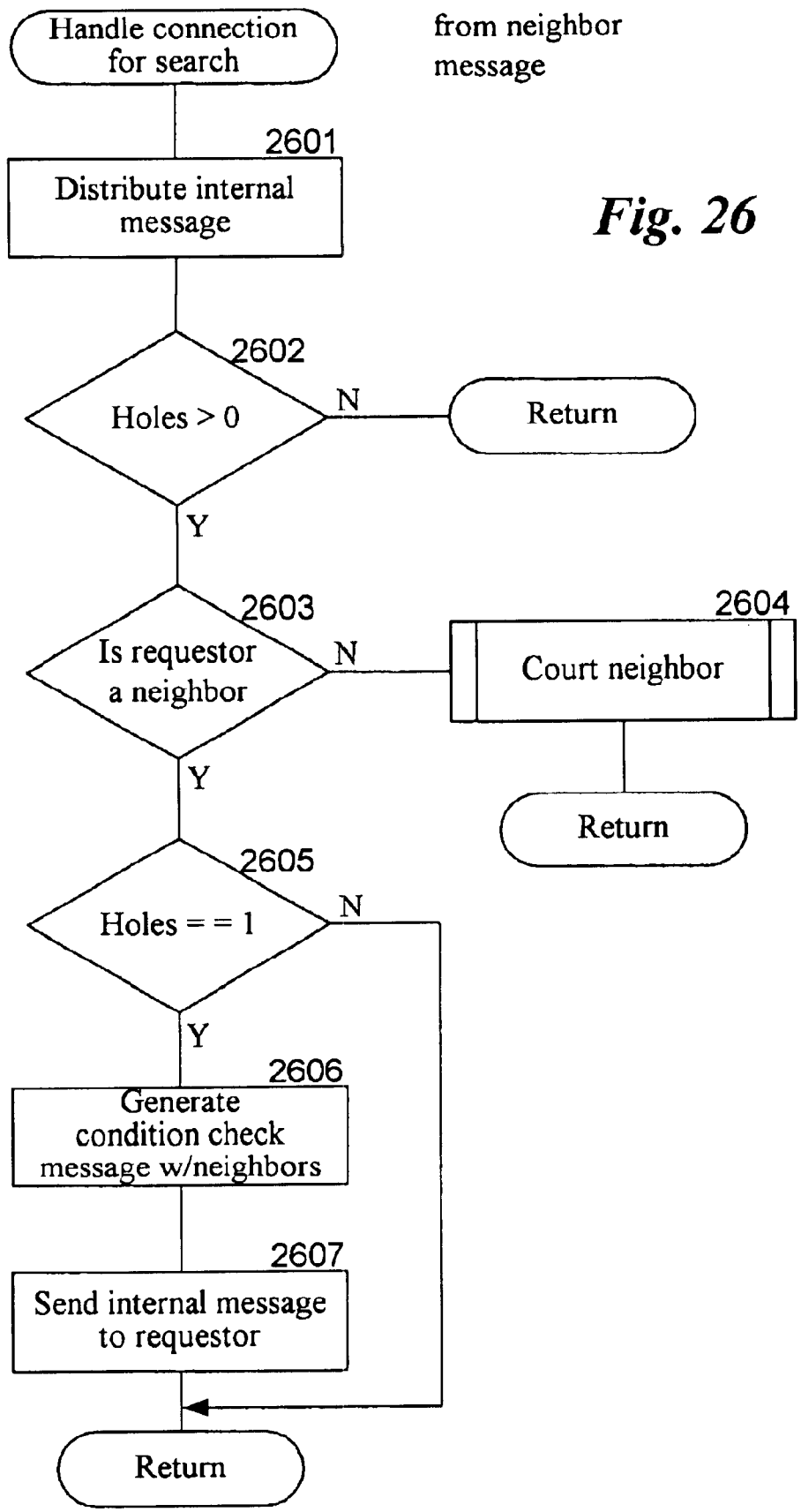
FIG. 26 is a flow diagram illustrating the processing of the handle connection port search statement routine in one embodiment.

FIG. 26 is a flow diagram illustrating the processing of the handle connection port search statement routine in one embodiment. This routine is passed an indication of the neighbor that sent the message and the message itself. In block 2601, the routine invokes the distribute internal message which sends the message to each of its neighbors other than the sending neighbor. In decision block 2602, if the number of holes of this process is greater than zero, then the routine continues at block 2603, else the routine returns. In decision block 2603, if the requesting process is a neighbor, then the routine continues at block 2605, else the routine continues at block 2604. In block 2604, the routine invokes the court neighbor routine and then returns. The court neighbor routine connects this process to the requesting process if possible. In block 2605, if this process has one hole, then the neighbors with empty ports condition exists and the routine continues at block 2606, else the routine returns. In block 2606, the routine generates a condition check message (i.e., condition_check) that includes a list of this process' neighbors. In block 2607, the routine sends the message to the requesting neighbor.

Figure 27:
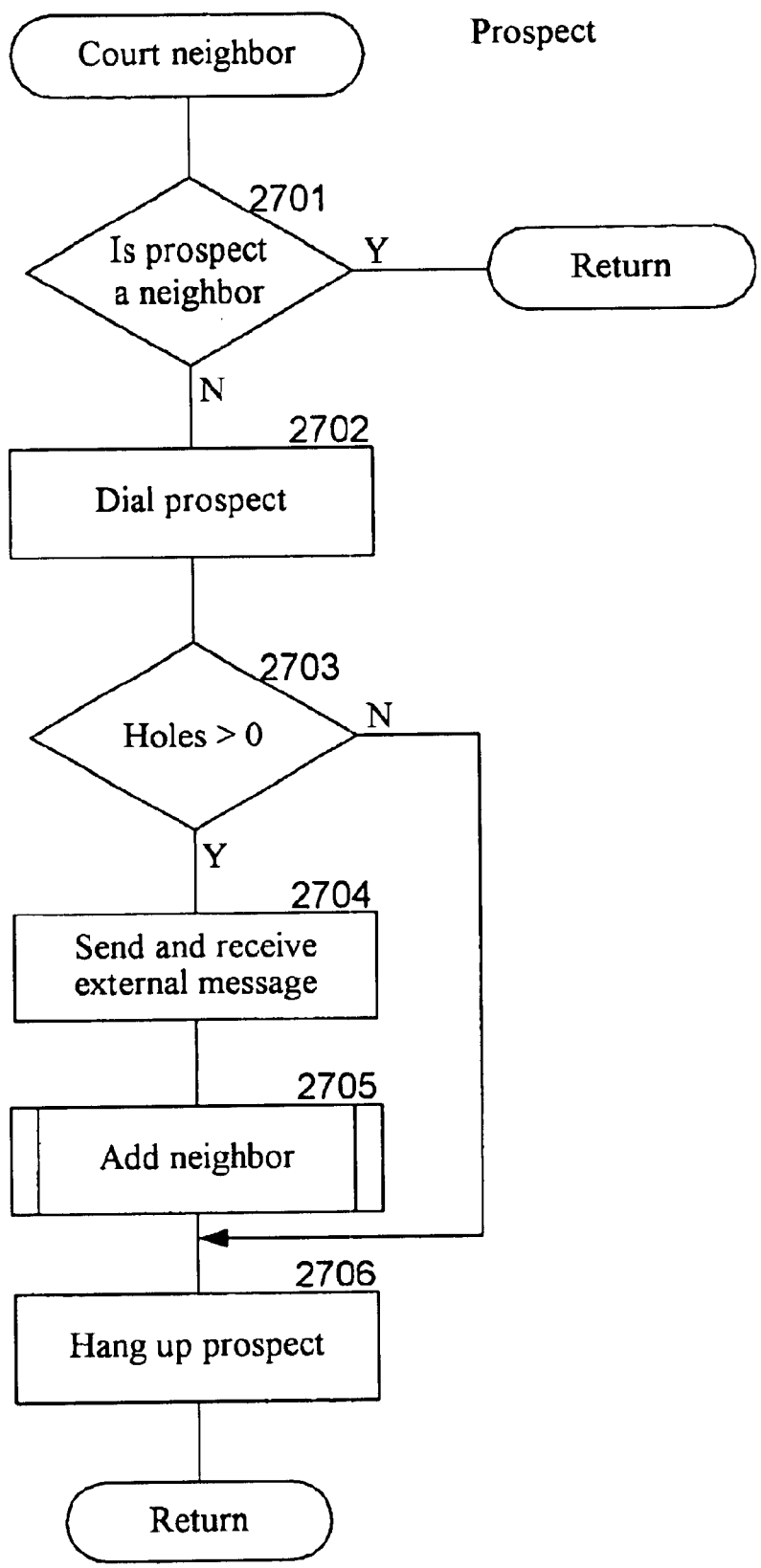
FIG. 27 is a flow diagram illustrating the processing of the court neighbor routine in one embodiment.

FIG. 27 is a flow diagram illustrating the processing of the court neighbor routine in one embodiment. This routine is passed an indication of the prospective neighbor for this process. If this process can connect to the prospective neighbor, then it sends a port connection call external message to the prospective neighbor and adds the prospective neighbor as a neighbor. In decision block 2701, if the prospective neighbor is already a neighbor, then the routine returns, else the routine continues at block 2702. In block 2702, the routine dials the prospective neighbor. In decision block 2703, if the number of holes of this process is greater than zero, then the routine continues at block 2704, else the routine continues at block 2706. In block 2704, the routine sends a port connection call external message (i.e., port_connection_call) to the prospective neighbor and receives its response (i.e., port_connection_resp). Assuming the response is successfully received, in block 2705, the routine adds the prospective neighbor as a neighbor of this process by invoking the add neighbor routine. In block 2706, the routine hangs up with the prospect and then returns.

Figure 28:
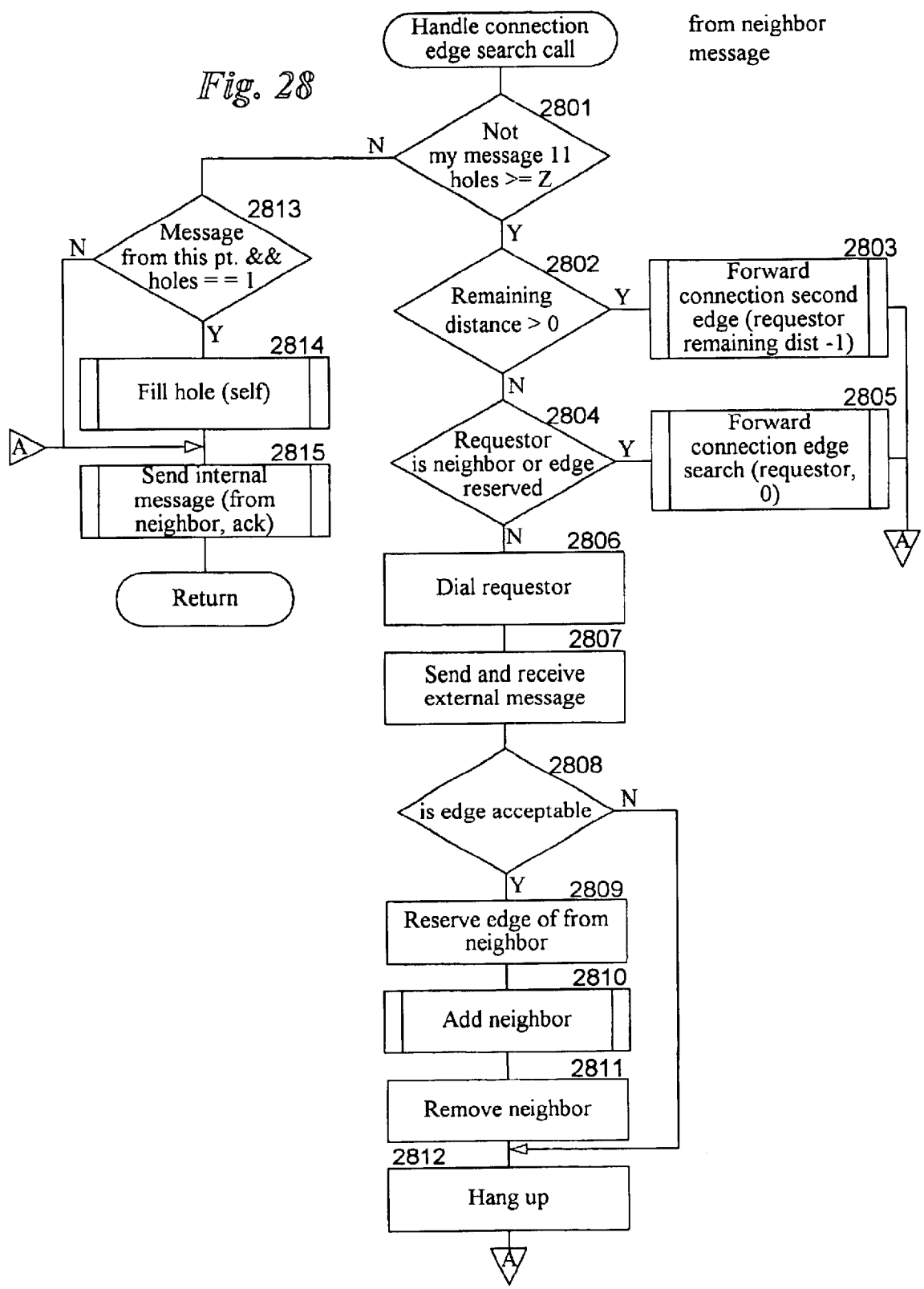
FIG. 28 is a flow diagram illustrating the processing of the handle connection edge search call routine in one embodiment.

FIG. 28 is a flow diagram illustrating the processing of the handle connection edge search call routine in one embodiment. This routine is passed a indication of the neighbor who sent the message and the message itself This routine either forwards the message to a neighbor or proposes the edge between this process and the sending neighbor to the requesting process for edge pinning. In decision block 2801, if this process is not the requesting process or the number of holes of the requesting process is still greater than or equal to two, then the routine continues at block 2802, else the routine continues at block 2813. In decision block 2802, if the forwarding distance is greater than zero, then the random walk is not complete and the routine continues at block 2803, else the routine continues at block 2804. In block 2803, the routine invokes the forward connection edge search routine passing the identification of the requesting process and the decremented forwarding distance. The routine then continues at block 2815. In decision block 2804, if the requesting process is a neighbor or the edge between this process and the sending neighbor is reserved because it has already been offered to a process, then the routine continues at block 2805, else the routine continues at block 2806. In block 2805, the routine invokes the forward connection edge search routine passing an indication of the requesting party and a toggle indicator that alternatively indicates to continue the random walk for one or two more computers. The routine then continues at block 2815. In block 2806, the routine dials the requesting process via the call-in port. In block 2807, the routine sends an edge proposal call external message (i.e., edge_proposal_call) and receives the response (i.e., edge_proposal_resp). Assuming that the response is successfully received, the routine continues at block 2808. In decision block 2808, if the response indicates that the edge is acceptable to the requesting process, then the routine continues at block 2809, else the routine continues at block 2812. In block 2809, the routine reserves the edge between this process and the sending neighbor. In block 2810, the routine adds the requesting process as a neighbor by invoking the add neighbor routine. In block 2811, the routine removes the sending neighbor as a neighbor. In block 2812, the routine hangs up the external port and continues at block 2815. In decision block 2813, if this process is the requesting process and the number of holes of this process equals one, then the routine continues at block 2814, else the routine continues at block 2815. In block 2814, the routine invokes the fill hole routine. In block 2815, the routine sends an connection edge search response message (i.e., connection_edge_search_response) to the sending neighbor indicating acknowledgement and then returns. The graphs are sensitive to parity. That is, all possible paths starting from a node and ending at that node will have an even length unless the graph has a cycle whose length is odd. The broadcaster component uses a toggle indicator to vary the random walk distance between even and odd distances.

Figure 29:
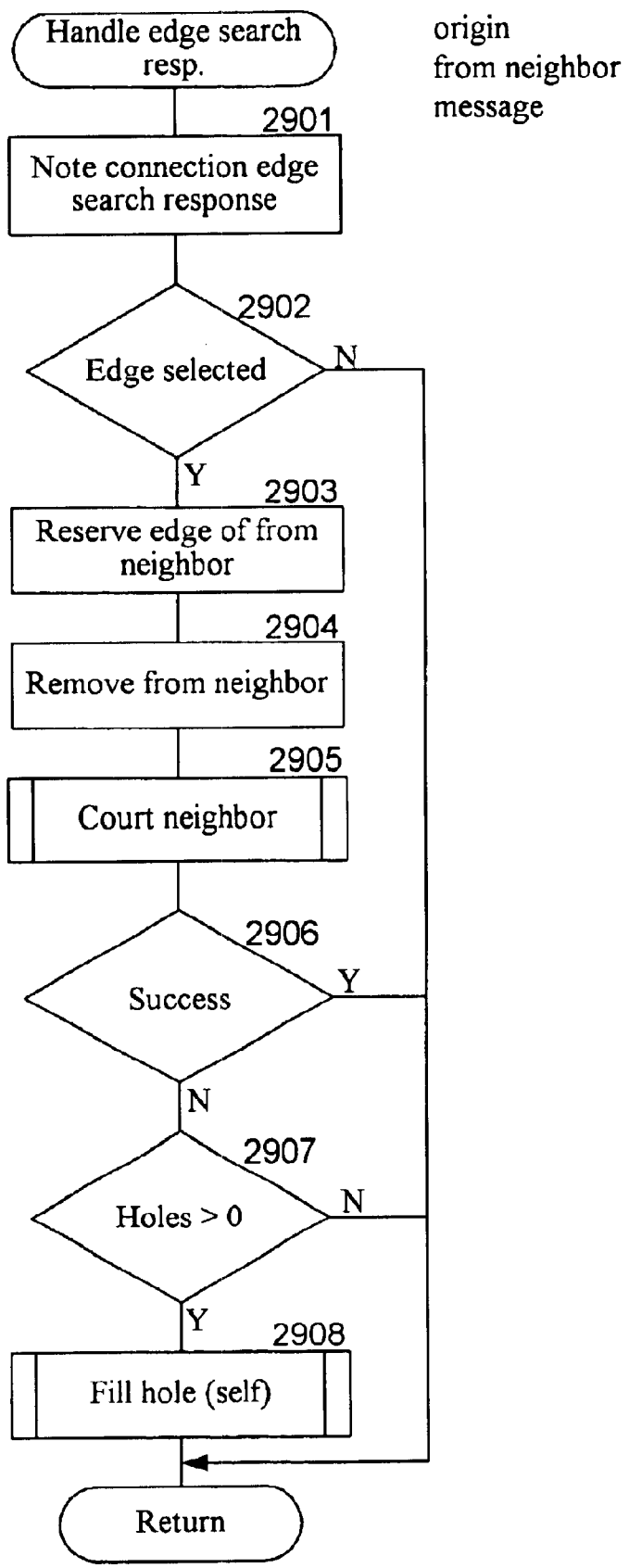
FIG. 29 is a flow diagram illustrating the processing of the handle connection edge search response routine in one embodiment.

FIG. 29 is a flow diagram illustrating the processing of the handle connection edge search response routine in one embodiment. This routine is passed as indication of the requesting process, the sending neighbor, and the message. In block 2901, the routine notes that the connection edge search response (i.e., connection_edge_search_resp) has been received and if the forwarding distance is less than or equal to one unreserves the edge between this process and the sending neighbor. In decision block 2902, if the requesting process indicates that the edge is acceptable as indicated in the message, then the routine continues at block 2903, else the routine returns. In block 2903, the routine reserves the edge between this process and the sending neighbor. In block 2904, the routine removes the sending neighbor as a neighbor. In block 2905, the routine invokes the court neighbor routine to connect to the requesting process. In decision block 2906, if the invoked routine was unsuccessful, then the routine continues at block 2907, else the routine returns. In decision block 2907, if the number of holes of this process is greater than zero, then the routine continues at block 2908, else the routine returns. In block 2908, the routine invokes the fill hole routine and then returns.

Figure 30:
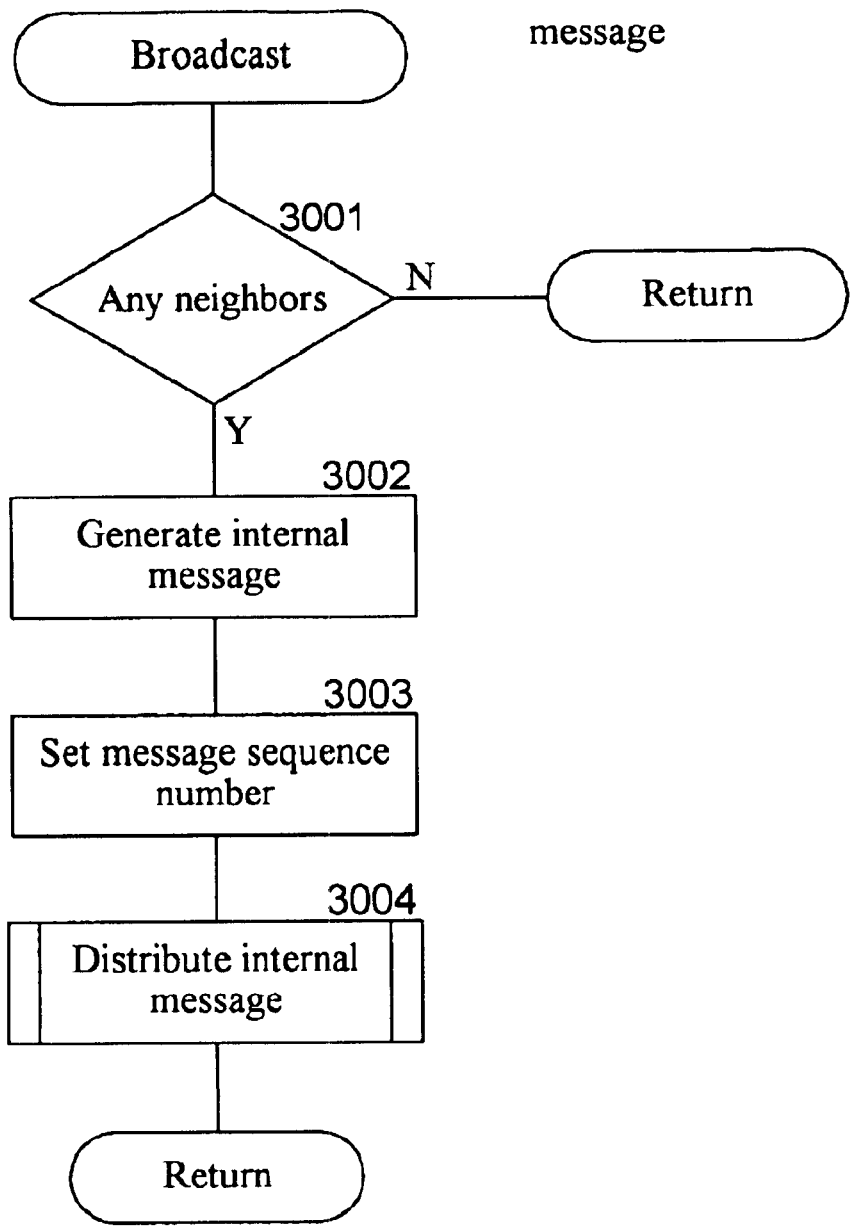
FIG. 30 is a flow diagram illustrating the processing of the broadcast routine in one embodiment.

FIG. 30 is a flow diagram illustrating the processing of the broadcast routine in one embodiment. This routine is invoked by the application program to broadcast a message on the broadcast channel. This routine is passed the message to be broadcast. In decision block 3001, if this process has at least one neighbor, then the routine continues at block 3002, else the routine returns since it is the only process connected to be broadcast channel. In block 3002, the routine generates an internal message of the broadcast statement type (i.e., broadcast _stmt). In block 3003, the routine sets the sequence number of the message. In block 3004, the routine invokes the distribute internal message routine to broadcast the message on the broadcast channel. The routine returns.

Figure 31:
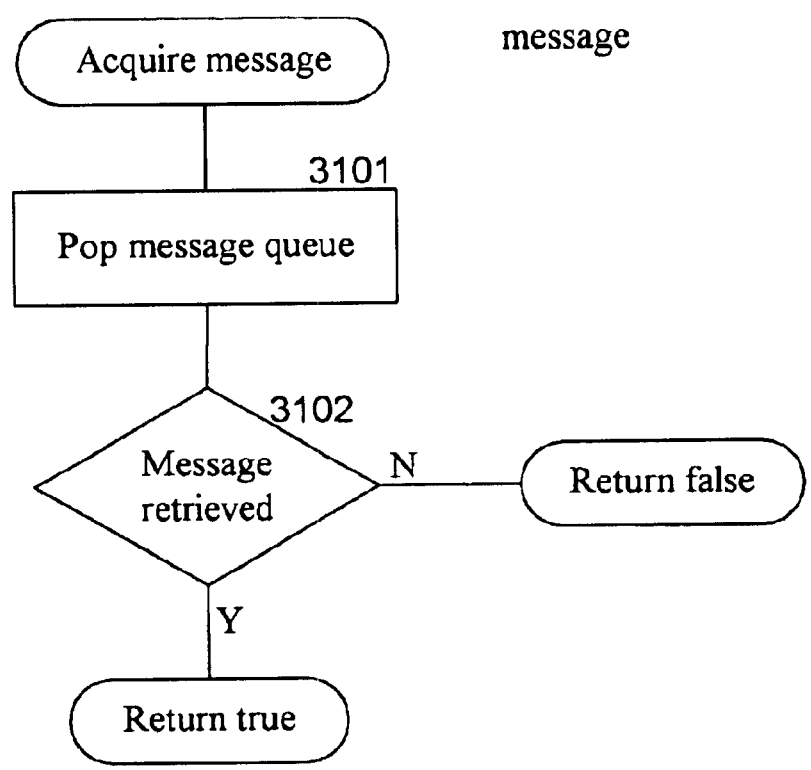
FIG. 31 is a flow diagram illustrating the processing of the acquire message routine in one embodiment.

FIG. 31 is a flow diagram illustrating the processing of the acquire message routine in one embodiment. The acquire message routine may be invoked by the application program or by a callback routine provided by the application program. This routine returns a message. In block 3101, the routine pops the message from the message queue of the broadcast channel. In decision block 3102, if a message was retrieved, then the routine returns an indication of success, else the routine returns indication of failure.

Figure 32:
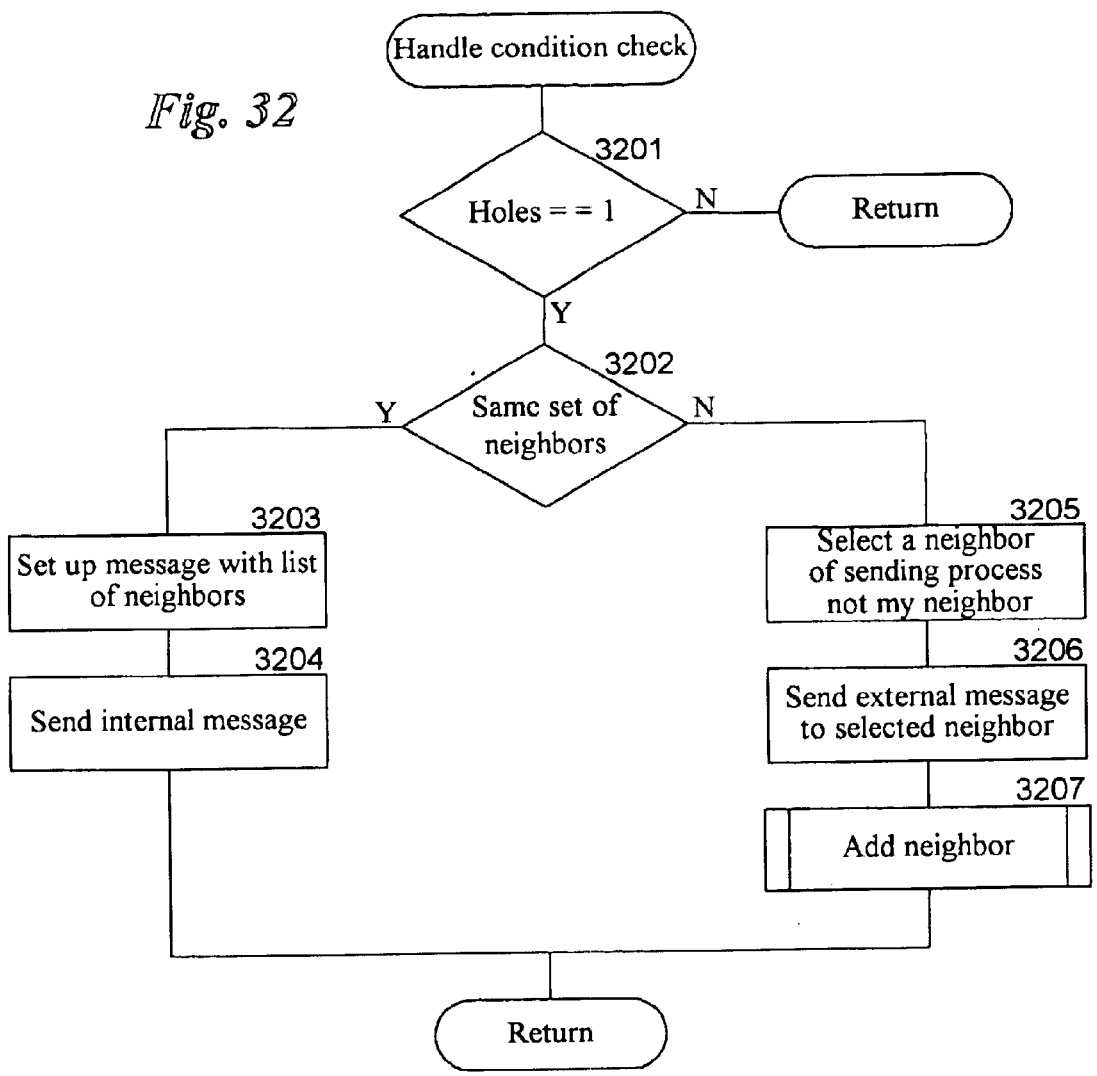
FIG. 32 is a flow diagram illustrating processing of the handle condition check message in one embodiment.
Figure 33:
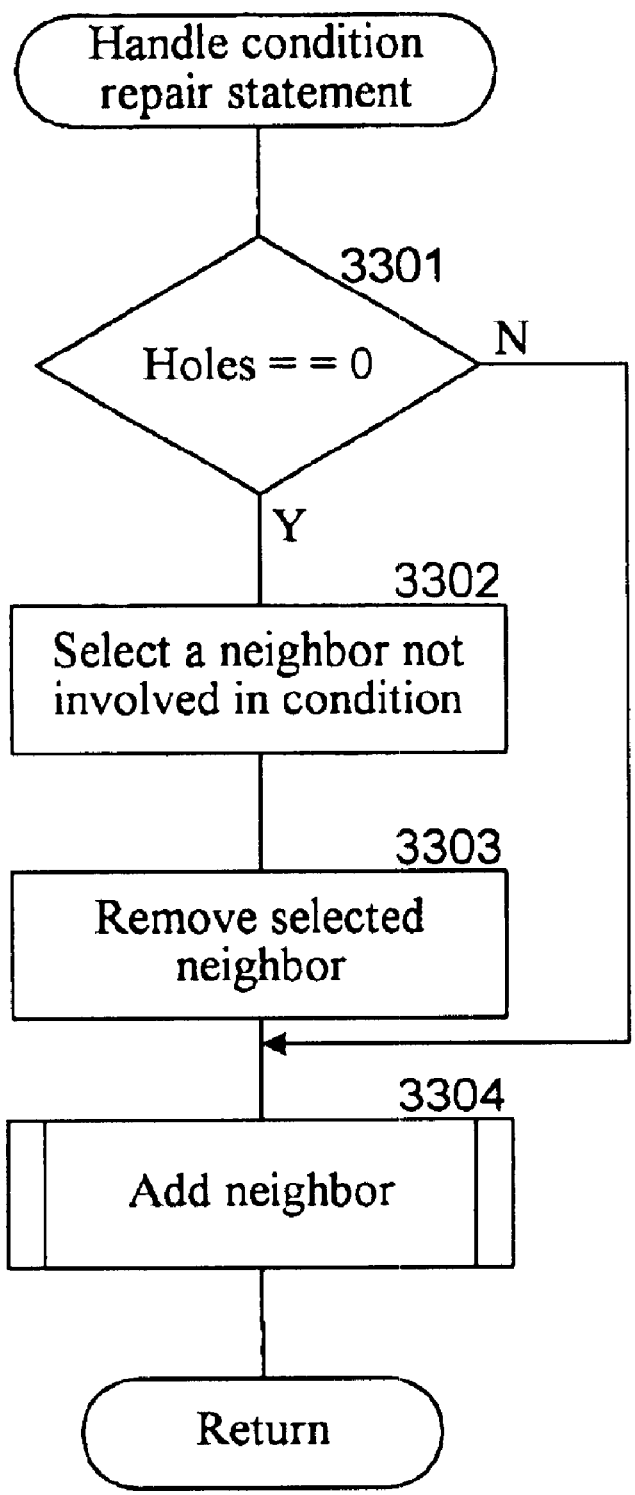
FIG. 33 is a flow diagram illustrating processing of the handle condition repair statement routine in one embodiment.
Figure 34:
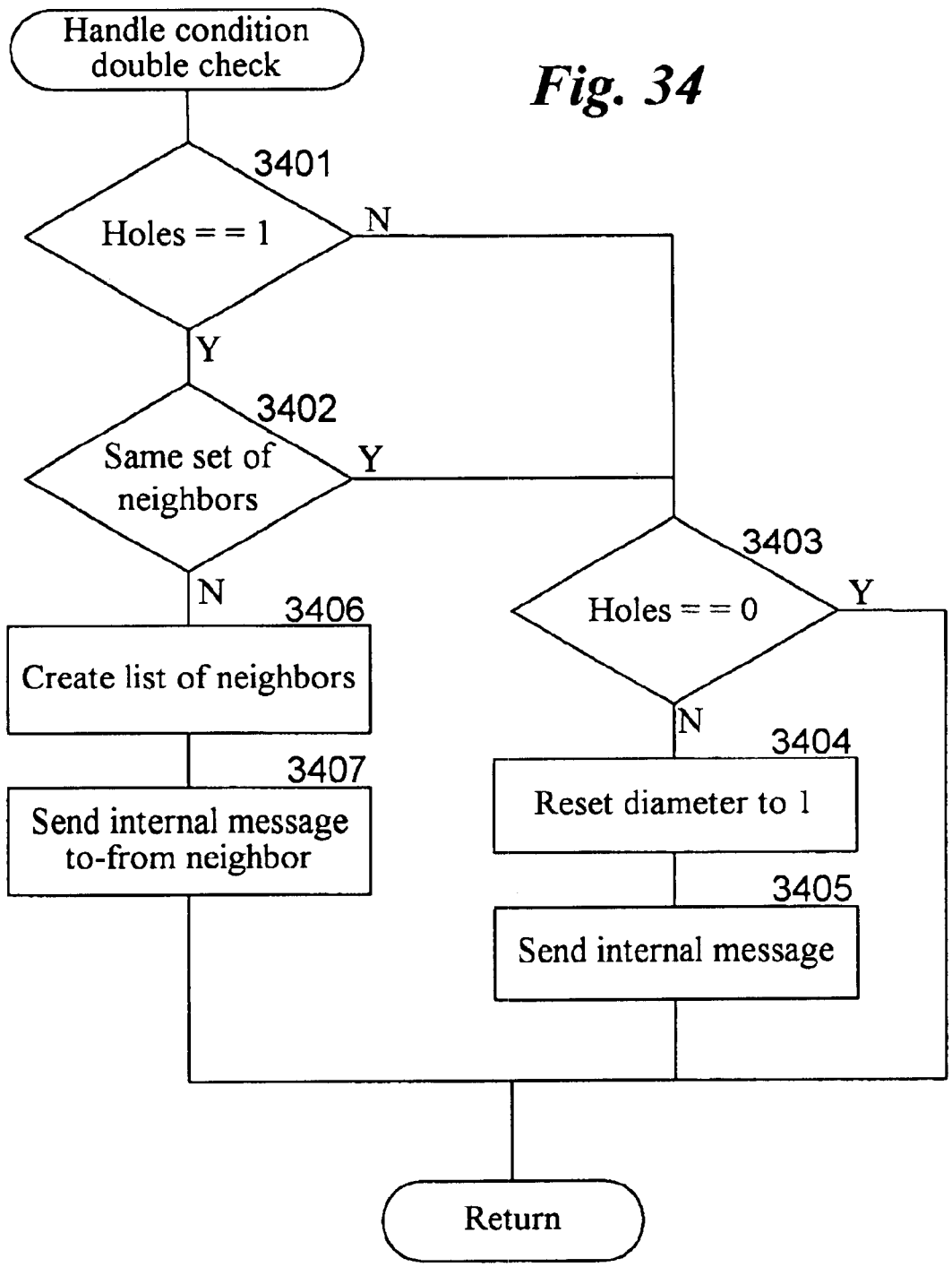
FIG. 34 is a flow diagram illustrating the processing of the handle condition double check routine.

FIGS. 32–34 are flow diagrams illustrating the processing of messages associated with the neighbors with empty ports condition. FIG. 32 is a flow diagram illustrating processing of the handle condition check message in one embodiment. This message is sent by a neighbor process that has one hole and has received a request to connect to a hole of this process. In decision block 3201, if the number of holes of this process is equal to one, then the routine continues at block 3202, else the neighbors with empty ports condition does not exist any more and the routine returns. In decision block 3202, if the sending neighbor and this process have the same set of neighbors, the routine continues at block 3203, else the routine continues at block 3205. In block 3203, the routine initializes a condition double check message (i.e., condition_double_check) with the list of neighbors of this process. In block 3204, the routine sends the message internally to a neighbor other than sending neighbor. The routine then returns. In block 3205, the routine selects a neighbor of the sending process that is not also a neighbor of this process. In block 3206, the routine sends a condition repair message (i.e., condition_repair_stmt) externally to the selected process. In block 3207, the routine invokes the add neighbor routine to add the selected neighbor as a neighbor of this process and then returns.

FIG. 33 is a flow diagram illustrating processing of the handle condition repair statement routine in one embodiment. This routine removes an existing neighbor and connects to the process that sent the message. In decision block 3301, if this process has no holes, then the routine continues at block 3302, else the routine continues at block 3304. In block 3302, the routine selects a neighbor that is not involved in the neighbors with empty ports condition. In block 3303, the routine removes the selected neighbor as a neighbor of this process. Thus, this process that is executing the routine now has at least one hole. In block 3304, the routine invokes the add neighbor routine to add the process that sent the message as a neighbor of this process. The routine then returns.

FIG. 34 is a flow diagram illustrating the processing of the handle condition double check routine. This routine determines whether the neighbors with empty ports condition really is a problem or whether the broadcast channel is in the small regime. In decision block 3401, if this process has one hole, then the routine continues at block 3402, else the routine continues at block 3403. If this process does not have one hole, then the set of neighbors of this process is not the same as the set of neighbors of the sending process. In decision block 3402, if this process and the sending process have the same set of neighbors, then the broadcast channel is not in the small regime and the routine continues at block 3403, else the routine continues at block 3406. In decision block 3403, if this process has no holes, then the routine returns, else the routine continues at block 3404. In block 3404, the routine sets the estimated diameter for this process to one. In block 3405, the routine broadcasts a diameter reset internal message (i.e., diameter_reset) indicating that the estimated diameter is one and then returns. In block 3406, the routine creates a list of neighbors of this process. In block 3407, the routine sends the condition check message (i.e., condition_check_stmt) with the list of neighbors to the neighbor who sent the condition double check message and then returns.

From the above description, it will be appreciated that although specific embodiments of the technology have been described, various modifications may be made without deviating from the spirit and scope of the invention. For example, the communications on the broadcast channel may be encrypted. Also, the channel instance or session identifier may be a very large number (e.g, 128 bits) to help prevent an unauthorized user to maliciously tap into a broadcast channel. The portal computer may also enforce security and not allow an unauthorized user to connect to the broadcast channel. Accordingly, the invention is not limited except by the claims.

What is claimed is:

1. A computer network for providing an information delivery service for a plurality of participants, each participant having connections to at least three neighbor participants, wherein an originating participant sends data to the other participants by sending the data through each of its connections to its neighbor participants and wherein each participant sends data that it receives from a neighbor participant to its other neighbor participants, further wherein the network is m-regular, where m is the exact number of neighbor participants of each participant and further wherein the number of participants is at least two greater than m thus resulting in a non-complete graph.

2. The computer network of claim 1 wherein each participant is connected to 4 other participants.

3. The computer network of claim 1 wherein each participant is connected to an even number of other participants.

4. The computer network of claim 1 wherein the network is m-connected, where m is the number of neighbor participants of each participant.

5. The computer network of claim 1 wherein the network is m-regular and m-connected, where m is the number of neighbor participants of each participant.

6. The computer network of claim 1 wherein all the participants are peers.

7. The computer network of claim 1 wherein the connections are peer-to-peer connections.

8. The computer network of claim 1 wherein the connections are TCP/IP connections.

9. The computer network of claim 1 wherein each participant is a process executing on a computer.

10. The computer network of claim 1 wherein a computer hosts more than one participant.

11. The computer network of claim 1 wherein each participant sends to each of its neighbors only one copy of the data.

12. The computer network of claim 1 wherein the interconnections of participants form a broadcast channel for a topic of interest.

13. An information delivery service comprising:
a plurality of broadcast channels, each broadcast channel for distributing information relating to a topic, each of the broadcast channels for providing said information related to a topic to a plurality of participants, each participant having connections to at least three neighbor participants, wherein an originating participant sends data to the other participants by sending the data through each of its connections to its neighbor participants and wherein each participant sends data that it receives from a neighbor participant to its neighbor participants, further wherein the network is m-regular, where m is the exact number of neighbor participants of each participant and further wherein the number of participants is at least two greater than m thus resulting in a non-complete graph;
means for identifying a broadcast channel for a topic of interest; and
means for connecting to the identified broadcast channel.

14. The information delivery service of claim 13 wherein means for identifying a topic of interest includes accessing a web server that maps topics to corresponding broadcast channel.

15. The information deliver service of claim 13 wherein a broadcast channel is formed by subscriber computers that are each interconnected to at least three other subscriber computers.

16. A computer network for providing an information delivery service for a plurality of participants, each participant having connections to exactly four neighbor participants, wherein an originating participant sends data to the other participants by sending the data through each of its connections to its neighbor participants and wherein each participant sends data that it receives from a neighbor participant to its neighbor participants, further wherein the network is in a stable 4-regular state and wherein there are at least six participants to result in a non-complete graph.

17. The computer network of claim 16 wherein a computer hosts more than one participant.

* * * * *

UNITED STATES PATENT AND TRADEMARK OFFICE
CERTIFICATE OF CORRECTION

PATENT NO.    : 6,714,966 B1                                          Page 1 of 1
DATED         : March 30, 2004
INVENTOR(S)   : Fred B. Holt et al.

It is certified that error appears in the above-identified patent and that said Letters Patent is hereby corrected as shown below:

Column 9,
Line 8, "(e.g," should be -- (e.g., --;

Column 21,
Line 55, "stint" should be -- stmt --;

Column 22,
Lines 19 and 23, "stint" should be -- stmt --;

Column 23,
Line 33, "stint" should be -- stmt --;

Column 25,
Line 67, delete space between "2203" and "A"

Column 26,
Line 1, delete space between "2203" and "A";
Lines 2 and 3, delete space between "2203" and "B";

Column 27,
Line 32, insert period between "itself" and "This";

Column 29,
Line 62, "(e.g," should be -- (e.g., --;

Signed and Sealed this

Twenty-ninth Day of June, 2004

JON W. DUDAS
*Acting Director of the United States Patent and Trademark Office*